US012003864B2

United States Patent
Rivard et al.

(10) Patent No.: US 12,003,864 B2
(45) Date of Patent: Jun. 4, 2024

(54) IMAGE SENSOR APPARATUS AND METHOD FOR OBTAINING MULTIPLE EXPOSURES WITH ZERO INTERFRAME TIME

(71) Applicant: Duelight LLC, Sunnyvale, CA (US)

(72) Inventors: William Rivard, Menlo Park, CA (US); Adam Feder, Mountain View, CA (US); Brian Kindle, Sunnyvale, CA (US)

(73) Assignee: DUELIGHT LLC, Sunnyvale, CA (US)

( * ) Notice: Subject to any disclaimer, the term of this patent is extended or adjusted under 35 U.S.C. 154(b) by 0 days.

(21) Appl. No.: 17/321,166

(22) Filed: May 14, 2021

(65) Prior Publication Data

US 2021/0360141 A1    Nov. 18, 2021

Related U.S. Application Data

(63) Continuation of application No. 16/857,016, filed on Apr. 23, 2020, now Pat. No. 11,025,831, which is a
(Continued)

(51) Int. Cl.
*H04N 23/741* (2023.01)
*G06T 5/50* (2006.01)
(Continued)

(52) U.S. Cl.
CPC ............. *H04N 23/741* (2023.01); *G06T 5/50* (2013.01); *H04N 23/6811* (2023.01);
(Continued)

(58) Field of Classification Search
CPC .... H04N 9/045; H04N 5/2352; H04N 5/2355; H04N 5/355; H04N 5/35536;
(Continued)

(56) References Cited

U.S. PATENT DOCUMENTS

| 4,057,809 A | 11/1977 | Nakamoto et al. |
| 4,425,031 A | 1/1984 | Tamura et al. |

(Continued)

FOREIGN PATENT DOCUMENTS

| CN | 101290388 A | 10/2008 |
| CN | 101408709 A | 4/2009 |

(Continued)

OTHER PUBLICATIONS

International Search Report and Written Opinion from International Application No. PCT/US 18/54014, dated Dec. 26, 2018.
(Continued)

*Primary Examiner* — Kelly L Jerabek
(74) *Attorney, Agent, or Firm* — Zilka-Kotab, P.C.

(57) ABSTRACT

A system, method, and computer program product are provided for obtaining multiple exposures with zero interframe time. In use, an analog signal associated with an image associated with an image of an image sensor is received. Amplified analog signals associated with the image are generated by amplifying the analog signal utilizing gains. The amplified analog signals are transmitted to analog-to-digital converter circuits. The amplified analog signals are converted to digital signals utilizing the analog-to-digital converter circuits. The digital signals are combined to create a high dynamic range (HDR) image.

147 Claims, 17 Drawing Sheets

Related U.S. Application Data continuation of application No. 16/519,244, filed on Jul. 23, 2019, now Pat. No. 10,652,478, which is a continuation of application No. 15/891,251, filed on Feb. 7, 2018, now Pat. No. 10,382,702, which is a continuation of application No. 14/823,993, filed on Aug. 11, 2015, now Pat. No. 9,918,017, which is a continuation-in-part of application No. 14/702,549, filed on May 1, 2015, now Pat. No. 9,531,961, and a continuation-in-part of application No. 14/568,045, filed on Dec. 11, 2014, now Pat. No. 9,406,147, which is a continuation of application No. 13/573,252, filed on Sep. 4, 2012, now Pat. No. 8,976,264, said application No. 14/823,993 is a continuation-in-part of application No. 14/536,524, filed on Nov. 7, 2014, now Pat. No. 9,160,936, and a continuation-in-part of application No. 14/535,274, filed on Nov. 6, 2014, now Pat. No. 9,154,708, and a continuation-in-part of application No. 14/535,279, filed on Nov. 6, 2014, now Pat. No. 9,179,085, and a continuation-in-part of application No. 14/535,282, filed on Nov. 6, 2014, now Pat. No. 9,179,062, and a continuation-in-part of application No. 14/534,068, filed on Nov. 5, 2014, now Pat. No. 9,167,174, and a continuation-in-part of application No. 14/534,079, filed on Nov. 5, 2014, now Pat. No. 9,137,455, and a continuation-in-part of application No. 14/534,089, filed on Nov. 5, 2014, now Pat. No. 9,167,169.

(51) Int. Cl.
*H04N 23/68* (2023.01)
*H04N 23/72* (2023.01)
*H04N 23/76* (2023.01)

(52) U.S. Cl.
CPC ............. *H04N 23/72* (2023.01); *H04N 23/76* (2023.01); *G06T 2207/20208* (2013.01); *G06T 2207/20221* (2013.01)

(58) Field of Classification Search
CPC .... H04N 5/35554; H04N 5/378; H04N 5/235; H04N 5/37452; H04N 5/23254; H04N 5/243; H04N 23/741; H04N 23/6811; H04N 23/72; H04N 23/76; G06T 5/50; G06T 5/007; G06T 2207/20221; G06T 2207/20208
See application file for complete search history.

(56) References Cited

U.S. PATENT DOCUMENTS

| | | |
|---|---|---|
| 4,470,676 A | 9/1984 | Kinoshita et al. |
| 4,638,365 A | 1/1987 | Kato |
| 4,712,136 A | 12/1987 | Tsunekawa et al. |
| 4,720,723 A | 1/1988 | Harunari et al. |
| 4,734,762 A | 3/1988 | Aoki et al. |
| 4,811,086 A | 3/1989 | Hieda |
| 4,821,099 A | 4/1989 | Sakamoto |
| 4,832,518 A | 5/1989 | Moriyama |
| 4,873,561 A | 10/1989 | Wen |
| 4,980,773 A | 12/1990 | Suda et al. |
| 5,101,253 A | 3/1992 | Mizutani et al. |
| 5,109,236 A | 4/1992 | Watanabe et al. |
| 5,115,124 A | 5/1992 | Muto et al. |
| 5,126,777 A | 6/1992 | Akashi et al. |
| 5,132,783 A | 7/1992 | Hieda |
| 5,146,316 A | 9/1992 | Suzuki |
| 5,151,796 A | 9/1992 | Ito et al. |
| 5,175,615 A | 12/1992 | Ohara |
| 5,185,668 A | 2/1993 | Ohta |
| 5,200,828 A | 4/1993 | Jang et al. |
| 5,262,870 A | 11/1993 | Nakamura et al. |
| 5,282,024 A | 1/1994 | Takei |
| 5,291,151 A | 3/1994 | Fujiwara et al. |
| 5,317,406 A | 5/1994 | Kobayashi et al. |
| 5,321,528 A | 6/1994 | Nakamura |
| 5,363,209 A | 11/1994 | Eschbach et al. |
| 5,559,770 A | 9/1996 | Hiroki et al. |
| 5,633,677 A | 5/1997 | Okino et al. |
| 5,698,844 A | 12/1997 | Shinohara et al. |
| 5,754,705 A | 5/1998 | Okino |
| 5,764,246 A | 6/1998 | Wataya et al. |
| 5,790,234 A | 8/1998 | Matsuyama |
| 5,818,977 A | 10/1998 | Tansley |
| 5,867,215 A | 2/1999 | Kaplan |
| 5,987,186 A | 11/1999 | Oida et al. |
| 6,018,599 A | 1/2000 | Kawai |
| 6,115,065 A | 9/2000 | Yadid-Pecht et al. |
| 6,184,516 B1 | 2/2001 | Sawada et al. |
| 6,184,940 B1 | 2/2001 | Sano |
| 6,243,430 B1 | 6/2001 | Mathe |
| 6,246,226 B1 | 6/2001 | Kawase et al. |
| 6,348,697 B1 | 2/2002 | Kitajima |
| 6,365,950 B1 | 4/2002 | Sohn |
| 6,453,068 B1 | 9/2002 | Li |
| 6,473,159 B1 | 10/2002 | Wakui et al. |
| 6,498,926 B1 | 12/2002 | Ciccarelli et al. |
| 6,530,639 B1 | 3/2003 | Matsuda |
| 6,539,129 B1 | 3/2003 | Yushiya |
| 6,546,150 B2 | 4/2003 | Inui |
| 6,597,399 B2 | 7/2003 | Horii |
| 6,600,160 B2 | 7/2003 | Kobayashi et al. |
| 6,627,896 B1 | 9/2003 | Hashimoto et al. |
| 6,642,962 B1 | 11/2003 | Lin et al. |
| 6,787,778 B2 | 9/2004 | Kobayashi et al. |
| 6,788,338 B1 | 9/2004 | Dinev et al. |
| 6,906,332 B2 | 6/2005 | Tashiro et al. |
| 6,950,132 B1 | 9/2005 | Kozuka |
| 6,952,015 B2 | 10/2005 | Kameshima |
| 6,959,157 B2 | 10/2005 | Nakayama |
| 6,961,088 B2 | 11/2005 | Kameshima et al. |
| 6,989,863 B1 | 1/2006 | Takahashi |
| 6,996,186 B2 | 2/2006 | Ngai et al. |
| 7,030,922 B2 | 4/2006 | Sakuragi |
| 7,084,905 B1 | 8/2006 | Nayar et al. |
| 7,088,351 B2 | 8/2006 | Wang |
| 7,098,952 B2 | 8/2006 | Morris et al. |
| 7,138,639 B2 | 11/2006 | Kameshima |
| 7,206,449 B2 | 4/2007 | Raskar et al. |
| 7,256,381 B2 | 8/2007 | Asaba |
| 7,265,784 B1 | 9/2007 | Frank |
| 7,381,963 B2 | 6/2008 | Endo et al. |
| 7,421,063 B2 | 9/2008 | Takenaka et al. |
| 7,433,547 B2 | 10/2008 | Yamamoto |
| 7,470,911 B2 | 12/2008 | Yagi |
| 7,514,690 B2 | 4/2009 | Endo et al. |
| 7,518,645 B2 | 4/2009 | Farrier |
| 7,564,037 B2 | 7/2009 | Tashiro et al. |
| 7,573,037 B1 | 8/2009 | Kameshima et al. |
| 7,587,099 B2 | 9/2009 | Szeliski et al. |
| 7,592,599 B2 | 9/2009 | Kameshima |
| 7,595,831 B2 | 9/2009 | Kameshima et al. |
| 7,599,541 B2 | 10/2009 | Hayashida |
| 7,599,569 B2 | 10/2009 | Smirnov et al. |
| 7,622,698 B2 | 11/2009 | Igaki et al. |
| 7,676,170 B2 | 3/2010 | Hata |
| 7,705,911 B2 | 4/2010 | Kameshima |
| 7,724,292 B2 | 5/2010 | Ueno et al. |
| 7,760,246 B2 | 7/2010 | Dalton et al. |
| 7,802,866 B2 | 9/2010 | Kanno et al. |
| 7,825,974 B2 | 11/2010 | Itano et al. |
| 7,835,586 B2 | 11/2010 | Porikli |
| 7,842,927 B2 | 11/2010 | Tashiro et al. |
| 7,847,259 B2 | 12/2010 | Tashiro et al. |
| 7,907,791 B2 | 3/2011 | Kinrot et al. |
| 7,911,506 B2 | 3/2011 | Suzuki |
| 7,923,695 B2 | 4/2011 | Ishii et al. |
| 7,923,696 B2 | 4/2011 | Kameshima |
| 7,952,077 B2 | 5/2011 | Tashiro et al. |

(56) References Cited

U.S. PATENT DOCUMENTS

| | | |
|---|---|---|
| 7,952,621 B2 | 5/2011 | Yamauchi |
| 7,999,858 B2 | 8/2011 | Nayar et al. |
| 8,063,967 B2 | 11/2011 | Itano et al. |
| 8,129,760 B2 | 3/2012 | Hiromatsu |
| 8,144,253 B2 | 3/2012 | Su et al. |
| 8,189,944 B1 | 5/2012 | Lim |
| 8,208,051 B2 | 6/2012 | Kitani |
| 8,218,070 B2 | 7/2012 | Kameshima |
| 8,247,779 B2 | 8/2012 | Kameshima et al. |
| 8,335,021 B2 | 12/2012 | Tanaka et al. |
| 8,345,327 B2 | 1/2013 | Mikami |
| 8,441,560 B2 | 5/2013 | Yanai |
| 8,488,219 B2 | 7/2013 | Mikami |
| 8,508,600 B2 | 8/2013 | Ibi |
| RE44,499 E | 9/2013 | Inoue et al. |
| 8,563,915 B2 | 10/2013 | Takenaka et al. |
| 8,570,415 B2 | 10/2013 | Takeda |
| 8,576,294 B2 | 11/2013 | Kameshima et al. |
| 8,610,789 B1 | 12/2013 | Nayar et al. |
| 8,675,086 B1 | 3/2014 | Linzer |
| 8,692,917 B2 | 4/2014 | Takeda |
| 8,698,062 B2 | 4/2014 | Yoshida |
| 8,723,284 B1 | 5/2014 | Hynecek |
| 8,754,978 B2 | 6/2014 | Hayashi et al. |
| 8,761,245 B2 | 6/2014 | Puri et al. |
| 8,780,420 B1 | 7/2014 | Bluzer et al. |
| 8,783,816 B2 | 7/2014 | Masuda |
| 8,785,870 B2 | 7/2014 | Matsumoto et al. |
| 8,786,920 B2 | 7/2014 | Mikami |
| 8,794,733 B2 | 8/2014 | Kanno et al. |
| 8,809,760 B2 | 8/2014 | Takenaka et al. |
| 8,811,757 B2 | 8/2014 | Batur |
| 8,836,837 B2 | 9/2014 | Kinugasa |
| 8,854,421 B2 | 10/2014 | Kasahara |
| 8,867,105 B2 | 10/2014 | Mikami |
| 8,878,117 B2 | 11/2014 | Ogushi |
| 8,878,963 B2 | 11/2014 | Prabhudesai et al. |
| 8,902,342 B2 | 12/2014 | Araoka et al. |
| 8,934,029 B2 | 1/2015 | Nayar et al. |
| 8,948,584 B2 | 2/2015 | Inoue et al. |
| 8,976,264 B2 | 3/2015 | Rivard et al. |
| 8,988,561 B2 | 3/2015 | Yamauchi |
| 9,001,232 B2 | 4/2015 | Tatsumi |
| 9,001,249 B2 | 4/2015 | Iwane |
| 9,007,505 B2 | 4/2015 | Ichikawa |
| 9,014,459 B2 | 4/2015 | Xiang et al. |
| 9,030,566 B2 | 5/2015 | Miyasako |
| 9,030,587 B2 | 5/2015 | Suzuki et al. |
| 9,070,185 B2 | 6/2015 | Lee et al. |
| 9,080,914 B2 | 7/2015 | Kinugasa |
| 9,083,905 B2 | 7/2015 | Wan et al. |
| 9,106,888 B2 | 8/2015 | Chou |
| 9,123,621 B2 | 9/2015 | Watanabe |
| 9,137,455 B1 | 9/2015 | Rivard et al. |
| 9,154,708 B1 | 10/2015 | Rivard et al. |
| 9,160,936 B1 | 10/2015 | Rivard et al. |
| 9,167,169 B1 | 10/2015 | Rivard et al. |
| 9,179,062 B1 | 11/2015 | Rivard et al. |
| 9,179,085 B1 | 11/2015 | Rivard et al. |
| 9,232,164 B2 | 1/2016 | Minowa et al. |
| 9,277,135 B2 | 3/2016 | Ichikawa |
| 9,285,729 B2 | 3/2016 | Saito et al. |
| 9,294,744 B2 | 3/2016 | Takeda |
| 9,336,574 B2 | 5/2016 | Zhang et al. |
| 9,354,184 B2 | 5/2016 | Dowaki |
| 9,406,147 B2 | 8/2016 | Rivard et al. |
| 9,426,398 B2 | 8/2016 | Ohshitanai |
| 9,438,836 B2 | 9/2016 | Tashiro et al. |
| 9,445,029 B2 | 9/2016 | Shimizu |
| 9,531,961 B2 | 12/2016 | Rivard et al. |
| 9,538,112 B2 | 1/2017 | Wada et al. |
| 9,560,269 B2 | 1/2017 | Baldwin |
| 9,578,211 B2 | 2/2017 | Kong et al. |
| 9,600,741 B1 | 3/2017 | Su et al. |
| 9,661,327 B2 | 5/2017 | Nilsson |
| 9,667,892 B2 | 5/2017 | Sakuragi |
| 9,756,267 B2 | 9/2017 | Dowaki et al. |
| 9,769,404 B2 | 9/2017 | Ohshitanai |
| 9,773,827 B2 | 9/2017 | Minowa et al. |
| 9,807,322 B2 | 10/2017 | Feder et al. |
| 9,819,849 B1 | 11/2017 | Rivard et al. |
| 9,860,461 B2 | 1/2018 | Feder et al. |
| 9,912,928 B2 | 3/2018 | Rivard et al. |
| 9,918,017 B2 | 3/2018 | Rivard et al. |
| 9,942,504 B2 | 4/2018 | Nishizawa |
| 9,979,910 B2 | 5/2018 | Ikedo |
| 9,998,721 B2 | 6/2018 | Rivard et al. |
| 10,110,870 B2 | 10/2018 | Rivard et al. |
| 10,129,514 B2 | 11/2018 | Rivard et al. |
| 10,148,898 B2 | 12/2018 | Dowaki et al. |
| 10,178,300 B2 | 1/2019 | Rivard et al. |
| 10,182,197 B2 | 1/2019 | Feder et al. |
| 10,270,958 B2 | 4/2019 | Rivard et al. |
| 10,271,001 B2 | 4/2019 | Uchida et al. |
| 10,372,971 B2 | 8/2019 | Rivard et al. |
| 10,375,369 B2 | 8/2019 | Rivard et al. |
| 10,382,702 B2 | 8/2019 | Rivard et al. |
| 10,469,714 B2 | 11/2019 | Rivard et al. |
| 10,477,077 B2 | 11/2019 | Rivard et al. |
| 10,498,982 B2 | 12/2019 | Feder et al. |
| 10,558,848 B2 | 2/2020 | Rivard et al. |
| 10,586,097 B2 | 3/2020 | Rivard et al. |
| 10,652,478 B2 | 5/2020 | Rivard et al. |
| 10,785,401 B2 | 9/2020 | Rivard et al. |
| 10,904,505 B2 | 1/2021 | Rivard et al. |
| 10,924,688 B2 | 2/2021 | Rivard et al. |
| 10,931,897 B2 | 2/2021 | Feder et al. |
| 11,025,831 B2 | 6/2021 | Rivard et al. |
| 11,356,647 B2 | 6/2022 | Rivard |
| 11,375,085 B2 | 6/2022 | Rivard et al. |
| 11,394,894 B2 | 7/2022 | Rivard et al. |
| 11,455,829 B2 | 9/2022 | Rivard et al. |
| 11,463,630 B2 | 10/2022 | Rivard et al. |
| 11,699,219 B2 | 7/2023 | Rivard et al. |
| 2001/0030770 A1 | 10/2001 | Ohashi |
| 2001/0033336 A1 | 10/2001 | Kameshima et al. |
| 2002/0006232 A1 | 1/2002 | Inui |
| 2002/0012450 A1 | 1/2002 | Tsujii |
| 2003/0015645 A1 | 1/2003 | Brickell et al. |
| 2003/0025816 A1 | 2/2003 | Sakuragi |
| 2003/0042425 A1 | 3/2003 | Tashiro et al. |
| 2003/0142745 A1 | 7/2003 | Osawa |
| 2003/0184660 A1 | 10/2003 | Skow |
| 2004/0027471 A1 | 2/2004 | Koseki et al. |
| 2004/0042807 A1 | 3/2004 | Nakayama |
| 2004/0178349 A1 | 9/2004 | Kameshima |
| 2004/0181375 A1 | 9/2004 | Szu et al. |
| 2004/0184677 A1 | 9/2004 | Raskar et al. |
| 2004/0252199 A1 | 12/2004 | Cheung et al. |
| 2004/0263510 A1 | 12/2004 | Marschner et al. |
| 2005/0068432 A1 | 3/2005 | Kozuka |
| 2005/0088570 A1 | 4/2005 | Seo |
| 2005/0134723 A1 | 6/2005 | Lee et al. |
| 2005/0173646 A1 | 8/2005 | Tashiro et al. |
| 2005/0180657 A1 | 8/2005 | Zhang et al. |
| 2005/0218333 A1 | 10/2005 | Kameshima |
| 2005/0253945 A1 | 11/2005 | Shinohara |
| 2005/0253946 A1 | 11/2005 | Shinohara |
| 2006/0015308 A1 | 1/2006 | Marschner et al. |
| 2006/0017837 A1 | 1/2006 | Sorek et al. |
| 2006/0050165 A1 | 3/2006 | Amano |
| 2006/0054834 A1 | 3/2006 | Kameshima |
| 2006/0087702 A1 | 4/2006 | Satoh et al. |
| 2006/0177150 A1 | 8/2006 | Uyttendaele et al. |
| 2006/0181614 A1 | 8/2006 | Yen et al. |
| 2006/0188132 A1 | 8/2006 | Shigeta |
| 2006/0192130 A1 | 8/2006 | Yagi |
| 2006/0192785 A1 | 8/2006 | Marschner et al. |
| 2006/0231875 A1 | 10/2006 | Patrick et al. |
| 2006/0245014 A1 | 11/2006 | Haneda |
| 2007/0023798 A1 | 2/2007 | McKee |
| 2007/0025714 A1 | 2/2007 | Shiraki |
| 2007/0025717 A1 | 2/2007 | Raskar et al. |
| 2007/0030357 A1 | 2/2007 | Levien et al. |

(56) References Cited

U.S. PATENT DOCUMENTS

| | | |
|---|---|---|
| 2007/0069144 A1 | 3/2007 | Kameshima |
| 2007/0080299 A1 | 4/2007 | Endo et al. |
| 2007/0110305 A1 | 5/2007 | Corcoran et al. |
| 2007/0200663 A1 | 8/2007 | White et al. |
| 2007/0223062 A1 | 9/2007 | Tanaka et al. |
| 2007/0223954 A1 | 9/2007 | Hata |
| 2007/0242900 A1 | 10/2007 | Chen et al. |
| 2007/0248342 A1 | 10/2007 | Tamminen et al. |
| 2007/0258008 A1 | 11/2007 | Kameshima et al. |
| 2007/0263106 A1 | 11/2007 | Tanaka et al. |
| 2007/0280505 A1 | 12/2007 | Breed |
| 2007/0291081 A1 | 12/2007 | Kanno et al. |
| 2007/0297567 A1 | 12/2007 | Takenaka et al. |
| 2008/0004946 A1 | 1/2008 | Schwarz |
| 2008/0018763 A1 | 1/2008 | Sato |
| 2008/0018911 A1 | 1/2008 | Igaki et al. |
| 2008/0030592 A1 | 2/2008 | Border et al. |
| 2008/0107411 A1 | 5/2008 | Hope |
| 2008/0129848 A1 | 6/2008 | Yamauchi |
| 2008/0151097 A1 | 6/2008 | Chen et al. |
| 2008/0158398 A1 | 7/2008 | Yaffe et al. |
| 2008/0158403 A1 | 7/2008 | Itano et al. |
| 2008/0170160 A1 | 7/2008 | Lukac |
| 2008/0192064 A1 | 8/2008 | Hong et al. |
| 2008/0218611 A1 | 9/2008 | Parulski et al. |
| 2009/0002475 A1 | 1/2009 | Jelley et al. |
| 2009/0027516 A1 | 1/2009 | Suzuki |
| 2009/0066782 A1 | 3/2009 | Choi et al. |
| 2009/0141149 A1 | 6/2009 | Zhang et al. |
| 2009/0153245 A1 | 6/2009 | Lee |
| 2009/0160992 A1 | 6/2009 | Inaba et al. |
| 2009/0166547 A1 | 7/2009 | Endo et al. |
| 2009/0175555 A1 | 7/2009 | Mahowald |
| 2009/0185659 A1 | 7/2009 | Ishii et al. |
| 2009/0218476 A1 | 9/2009 | Kameshima et al. |
| 2009/0230290 A1 | 9/2009 | Tashiro et al. |
| 2009/0230312 A1 | 9/2009 | Tashiro et al. |
| 2009/0278922 A1 | 11/2009 | Tinker et al. |
| 2009/0295941 A1 | 12/2009 | Nakajima et al. |
| 2009/0309035 A1 | 12/2009 | Kameshima |
| 2009/0309985 A1 | 12/2009 | Ibi |
| 2009/0309990 A1 | 12/2009 | Levoy et al. |
| 2009/0309994 A1 | 12/2009 | Inoue |
| 2009/0322903 A1 | 12/2009 | Hashimoto et al. |
| 2009/0323897 A1 | 12/2009 | Kameshima et al. |
| 2010/0073499 A1 | 3/2010 | Gere |
| 2010/0118204 A1 | 5/2010 | Proca et al. |
| 2010/0165178 A1 | 7/2010 | Chou et al. |
| 2010/0165181 A1 | 7/2010 | Murakami et al. |
| 2010/0182465 A1 | 7/2010 | Okita |
| 2010/0194851 A1 | 8/2010 | Pasupaleti et al. |
| 2010/0194963 A1 | 8/2010 | Terashima |
| 2010/0201831 A1 | 8/2010 | Weinstein |
| 2010/0208099 A1 | 8/2010 | Nomura |
| 2010/0231747 A1 | 9/2010 | Yim |
| 2010/0231761 A1 | 9/2010 | Yanai |
| 2010/0265079 A1 | 10/2010 | Yin |
| 2010/0302407 A1 | 12/2010 | Ayers et al. |
| 2010/0321439 A1 | 12/2010 | Kanno et al. |
| 2011/0013042 A1 | 1/2011 | Itano et al. |
| 2011/0013052 A1 | 1/2011 | Yanai |
| 2011/0019051 A1 | 1/2011 | Yin et al. |
| 2011/0036986 A1 | 2/2011 | Tashiro et al. |
| 2011/0058237 A1 | 3/2011 | Mikami |
| 2011/0090385 A1 | 4/2011 | Aoyama et al. |
| 2011/0095169 A1 | 4/2011 | Takenaka et al. |
| 2011/0096192 A1 | 4/2011 | Niikura |
| 2011/0096375 A1 | 4/2011 | Mikami |
| 2011/0115971 A1 | 5/2011 | Furuya et al. |
| 2011/0134267 A1 | 6/2011 | Ohya |
| 2011/0134297 A1 | 6/2011 | Takeda |
| 2011/0150332 A1 | 6/2011 | Sibiryakov et al. |
| 2011/0194618 A1 | 8/2011 | Gish et al. |
| 2011/0199519 A1 | 8/2011 | Yamauchi |
| 2011/0221935 A1 | 9/2011 | Kameshima |
| 2011/0242334 A1 | 10/2011 | Wilburn et al. |
| 2011/0279698 A1 | 11/2011 | Yoshikawa |
| 2011/0280541 A1 | 11/2011 | Lee |
| 2012/0002082 A1 | 1/2012 | Johnson et al. |
| 2012/0002089 A1 | 1/2012 | Wang et al. |
| 2012/0007908 A1 | 1/2012 | Masuda |
| 2012/0008011 A1 | 1/2012 | Garcia Manchado |
| 2012/0033118 A1 | 2/2012 | Lee et al. |
| 2012/0044543 A1 | 2/2012 | Mikami |
| 2012/0057786 A1 | 3/2012 | Yano |
| 2012/0069213 A1 | 3/2012 | Jannard et al. |
| 2012/0104267 A1 | 5/2012 | Matsumoto et al. |
| 2012/0105584 A1 | 5/2012 | Gallagher et al. |
| 2012/0154541 A1 | 6/2012 | Scott |
| 2012/0154627 A1 | 6/2012 | Rivard et al. |
| 2012/0162465 A1 | 6/2012 | Culbert et al. |
| 2012/0177352 A1 | 7/2012 | Pillman et al. |
| 2012/0188386 A1 | 7/2012 | Kulkarni et al. |
| 2012/0188392 A1 | 7/2012 | Smith |
| 2012/0206582 A1 | 8/2012 | DiCarlo et al. |
| 2012/0212661 A1 | 8/2012 | Yamaguchi et al. |
| 2012/0224788 A1 | 9/2012 | Jia et al. |
| 2012/0242844 A1 | 9/2012 | Walker et al. |
| 2012/0242886 A1 | 9/2012 | Kawarada |
| 2012/0262600 A1 | 10/2012 | Velarde et al. |
| 2012/0273651 A1 | 11/2012 | Willassen |
| 2012/0274806 A1 | 11/2012 | Mori |
| 2012/0287223 A1 | 11/2012 | Zhang et al. |
| 2012/0307097 A1 | 12/2012 | Araoka et al. |
| 2012/0307100 A1 | 12/2012 | Iwane |
| 2012/0314100 A1 | 12/2012 | Frank |
| 2013/0001402 A1 | 1/2013 | Ogushi |
| 2013/0001429 A1 | 1/2013 | Dowaki et al. |
| 2013/0010075 A1 | 1/2013 | Gallagher et al. |
| 2013/0021447 A1 | 1/2013 | Brisedoux et al. |
| 2013/0026349 A1 | 1/2013 | Kinugasa |
| 2013/0027580 A1 | 1/2013 | Olsen et al. |
| 2013/0050520 A1 | 2/2013 | Takeuchi |
| 2013/0050551 A1 | 2/2013 | Ichikawa |
| 2013/0063633 A1 | 3/2013 | Hayashi et al. |
| 2013/0070145 A1 | 3/2013 | Matsuyama |
| 2013/0107062 A1 | 5/2013 | Okazaki |
| 2013/0114894 A1 | 5/2013 | Yadav et al. |
| 2013/0120011 A1 | 5/2013 | Yamazaki et al. |
| 2013/0140435 A1 | 6/2013 | Kikuchi |
| 2013/0147979 A1 | 6/2013 | McMahon et al. |
| 2013/0148013 A1 | 6/2013 | Shiohara |
| 2013/0162848 A1 | 6/2013 | Miyasako |
| 2013/0176458 A1 | 7/2013 | Van Dalen et al. |
| 2013/0194963 A1 | 8/2013 | Hampel |
| 2013/0223530 A1 | 8/2013 | Demos |
| 2013/0228673 A1 | 9/2013 | Hashimoto et al. |
| 2013/0235068 A1 | 9/2013 | Ubillos et al. |
| 2013/0271622 A1 | 10/2013 | Tatsumi |
| 2013/0271631 A1 | 10/2013 | Tatsuzawa et al. |
| 2013/0277534 A1 | 10/2013 | Watanabe |
| 2013/0278798 A1 | 10/2013 | Hattori |
| 2013/0278979 A1 | 10/2013 | Mikami |
| 2013/0279584 A1 | 10/2013 | Demos |
| 2013/0293744 A1 | 11/2013 | Attar et al. |
| 2013/0301729 A1 | 11/2013 | Demos |
| 2013/0307999 A1 | 11/2013 | Motta |
| 2013/0314576 A1 | 11/2013 | Suzuki et al. |
| 2013/0335596 A1 | 12/2013 | Demandolx et al. |
| 2013/0342526 A1 | 12/2013 | Ng et al. |
| 2013/0342740 A1 | 12/2013 | Govindarao |
| 2014/0001340 A1 | 1/2014 | Takenaka et al. |
| 2014/0009636 A1 | 1/2014 | Lee et al. |
| 2014/0009664 A1 | 1/2014 | Kinugasa |
| 2014/0016001 A1 | 1/2014 | Ichikawa |
| 2014/0036118 A1 | 2/2014 | Dowaki et al. |
| 2014/0036121 A1 | 2/2014 | Minowa et al. |
| 2014/0063287 A1 | 3/2014 | Yamada |
| 2014/0063301 A1 | 3/2014 | Solhusvik |
| 2014/0098248 A1 | 4/2014 | Okazaki |
| 2014/0160333 A1 | 6/2014 | Takeda |
| 2014/0168468 A1 | 6/2014 | Levoy et al. |
| 2014/0176757 A1 | 6/2014 | Rivard et al. |
| 2014/0184894 A1 | 7/2014 | Motta |

(56) References Cited

U.S. PATENT DOCUMENTS

| | | |
|---|---|---|
| 2014/0192216 A1 | 7/2014 | Matsumoto |
| 2014/0192267 A1 | 7/2014 | Biswas et al. |
| 2014/0193088 A1 | 7/2014 | Capata et al. |
| 2014/0197302 A1 | 7/2014 | Araoka et al. |
| 2014/0198242 A1 | 7/2014 | Weng et al. |
| 2014/0211852 A1 | 7/2014 | Demos |
| 2014/0244858 A1 | 8/2014 | Okazaki |
| 2014/0247870 A1 | 9/2014 | Mertens |
| 2014/0247979 A1 | 9/2014 | Roffet et al. |
| 2014/0253752 A1 | 9/2014 | Kawano et al. |
| 2014/0267869 A1 | 9/2014 | Sawa |
| 2014/0300795 A1 | 10/2014 | Bilcu et al. |
| 2014/0301642 A1 | 10/2014 | Muninder |
| 2014/0310788 A1 | 10/2014 | Ricci |
| 2014/0320720 A1 | 10/2014 | Ohshitanai |
| 2014/0354781 A1 | 12/2014 | Matsuyama |
| 2015/0005637 A1 | 1/2015 | Stegman et al. |
| 2015/0016693 A1 | 1/2015 | Gattuso |
| 2015/0077581 A1 | 3/2015 | Baltz et al. |
| 2015/0078661 A1 | 3/2015 | Granados et al. |
| 2015/0092852 A1 | 4/2015 | Demos |
| 2015/0098651 A1 | 4/2015 | Rivard et al. |
| 2015/0103192 A1 | 4/2015 | Venkatraman et al. |
| 2015/0109505 A1 | 4/2015 | Sakuragi |
| 2015/0130978 A1 | 5/2015 | Tashiro et al. |
| 2015/0138366 A1 | 5/2015 | Keelan et al. |
| 2015/0142182 A1 | 5/2015 | Kimura et al. |
| 2015/0146079 A1 | 5/2015 | Kim |
| 2015/0205236 A1 | 7/2015 | Saito et al. |
| 2015/0222809 A1 | 8/2015 | Osuka et al. |
| 2015/0222836 A1 | 8/2015 | Wada et al. |
| 2015/0229819 A1 | 8/2015 | Rivard et al. |
| 2015/0229898 A1 | 8/2015 | Rivard et al. |
| 2015/0279113 A1 | 10/2015 | Knorr et al. |
| 2015/0334318 A1 | 11/2015 | Georgiev et al. |
| 2015/0341593 A1 | 11/2015 | Zhang et al. |
| 2015/0350562 A1 | 12/2015 | Hubel et al. |
| 2016/0028948 A1 | 1/2016 | Omori et al. |
| 2016/0057348 A1 | 2/2016 | Liang et al. |
| 2016/0065926 A1 | 3/2016 | Nonaka et al. |
| 2016/0071289 A1 | 3/2016 | Kobayashi et al. |
| 2016/0086318 A1 | 3/2016 | Hannuksela et al. |
| 2016/0142610 A1 | 5/2016 | Rivard et al. |
| 2016/0150147 A1 | 5/2016 | Shioya |
| 2016/0150175 A1 | 5/2016 | Hynecek |
| 2016/0219211 A1 | 7/2016 | Katayama |
| 2016/0248968 A1 | 8/2016 | Baldwin |
| 2016/0284065 A1 | 9/2016 | Cohen |
| 2016/0316154 A1 | 10/2016 | Elmfors et al. |
| 2016/0316156 A1 | 10/2016 | Ohshitanai |
| 2016/0323518 A1 | 11/2016 | Rivard et al. |
| 2016/0381304 A9 | 12/2016 | Feder et al. |
| 2017/0019617 A1 | 1/2017 | Dowaki et al. |
| 2017/0048442 A1 | 2/2017 | Cote et al. |
| 2017/0054966 A1 | 2/2017 | Zhou et al. |
| 2017/0061234 A1 | 3/2017 | Lim et al. |
| 2017/0061236 A1 | 3/2017 | Pope |
| 2017/0061567 A1 | 3/2017 | Lim et al. |
| 2017/0064192 A1 | 3/2017 | Mori |
| 2017/0064227 A1 | 3/2017 | Lin et al. |
| 2017/0064276 A1 | 3/2017 | Rivard et al. |
| 2017/0070690 A1 | 3/2017 | Feder et al. |
| 2017/0076430 A1 | 3/2017 | Xu |
| 2017/0085785 A1 | 3/2017 | Corcoran et al. |
| 2017/0109931 A1 | 4/2017 | Knorr et al. |
| 2017/0150080 A1 | 5/2017 | Nishizawa |
| 2017/0237925 A1 | 8/2017 | Uchida et al. |
| 2017/0302903 A1 | 10/2017 | Ng et al. |
| 2017/0364752 A1 | 12/2017 | Zhou et al. |
| 2017/0374336 A1 | 12/2017 | Rivard et al. |
| 2018/0007240 A1 | 1/2018 | Rivard et al. |
| 2018/0063409 A1 | 3/2018 | Rivard et al. |
| 2018/0063411 A1 | 3/2018 | Rivard et al. |
| 2018/0074495 A1 | 3/2018 | Myers et al. |
| 2018/0077367 A1 | 3/2018 | Feder et al. |
| 2018/0160092 A1 | 6/2018 | Rivard et al. |
| 2018/0183989 A1 | 6/2018 | Rivard et al. |
| 2018/0367774 A1 | 12/2018 | Barron et al. |
| 2019/0031145 A1 | 1/2019 | Trelin |
| 2019/0045165 A1 | 2/2019 | Rivard et al. |
| 2019/0108387 A1 | 4/2019 | Rivard et al. |
| 2019/0108388 A1 | 4/2019 | Rivard et al. |
| 2019/0116306 A1 | 4/2019 | Rivard et al. |
| 2019/0124280 A1 | 4/2019 | Feder et al. |
| 2019/0174028 A1 | 6/2019 | Rivard et al. |
| 2019/0179594 A1 | 6/2019 | Alameh et al. |
| 2019/0197297 A1 | 6/2019 | Rivard et al. |
| 2019/0197330 A1 | 6/2019 | Mahmoud et al. |
| 2019/0222807 A1 | 7/2019 | Rivard et al. |
| 2019/0263415 A1 | 8/2019 | Gong |
| 2019/0335151 A1 | 10/2019 | Rivard et al. |
| 2019/0349510 A1 | 11/2019 | Rivard et al. |
| 2020/0029008 A1 | 1/2020 | Rivard et al. |
| 2020/0059575 A1 | 2/2020 | Rivard et al. |
| 2020/0084398 A1 | 3/2020 | Feder et al. |
| 2020/0193144 A1 | 6/2020 | Rivard et al. |
| 2020/0259991 A1 | 8/2020 | Rivard et al. |
| 2021/0001810 A1 | 1/2021 | Rivard et al. |
| 2021/0037178 A1 | 2/2021 | Rivard et al. |
| 2021/0274142 A1 | 9/2021 | Rivard et al. |
| 2021/0314507 A1 | 10/2021 | Feder et al. |
| 2021/0337104 A1 | 10/2021 | Rivard et al. |
| 2022/0343678 A1 | 10/2022 | Rivard et al. |
| 2023/0005294 A1 | 1/2023 | Rivard et al. |
| 2023/0047124 A1 | 2/2023 | Rivard et al. |
| 2023/0050695 A1 | 2/2023 | Rivard et al. |
| 2023/0052018 A1 | 2/2023 | Rivard et al. |

FOREIGN PATENT DOCUMENTS

| | | |
|---|---|---|
| CN | 102053453 A | 5/2011 |
| CN | 102165783 A | 8/2011 |
| CN | 103152519 A | 6/2013 |
| CN | 103813098 A | 5/2014 |
| CN | 204316606 U | 5/2015 |
| CN | 105026955 A | 11/2015 |
| DE | 102011107844 A1 | 1/2013 |
| EP | 2169946 A2 | 3/2010 |
| EP | 2346079 A1 | 7/2011 |
| EP | 2565843 A2 | 3/2013 |
| EP | 2731326 A2 | 5/2014 |
| GB | 2486878 A | 7/2012 |
| GB | 2487943 A | 8/2012 |
| JP | H09-200617 A | 7/1997 |
| JP | 2000278532 A | 10/2000 |
| JP | 2001245213 A | 9/2001 |
| JP | 2002112008 A | 4/2002 |
| JP | 2003101886 A | 4/2003 |
| JP | 2003299067 A | 10/2003 |
| JP | 2004247983 A | 9/2004 |
| JP | 2004248061 A | 9/2004 |
| JP | 2004326119 A | 11/2004 |
| JP | 2004328532 A | 11/2004 |
| JP | 2006080752 A | 3/2006 |
| JP | 2006121612 A | 5/2006 |
| JP | 2007035028 A | 2/2007 |
| JP | 2008177738 A | 7/2008 |
| JP | 2008187615 A | 8/2008 |
| JP | 2008236726 A | 10/2008 |
| JP | 2009267923 A | 11/2009 |
| JP | 2009303010 A | 12/2009 |
| JP | 2010016416 A | 1/2010 |
| JP | 2010512049 A | 4/2010 |
| JP | 2010136224 A | 6/2010 |
| JP | 2010157925 A | 7/2010 |
| JP | 2010166281 A | 7/2010 |
| JP | 2010239317 A | 10/2010 |
| JP | 4649623 B2 | 3/2011 |
| JP | 2011097141 A | 5/2011 |
| JP | 2011101180 A | 5/2011 |
| JP | 2011120087 A | 6/2011 |
| JP | 2011120094 A | 6/2011 |
| JP | 2011146957 A | 7/2011 |
| JP | 2012080196 A | 4/2012 |

(56) References Cited

FOREIGN PATENT DOCUMENTS

| JP | 2012156885 A | 8/2012 |
|---|---|---|
| JP | 2012195660 A | 10/2012 |
| JP | 2012213137 A | 11/2012 |
| JP | 2013026734 A | 2/2013 |
| JP | 2013055610 A | 3/2013 |
| JP | 2013066142 A | 4/2013 |
| JP | 2013093875 A | 5/2013 |
| JP | 2013120254 A | 6/2013 |
| JP | 2013207327 A | 10/2013 |
| JP | 2013219708 A | 10/2013 |
| JP | 2013258444 A | 12/2013 |
| JP | 2013258510 A | 12/2013 |
| JP | 2014057256 A | 3/2014 |
| JP | 2014140246 A | 7/2014 |
| JP | 2014140247 A | 7/2014 |
| JP | 2014142836 A | 8/2014 |
| JP | 2014155033 A | 8/2014 |
| KR | 20100094200 A | 8/2010 |
| KR | 20150130186 A | 11/2015 |
| WO | 9746001 A1 | 12/1997 |
| WO | 0237830 A2 | 5/2002 |
| WO | 2004064391 A1 | 7/2004 |
| WO | 2008010559 A1 | 1/2008 |
| WO | 2009074938 A2 | 6/2009 |
| WO | 2009074938 A3 | 8/2009 |
| WO | 2014172059 A2 | 10/2014 |
| WO | 2015120873 A1 | 8/2015 |
| WO | 2015123455 A1 | 8/2015 |
| WO | 2015173565 A1 | 11/2015 |

OTHER PUBLICATIONS

Non-Final Office Action from U.S. Appl. No. 16/215,351, dated Jan. 24, 2019.
Supplemental Notice of Allowance for U.S. Appl. No. 15/254,964, dated Feb. 1, 2019.
Rivard et al., U.S. Appl. No. 16/290,763, filed Mar. 1, 2019.
Supplemental Notice of Allowance for U.S. Appl. No. 15/254,964, dated Mar. 11, 2019.
Rivard et al., U.S. Appl. No. 15/976,756, filed May 10, 2018.
Final Office Action for U.S. Appl. No. 15/636,324, dated Mar. 22, 2019.
Non-Final Office Action from U.S. Appl. No. 16/271,604, dated Apr. 5, 2019.
Notice of Allowance from U.S. Appl. No. 16/215,351, dated Apr. 1, 2019.
Rivard et al., U.S. Appl. No. 16/271,604, filed Feb. 8, 2019.
Non-Final Office Action for U.S. Appl. No. 15/636,324, dated Apr. 18, 2019.
Notice of Allowance from U.S. Appl. No. 15/891,251, dated May 7, 2019.
Notice of Allowance from U.S. Appl. No. 16/154,999, dated Jun. 7, 2019.
Corrected Notice of Allowance from U.S. Appl. No. 15/891,251, dated Jul. 3, 2019.
Notice of Allowance from U.S. Appl. No. 15/636,324, dated Jul. 2, 2019.
Notice of Allowance from U.S. Appl. No. 16/271,604, dated Jul. 2, 2019.
Non-Final Office Action for U.S. Appl. No. 15/976,756, dated Jun. 27, 2019.
Non-Final Office Action for U.S. Appl. No. 16/290,763, dated Jun. 26, 2019.
Rivard et al., U.S. Appl. No. 16/505,278, filed Jul. 8, 2019.
Rivard et al., U.S. Appl. No. 16/519,244, filed Jul. 23, 2019.
Notice of Allowance from U.S. Appl. No. 16/217,848, dated Jul. 31, 2019.
Corrected Notice of Allowance from U.S. Appl. No. 16/271,604, dated Aug. 8, 2019.
Corrected Notice of Allowance from U.S. Appl. No. 15/636,324, dated Aug. 20, 2019.
Office Action from Chinese Patent Application No. 201580079444. 1, dated Aug. 1, 2019.
Corrected Notice of Allowance from U.S. Appl. No. 15/636,324, dated Sep. 5, 2019.
Corrected Notice of Allowance from U.S. Appl. No. 16/271,604, dated Sep. 19, 2019.
Non-Final Office Action for U.S. Appl. No. 16/519,244, dated Sep. 23, 2019.
Corrected Notice of Allowance from U.S. Appl. No. 16/217,848, dated Sep. 24, 2019.
Examination Report from European Application No. 15 856 814.7, dated Aug. 20, 2019.
Examination Report from European Application No. 15 857 675.1, dated Aug. 23, 2019.
Examination Report from European Application No. 15 856 710.7, dated Sep. 9, 2019.
Examination Report from European Application No. 15 857 386.5, dated Sep. 17, 2019.
Examination Report from European Application No. 15 857 748.6, dated Sep. 26, 2019.
Rivard et al., U.S. Appl. No. 16/584,486, filed Sep. 26, 2019.
Notice of Allowance from U.S. Appl. No. 15/976,756, dated Oct. 4, 2019.
Notice of Allowance from U.S. Appl. No. 16/290,763, dated Oct. 10, 2019.
Corrected Notice of Allowance from U.S. Appl. No. 16/217,848, dated Oct. 31, 2019.
Non-Final Office Action for U.S. Appl. No. 16/213,041, dated Oct. 30, 2019.
Office Action from Japanese Patent Application No. 2017-544279, dated Oct. 23, 2019.
Office Action from Japanese Patent Application No. 2017-544280, dated Oct. 29, 2019.
Office Action from Japanese Patent Application No. 2017-544283, dated Oct. 29, 2019.
Office Action from Japanese Patent Application No. 2017-544547, dated Nov. 5, 2019.
Rivard et al., U.S. Appl. No. 16/662,965, filed Oct. 24, 2019.
Office Action from Japanese Patent Application No. 2017-544281, dated Nov. 26, 2019.
Extended European Search Report from European Application No. 16915389.7, dated Dec. 2, 2019.
Office Action from Japanese Patent Application No. 2017-544284, dated Dec. 10, 2019.
Feder et al., U.S. Appl. No. 16/684,389, filed Nov. 14, 2019.
Non-Final Office Action for U.S. Appl. No. 16/505,278, dated Jan. 10, 2020.
Notice of Allowance from U.S. Appl. No. 16/519,244, dated Jan. 14, 2020.
Office Action from Japanese Patent Application No. 2017-544282, dated Jan. 7, 2020.
Extended European Search Report from European Application No. 21196442.4, dated Dec. 13, 2021.
Huo et al., "Robust Automatic White Balance algorithm using Gray Color Points in Images," IEEE Transactions on Consumer Electronics, vol. 52, No. 2, May 2006, pp. 541-546.
Non-Final Office Action for U.S. Appl. No. 17/144,915, dated Aug. 13, 2021.
Office Action from Chinese Patent Application No. 201780053926. 9, dated Jan. 16, 2020.
Rivard et al., U.S. Appl. No. 16/796,497, filed Feb. 20, 2020.
Corrected Notice of Allowance from U.S. Appl. No. 16/519,244, dated Feb. 20, 2020.
Extended European Search Report from European Application No. 17821236.1, dated Jan. 24, 2020.
Petschnigg et al., "Digital Photography with Flash and No-Flash Image Pairs," ACM Transactions of Graphics, vol. 23, Aug. 2004, pp. 664-672.
Corrected Notice of Allowance from U.S. Appl. No. 16/519,244, dated Apr. 9, 2020.
Rivard et al., U.S. Appl. No. 16/857,016, filed Apr. 23, 2020.
International Preliminary Examination Report from PCT Application No. PCT/US2018/054014, dated Apr. 16, 2020.

(56) References Cited

OTHER PUBLICATIONS

Office Action from Chinese Patent Application No. 201680088945.0, dated May 21, 2020.
Notice of Allowance from U.S. Appl. No. 16/213,041, dated May 29, 2020.
Supplemental Notice of Allowance from U.S. Appl. No. 16/213,041, dated Jun. 17, 2020.
Non-Final Office Action for U.S. Appl. No. 16/857,016, dated Aug. 5, 2020.
Rivard, W. et al., U.S. Appl. No. 17/000,098, filed Aug. 21, 2020.
Office Action from Japanese Patent Application No. 2017-544284, dated Aug. 18, 2020.
International Search Report and Written Opinion from PCT Application No. PCT/US2020/040478, dated Sep. 25, 2020.
Notice of Allowance from U.S. Appl. No. 16/505,278, dated Sep. 25, 2020.
Supplemental Notice of Allowance from U.S. Appl. No. 16/213,041, dated Aug. 31, 2020.
Summons to Attend Oral Proceedings from European Application No. 15 856 710.7, dated Sep. 18, 2020.
Notice of Allowance from U.S. Appl. No. 16/584,486, dated Oct. 21, 2020.
Corrected Notice of Allowance from U.S. Appl. No. 16/505,278, dated Oct. 22, 2020.
Notice of Allowance from U.S. Appl. No. 16/684,389, dated Oct. 29, 2020.
Office Action from Japanese Patent Application No. 2017-544281, dated Oct. 27, 2020.
Office Action from Chinese Patent Application No. 201780053926.9, dated Oct. 13, 2020.
Corrected Notice of Allowance from U.S. Appl. No. 16/584,486, dated Nov. 18, 2020.
Corrected Notice of Allowance from U.S. Appl. No. 16/505,278, dated Nov. 18, 2020.
Corrected Notice of Allowance from U.S. Appl. No. 16/684,389, dated Nov. 27, 2020.
Office Action from Japanese Patent Application No. 2017-544280, dated Jun. 30, 2020.
Corrected Notice of Allowance from U.S. Appl. No. 16/505,278, dated Dec. 24, 2020.
Corrected Notice of Allowance from U.S. Appl. No. 16/584,486, dated Dec. 24, 2020.
Second Office Action from Chinese Patent Application No. 201680088945.0, dated Dec. 17, 2020.
Corrected Notice of Allowance from U.S. Appl. No. 16/684,389, dated Dec. 23, 2020.
Rivard et al., U.S. Appl. No. 17/144,915, filed Jan. 8, 2021.
Notice of Allowance from U.S. Appl. No. 16/857,016, dated Jan. 27, 2021.
Office Action from Japanese Patent Application No. 2017-544282, dated Jan. 5, 2021.
Office Action from Japanese Patent Application No. 2017-544283, dated Jan. 12, 2021.
Non-Final Office Action for U.S. Appl. No. 16/460,807, dated Aug. 20, 2020.
Corrected Notice of Allowance from U.S. Appl. No. 16/857,016, dated Feb. 16, 2021.
Feder et al., U.S. Appl. No. 17/171,800, filed Feb. 9, 2021.
Rivard et al., U.S. Appl. No. 17/163,086, filed Jan. 29, 2021.
Non-Final Office Action for U.S. Appl. No. 16/662,965, dated Mar. 22, 2021.
Decision to Refuse from European Application No. 15856710.7, dated Mar. 15, 2021.
Examination Report from Indian Application No. 201827049041, dated Mar. 19, 2021.
Decision to Refuse from European Application No. 15856212.4, dated Mar. 22, 2021.
Final Office Action for U.S. Appl. No. 16/460,807, dated Mar. 1, 2021.
Corrected Notice of Allowance from U.S. Appl. No. 16/857,016, dated Apr. 13, 2021.
Examination Report from European Application No. 16915389.7, dated Feb. 25, 2021.
Examination Report from European Application No. 15857386.5, dated Feb. 8, 2021.
Notice of Allowance from U.S. Appl. No. 13/573,252, dated Oct. 22, 2014.
Non-Final Office Action from U.S. Appl. No. 13/573,252, dated Jul. 10, 2014.
Rivard, W. et al., U.S. Appl. No. 14/568,045, filed Dec. 11, 2014.
Restriction Requirement from U.S. Appl. No. 14/568,045, dated Jan. 15, 2015.
Rivard, W. et al., U.S. Appl. No. 14/534,068, filed Nov. 5, 2014.
Non-Final Office Action from U.S. Appl. No. 14/534,068, dated Feb. 17, 2015.
Feder et al., U.S. Appl. No. 13/999,678, filed Mar. 14, 2014.
Rivard, W. et al., U.S. Appl. No. 14/534,079, filed Nov. 5, 2014.
Non-Final Office Action from U.S. Appl. No. 14/534,079, dated Jan. 29, 2015.
Rivard, W. et al., U.S. Appl. No. 14/534,089, filed Nov. 5, 2014.
Non-Final Office Action from U.S. Appl. No. 14/534,089, dated Feb. 25, 2015.
Rivard, W. et al., U.S. Appl. No. 14/535,274, filed Nov. 6, 2014.
Non-Final Office Action from U.S. Appl. No. 14/535,274, dated Feb. 3, 2015.
Rivard, W. et al., U.S. Appl. No. 14/535,279, filed Nov. 6, 2014.
Non-Final Office Action from U.S. Appl. No. 14/535,279, dated Feb. 5, 2015.
Rivard, W. et al., U.S. Appl. No. 14/535,282, filed Nov. 6, 2014.
Non-Final Office Action from U.S. Appl. No. 14/535,282, dated Jan. 30, 2015.
Non-Final Office Action from U.S. Appl. No. 14/536,524, dated Mar. 3, 2015.
Rivard, W. et al., U.S. Appl. No. 14/536,524, filed Nov. 7, 2014.
Non-Final Office Action from U.S. Appl. No. 14/568,045, dated Mar. 24, 2015.
Rivard, W. et al., U.S. Appl. No. 14/702,549, filed May 1, 2015.
Notice of Allowance from U.S. Appl. No. 14/534,079, dated May 11, 2015.
Notice of Allowance from U.S. Appl. No. 14/535,274, dated May 26, 2015.
Notice of Allowance from U.S. Appl. No. 14/534,089, dated Jun. 23, 2015.
Notice of Allowance from U.S. Appl. No. 14/535,282, dated Jun. 23, 2015.
Notice of Allowance from U.S. Appl. No. 14/536,524, dated Jun. 29, 2015.
Notice of Allowance from U.S. Appl. No. 14/534,068, dated Jul. 29, 2015.
Notice of Allowance from U.S. Appl. No. 14/535,279, dated Aug. 31, 2015.
Final Office Action from U.S. Appl. No. 14/568,045, dated Sep. 18, 2015.
Non-Final Office Action from U.S. Appl. No. 13/999,678, dated Aug. 12, 2015.
International Search Report and Written Opinion from International Application No. PCT/US15/59348, dated Feb. 2, 2016.
International Search Report and Written Opinion from International Application No. PCT/US15/59097, dated Jan. 4, 2016.
Non-Final Office Action from U.S. Appl. No. 14/702,549, dated Jan. 25, 2016.
Final Office Action from U.S. Appl. No. 13/999,678, dated Mar. 28, 2016.
International Search Report and Written Opinion from International Application No. PCT/US2015/060476, dated Feb. 10, 2016.
Notice of Allowance from U.S. Appl. No. 14/568,045, dated Apr. 26, 2016.
International Search Report and Written Opinion from International Application No. PCT/US2015/058895, dated Apr. 11, 2016.
Notice of Allowance from U.S. Appl. No. 14/568,045, dated Jan. 12, 2016.

(56) References Cited

OTHER PUBLICATIONS

International Search Report and Written Opinion from International Application No. PCT/US2015/059103, dated Dec. 21, 2015.
Final Office Action from U.S. Appl. No. 14/178,305, dated May 18, 2015.
Non-Final Office Action from U.S. Appl. No. 14/178,305, dated Aug. 11, 2014.
Non-Final Office Action from U.S. Appl. No. 14/823,993, dated Jul. 28, 2016.
International Search Report and Written Opinion from International Application No. PCT/US2015/059105, dated Jul. 26, 2016.
Notice of Allowance from U.S. Appl. No. 14/702,549, dated Aug. 15, 2016.
International Search Report and Written Opinion from International Application No. PCT/US2015/058896, dated Aug. 26, 2016.
International Search Report and Written Opinion from International Application No. PCT/US2015/058891, dated Aug. 26, 2016.
International Search Report and Written Opinion from International Application No. PCT/US2016/050011, dated Nov. 10, 2016.
Final Office Action from U.S. Appl. No. 14/823,993, dated Feb. 10, 2017.
Non-Final Office Action from U.S. Appl. No. 15/354,935, dated Feb. 8, 2017.
Non-Final Office Action from U.S. Appl. No. 13/999,678, dated Dec. 20, 2016.
Final Office Action for U.S. Appl. No. 16/662,965, dated Sep. 3, 2021.
Office Action from Chinese Patent Application No. 202010904659.5, dated Jul. 28, 2021.
Extended European Search Report from European Application No. 21175832.1, dated Aug. 27, 2021.
Examination Report from Indian Application No. 201927010939, dated Jun. 9, 2021.
Notice of Allowance from U.S. Appl. No. 17/144,915, dated Feb. 10, 2022.
Notice of Allowance from U.S. Appl. No. 16/662,965, dated Mar. 1, 2022.
Examination Report from European Application No. 15857386.5, dated Dec. 12, 2021.
Notice of Final Rejection from Japanese Patent Application No. 2017-544282, dated Mar. 1, 2022.
Rivard et al., U.S. Appl. No. 17/694,458, filed Mar. 14, 2022.
Decision for Rejection and Decision of Dismissal of Amendment for Japanese Application No. 2017-544280, dated May 25, 2021.
Extended European Search Report from European Application No. 18864431.4, dated Jun. 1, 2021.
Kaufman et al., "Content-Aware Automatic Photo Enhancemen," Computer Graphics Forum, vol. 31, No. 08, 2012, pp. 2528-2540.
Battiato et al., "Automatic Image Enhancement by Content Dependent Exposure Correction," EURASIP Journal on Applied Signal Processing, 2004, pp. 1849-1860.
Mangiat et al., "Automatic scene relighting for video conferencing," IEEE 16th Annual International Conference on Image Processing (ICIP), Nov. 2009, pp. 2781-2784.
Weyrich et al., "Analysis of human faces using a measurement-based skin reflectance model," ACM Transactions on Graphics, vol. 25, No. 3, 2006, pp. 1013-1024.
Extended European Search Report from European Application No. 21169039.1, dated Jun. 16, 2021.
Office Action from Japanese Patent Application No. 2017-544284, dated Jul. 13, 2021.
Wan et al., "CMOS Image Sensors With Multi-Bucket Pixels for Computational Photography," IEEE Journal of Solid-State Circuits, vol. 47, No. 4, Apr. 2012, pp. 1031-1042.
Notice of Allowance from U.S. Appl. No. 15/201,283, dated Mar. 23, 2017.
Chatterjee et al., "Clustering-Based Denoising With Locally Learned Dictionaries," IEEE Transactions on Image Processing, vol. 18, No. 7, Jul. 2009, pp. 1-14.
Burger et al., "Image denoising: Can plain Neural Networks compete with BM3D?," Computer Vision and Pattern Recognition (CVPR), IEEE, 2012, pp. 4321-4328.
Kervann et al., "Optimal Spatial Adaptation for Patch-Based Image Denoising," IEEE Transactions on Image Processing, vol. 15, No. 10, Oct. 2006, pp. 2866-2878.
Foi et al., "Practical Poissonian-Gaussian noise modeling and fitting for single-image raw-data," IEEE Transactions, 2007, pp. 1-18.
International Search Report and Written Opinion from PCT Application No. PCT/US17/39946, dated Sep. 25, 2017.
Notice of Allowance from U.S. Appl. No. 15/201,283, dated Jul. 19, 2017.
Notice of Allowance from U.S. Appl. No. 15/354,935, dated Aug. 23, 2017.
Notice of Allowance from U.S. Appl. No. 14/823,993, dated Oct. 31, 2017.
Notice of Allowance from U.S. Appl. No. 15/352,510, dated Oct. 17, 2017.
European Office Communication and Exam Report from European Application No. 15856814.7, dated Dec. 14, 2017.
Supplemental Notice of Allowance from U.S. Appl. No. 15/354,935, dated Dec. 1, 2017.
European Office Communication and Exam Report from European Application No. 15856267.8, dated Dec. 12, 2017.
European Office Communication and Exam Report from European Application No. 15856710.7, dated Dec. 21, 2017.
European Office Communication and Exam Report from European Application No. 15857675.1, dated Dec. 21, 2017.
European Office Communication and Exam Report from European Application No. 15856212.4, dated Dec. 15, 2017.
Non-Final Office Action from U.S. Appl. No. 15/254,964, dated Jan. 3, 2018.
Non-Final Office Action from U.S. Appl. No. 15/643,311, dated Jan. 4, 2018.
European Office Communication and Exam Report from European Application No. 15857386.5, dated Jan. 11, 2018.
Kim et al., "A CMOS Image Sensor Based on Unified Pixel Architecture With Time-Division Multiplexing Scheme for Color and Depth Image Acquisition," IEEE Journal of Solid-State Circuits, vol. 47, No. 11, Nov. 2012, pp. 2834-2845.
European Office Communication and Exam Report from European Application No. 15857748.6, dated Jan. 10, 2018.
Non-Final Office Action from U.S. Appl. No. 15/814,238, dated Feb. 8, 2018.
Non-Final Office Action for U.S. Appl. No. 15/687,278, dated Apr. 13, 2018.
Non-Final Office Action from U.S. Appl. No. 15/836,655, dated Apr. 6, 2018.
Notice of Allowance from U.S. Appl. No. 15/836,655, dated Apr. 30, 2018.
Rivard, W. et al., U.S. Appl. No. 15/891,251, filed Feb. 7, 2018.
Rivard et al., U.S. Appl. No. 14/823,993, filed Aug. 11, 2015.
Rivard et al., U.S. Appl. No. 14/536,524, filed Nov. 7, 2014.
Extended European Search Report from European Application No. 15891394.7 dated Jun. 19, 2018.
Non-Final Office Action for U.S. Appl. No. 15/885,296, dated Jun. 4, 2018.
Non-Final Office Action for U.S. Appl. No. 15/891,251, dated May 31, 2018.
Notice of Allowance from U.S. Appl. No. 15/687,278, dated Aug. 24, 2018.
Final Office Action for U.S. Appl. No. 15/643,311 dated Jul. 24, 2018.
Notice of Allowance for U.S. Appl. No. 15/885,296 dated Sep. 21, 2018.
Final Office Action for U.S. Appl. No. 15/254,964 dated Jul. 24, 2018.
Notice of Allowance for U.S. Appl. No. 15/814,238 dated Oct. 4, 2018.
Corrected Notice of Allowance for U.S. Appl. No. 15/885,296 dated Oct. 16, 2018.
Rivard et al., U.S. Appl. No. 16/154,999, filed Oct. 9, 2018.

(56) References Cited

OTHER PUBLICATIONS

Non-Final Office Action for U.S. Appl. No. 15/636,324, dated Oct. 18, 2018.
Notice of Allowance for U.S. Appl. No. 15/643,311, dated Oct. 31, 2018.
Corrected Notice of Allowance for U.S. Appl. No. 15/814,238 dated Nov. 13, 2018.
Final Office Action for U.S. Appl. No. 15/891,251, dated Nov. 29, 2018.
Rivard et al., U.S. Appl. No. 16/215,351, filed Dec. 10, 2018.
Rivard et al., U.S. Appl. No. 16/213,041, filed Dec. 7, 2018.
Non-Final Office Action for U.S. Appl. No. 16/154,999, dated Dec. 20, 2018.
Notice of Allowance for U.S. Appl. No. 15/254,964, dated Dec. 21, 2018.
Supplemental Notice of Allowance for U.S. Appl. No. 15/643,311, dated Dec. 11, 2018.
Feder et al., U.S. Appl. No. 16/217,848, filed Dec. 12, 2018.
International Preliminary Examination Report from PCT Application No. PCT/US2017/39946, dated Jan. 10, 2019.
Non-Final Office Action for U.S. Appl. No. 17/163,086, dated Oct. 13, 2021.
Non-Final Office Action for U.S. Appl. No. 17/000,098, dated Dec. 7, 2021.
Non-Final Office Action for U.S. Appl. No. 16/796,497, dated Dec. 8, 2021.
Notice of Allowance from U.S. Appl. No. 17/163,086, dated Mar. 21, 2022.
Examination Report from Indian Application No. 201927010939, dated Mar. 25, 2022.
Examination Report from Indian Application No. 202027018945, dated Mar. 17, 2022.
Rivard et al., U.S. Appl. No. 17/745,668, filed May 16, 2022.
Rivard et al., U.S. Appl. No. 17/749,919, filed May 20, 2022.
Notice of Allowance from U.S. Appl. No. 16/796,497, dated May 26, 2022.
Rivard et al., U.S. Appl. No. 17/835,823, filed Jun. 8, 2022.
Rivard et al., U.S. Appl. No. 17/857,906, filed Jul. 5, 2022.
Rivard et al., U.S. Appl. No. 17/874,086, filed Jul. 26, 2022.
Office Action from Japanese Patent Application No. 2021-076679, dated Aug. 2, 2022.
Office Action from Japanese Patent Application No. 2021-079285, dated Aug. 2, 2022.
Non-Final Office Action for U.S. Appl. No. 17/171,800, dated Aug. 18, 2022.
Final Office Action for U.S. Appl. No. 17/000,098, dated Aug. 25, 2022.
Office Action from Japanese Patent Application No. 2021-096499, dated Sep. 6, 2022.
Office Action from Japanese Patent Application No. 2021-154653, dated Sep. 13, 2022.
Office Action from Chinese Patent Application No. 202110773625.1, dated Nov. 2, 2022.
Examination Report from European Application No. 15 857 386.5, dated Jan. 3, 2023.
Non-Final Office Action for U.S. Appl. No. 17/749,919, dated Feb. 16, 2023.
Non-Final Office Action for U.S. Appl. No. 17/857,906, dated Feb. 9, 2023.
Notice of Allowance from U.S. Appl. No. 17/694,458, dated Mar. 1, 2023.
Non-Final Office Action for U.S. Appl. No. 17/000,098, dated Apr. 11, 2023.
Non-Final Office Action for U.S. Appl. No. 17/835,823, dated Apr. 18, 2023.
Notice of Allowance from U.S. Appl. No. 17/171,800, dated May 26, 2023.
Decision for Rejection from Japanese Patent Application No. 2021-154653, dated May 23, 2023.
Second Office Action from Chinese Patent Application No. 202110773625.1, dated May 7, 2023.
Examination Report from European Application No. 18864431.4, dated Apr. 21, 2023.
Decision for Rejection from Japanese Patent Application No. 2021-076679, dated Jun. 6, 2023.
Non-Final Office Action for U.S. Appl. No. 17/745,668, dated Jun. 8, 2023.
Canon, "Canon EOS 7D Mark II," Canon User Manual, 2014, 548 pages.
Canon, "Canon EOS 1200D," Canon User Manual, 2014, 342 pages.
Canon, "Canon PowerShot G1 X Mark II," Canon User Manual, 2014, 240 pages.
Canon, "Canon Powershot G7 X," Canon User Manual, 2014, 202 pages.
Canon, "Canon PowerShot S200," Canon User Manual, 2013, 183 pages.
Canon, "Canon PowerShot SX60 HS," Canon User Manual, 2014, 203 pages.
Canon, "Canon PowerShot SX520 HS," Canon User Manual, 2014, 139 pages.
Final Office Action for U.S. Appl. No. 17/749,919, dated Sep. 11, 2023.
Final Office Action for U.S. Appl. No. 17/857,906, dated Sep. 11, 2023.
Non-Final Office Action for U.S. Appl. No. 17/171,800, dated Oct. 4, 2023.
Final Office Action for U.S. Appl. No. 17/835,823, dated Nov. 14, 2023.
Wang et al., "A High Dynamic Range CMOS APS Image Sensor," Semantic Scholar, 2001, pp. 1-4, retrived from https://www.semanticscholar.org/paper/A-High-Dynamic-Range-CMOS-APS-Image-Sensor-Wang/a824e97836438887089a3c62f4d9be77d47c9067.
Bock et al., "A Wide-VGA CMOS Image Sensor with Global Shutter and Extended Dynamic Range," International Image Sensor Society, 2005, pp. 222-225, retrieved from https://www.imagesensors.org/Past%20Workshops/2005%20Workshop/2005%20Papers/56%20Bock%20et%20al.pdf>.
Micron, "1/3-Inch, Wide-VGA CMOS Digital Image Sensor," Micron Technology, 2006, 15 pages, retrieved from https://media.digikey.com/pdf/Data%20Sheets/Micron%20Technology%20Inc%20PDFs/MT9V022.pdf.
NEO Film School, "A Final Nail in the Coffin of Film Cinematography!" Neo Film School Blog, Mar. 7, 2011, 4 pages, retrieved from https://neofilmschool.wordpress.com/2011/03/07/a-final-nail-in-the-coffin-of-film-cinematography/.
CMOSIS, "CMOSIS Outlining Low Noise/High Dynamic Image Sensor Concept," Photonics Online, Nov. 29, 2010, 1 page, retrieved from https://www.photonicsonline.com/doc/cmosis-outlining-low-noisehigh-dynamic-image-0001?VNETCOOKIE=NO.
Koifman et al., "Image Sensors World," Blog, Dec. 30, 2010, 62 pages, retrieved from http://image-sensors-world.blogspot.com/2010/.

IMAGE SENSOR APPARATUS AND METHOD FOR OBTAINING MULTIPLE EXPOSURES WITH ZERO INTERFRAME TIME

RELATED APPLICATIONS

The present application is a continuation of, and claims priority to U.S. patent application Ser. No. 16/857,016, entitled "IMAGE SENSOR APPARATUS AND METHOD FOR OBTAINING MULTIPLE EXPOSURES WITH ZERO INTERFRAME TIME," filed Apr. 23, 2020, which in turn is a continuation of, and claims priority to U.S. patent application Ser. No. 16/519,244, entitled "IMAGE SENSOR APPARATUS AND METHOD FOR OBTAINING MULTIPLE EXPOSURES WITH ZERO INTERFRAME TIME," filed Jul. 23, 2019, now U.S. Pat. No. 10,652,478, which in turn is a continuation of, and claims priority to U.S. patent application Ser. No. 15/891,251, entitled "IMAGE SENSOR APPARATUS AND METHOD FOR OBTAINING MULTIPLE EXPOSURES WITH ZERO INTERFRAME TIME," filed Feb. 7, 2018, now U.S. Pat. No. 10,382,702, which in turn, is a continuation of, and claims priority to U.S. patent application Ser. No. 14/823,993, entitled "IMAGE SENSOR APPARATUS AND METHOD FOR OBTAINING MULTIPLE EXPOSURES WITH ZERO INTERFRAME TIME," filed Aug. 11, 2015, now U.S. Pat. No. 9,918,017. The foregoing applications and/or patents are herein incorporated by reference in its entirety for all purposes.

U.S. patent application Ser. No. 14/823,993 is a continuation-in-part of, and claims priority to U.S. patent application Ser. No. 14/534,079, now U.S. Pat. No. 9,137,455, entitled "IMAGE SENSOR APPARATUS AND METHOD FOR OBTAINING MULTIPLE EXPOSURES WITH ZERO INTERFRAME TIME," filed Nov. 5, 2014. The foregoing application and/or patent is herein incorporated by reference in its entirety for all purposes.

Additionally, U.S. patent application Ser. No. 14/823,993 is a continuation-in-part of, and claims priority to U.S. patent application Ser. No. 14/568,045, now U.S. Pat. No. 9,406,147, entitled "COLOR BALANCE IN DIGITAL PHOTOGRAPHY," filed on Dec. 11, 2014, which is a continuation of U.S. patent application Ser. No. 13/573,252, now U.S. Pat. No. 8,976,264, entitled "COLOR BALANCE IN DIGITAL PHOTOGRAPHY," filed Sep. 4, 2012. The foregoing applications and/or patents are herein incorporated by reference in their entirety for all purposes.

Additionally, U.S. patent application Ser. No. 14/823,993 is a continuation-in-part of, and claims priority to U.S. patent application Ser. No. 14/534,068, now U.S. Pat. No. 9,167,174, entitled "SYSTEMS AND METHODS FOR HIGH-DYNAMIC RANGE IMAGES," filed on Nov. 5, 2014. The foregoing application and/or patent is herein incorporated by reference in its entirety for all purposes.

Additionally, U.S. patent application Ser. No. 14/823,993 is a continuation-in-part of, and claims priority to U.S. patent application Ser. No. 14/534,089, now U.S. Pat. No. 9,167,169, entitled "IMAGE SENSOR APPARATUS AND METHOD FOR SIMULTANEOUSLY CAPTURING MULTIPLE IMAGES," filed Nov. 5, 2014. The foregoing application and/or patent is herein incorporated by reference in its entirety for all purposes.

Additionally, U.S. patent application Ser. No. 14/823,993 is a continuation-in-part of, and claims priority to U.S. patent application Ser. No. 14/535,274, now U.S. Pat. No. 9,154,708, entitled "IMAGE SENSOR APPARATUS AND METHOD FOR SIMULTANEOUSLY CAPTURING FLASH AND AMBIENT ILLUMINATED IMAGES," filed Nov. 6, 2014. The foregoing application and/or patent is herein incorporated by reference in its entirety for all purposes.

Additionally, U.S. patent application Ser. No. 14/823,993 is a continuation-in-part of, and claims priority to U.S. patent application Ser. No. 14/535,279, now U.S. Pat. No. 9,179,085, entitled "IMAGE SENSOR APPARATUS AND METHOD FOR OBTAINING LOW-NOISE, HIGH-SPEED CAPTURES OF A PHOTOGRAPHIC SCENE" filed Nov. 6, 2014. The foregoing application and/or patent is herein incorporated by reference in its entirety for all purposes.

Additionally, U.S. patent application Ser. No. 14/823,993 is a continuation-in-part of, and claims priority to U.S. patent application Ser. No. 14/535,282, now U.S. Pat. No. 9,179,062, entitled "SYSTEMS AND METHODS FOR PERFORMING OPERATIONS ON PIXEL DATA" filed Nov. 6, 2014. The foregoing application and/or patent is herein incorporated by reference in its entirety for all purposes.

Additionally, U.S. patent application Ser. No. 14/823,993 is a continuation-in-part of, and claims priority to U.S. patent application Ser. No. 14/536,524, now U.S. Pat. No. 9,160,936, entitled "SYSTEMS AND METHODS FOR GENERATING A HIGH-DYNAMIC RANGE (HDR) PIXEL STREAM," filed Nov. 7, 2014. The foregoing application and/or patent is herein incorporated by reference in its entirety for all purposes.

Additionally, U.S. patent application Ser. No. 14/823,993 is a continuation-in-part of, and claims priority to U.S. patent application Ser. No. 14/702,549, now U.S. Pat. No. 9,531,961, entitled "SYSTEMS AND METHODS FOR GENERATING A DIGITAL IMAGE USING SEPARATE COLOR AND INTENSITY DATA," filed May 1, 2015. The foregoing application and/or patent is herein incorporated by reference in its entirety for all purposes.

This application is related to the following which is incorporated herein by reference in its entirety for all purposes: U.S. patent application Ser. No. 13/999,678, now U.S. Pat. No. 9,807,322, filed Mar. 14, 2014, entitled "SYSTEMS AND METHODS FOR DIGITAL IMAGE SENSOR."

FIELD OF THE INVENTION

The present invention relates to photographic systems, and more particularly to an image sensor apparatus and method for obtaining multiple exposures with zero interframe time.

BACKGROUND

Traditional digital photography systems are inherently limited by the dynamic range of a capturing image sensor. One solution to such limitation is the use of high dynamic-range (HDR) photography. HDR photography involves capturing multiple exposures of a same scene, where each of the exposures is metered differently, and then merging the multiple captures to create an image with a larger dynamic range.

SUMMARY

A system, method, and computer program product are provided for obtaining multiple exposures with zero interframe time. In use, an analog signal associated with an image associated with an image of an image sensor is received. Amplified analog signals associated with the image are generated by amplifying the analog signal utilizing gains. The amplified analog signals are transmitted to analog-to-digital converter circuits. The amplified analog signals are converted to digital signals utilizing the analog-to-digital converter circuits. The digital signals are combined to create a high dynamic range (HDR) image.

DETAILED DESCRIPTION

Figure 1:
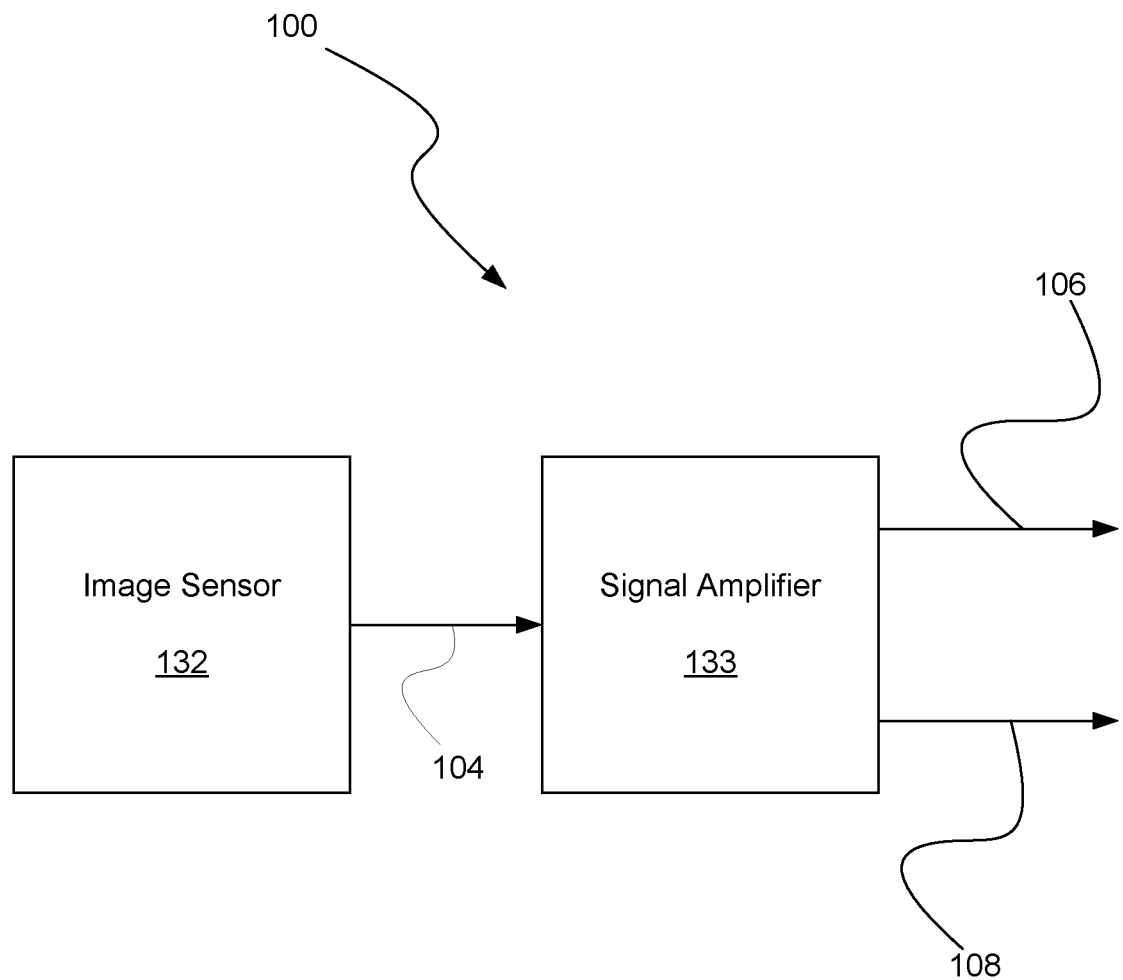
FIG. 1 illustrates an exemplary system for obtaining multiple exposures with zero interframe time, in accordance with one possible embodiment.

FIG. 1 illustrates a system 100 for obtaining multiple exposures with zero interframe time, in accordance with one possible embodiment. As an option, the system 100 may be implemented in the context of any of the Figures disclosed herein. Of course, however, the system 100 may be implemented in any desired environment. Further, the aforementioned definitions may equally apply to the description below.

As shown, a signal amplifier 133 receives an analog signal 104 from an image sensor 132. In response to receiving the analog signal 104, the signal amplifier 133 amplifies the analog signal 104 utilizing a first gain, and transmits a first amplified analog signal 106. Further, in response to receiving the analog signal 104, the signal amplifier 133 also amplifies the analog signal 104 utilizing a second gain, and transmits a second amplified analog signal 108.

In one specific embodiment, the analog signal 106 and the analog signal 108 are transmitted on a common electrical interconnect. In alternative embodiments, the analog signal 106 and the analog signal 108 are transmitted on different electrical interconnects.

In one embodiment, the analog signal 104 generated by image sensor 132 includes an electronic representation of an optical image that has been focused on the image sensor 132. In such an embodiment, the optical image may be focused on the image sensor 132 by a lens. The electronic representation of the optical image may comprise spatial color intensity information, which may include different color intensity samples (e.g. red, green, and blue light, etc.). In other embodiments, the spatial color intensity information may also include samples for white light. In one embodiment, the optical image may be an optical image of a photographic scene.

In one embodiment, the image sensor 132 may comprise a complementary metal oxide semiconductor (CMOS) image sensor, or charge-coupled device (CCD) image sensor, or any other technically feasible form of image sensor.

In an embodiment, the signal amplifier 133 may include a transimpedance amplifier (TIA), which may be dynamically configured, such as by digital gain values, to provide a selected gain to the analog signal 104. For example, a TIA could be configured to apply a first gain to the analog signal. The same TIA could then be configured to subsequently apply a second gain to the analog signal. In other embodiments, the gain may be specified to the signal amplifier 133 as a digital value. Further, the specified gain value may be based on a specified sensitivity or ISO. The specified sensitivity may be specified by a user of a photographic system, or instead may be set by software or hardware of the photographic system, or some combination of the foregoing working in concert.

In one embodiment, the signal amplifier 133 includes a single amplifier. In such an embodiment, the amplified analog signals 106 and 108 are transmitted or output in sequence. For example, in one embodiment, the output may occur through a common electrical interconnect. For example, the amplified analog signal 106 may first be transmitted, and then the amplified analog signal 108 may subsequently be transmitted. In another embodiment, the signal amplifier 133 may include a plurality of amplifiers. In such an embodiment, the amplifier 133 may transmit the amplified analog signal 106 in parallel with the amplified analog signal 108. To this end, the analog signal 106 may be amplified utilizing the first gain in serial with the amplification of the analog signal 108 utilizing the second gain, or the analog signal 106 may be amplified utilizing the first gain in parallel with the amplification of the analog signal 108 utilizing the second gain. In one embodiment, the amplified analog signals 106 and 108 each include gain-adjusted analog pixel data.

Each instance of gain-adjusted analog pixel data may be converted to digital pixel data by subsequent processes and/or hardware. For example, the amplified analog signal 106 may subsequently be converted to a first digital signal comprising a first set of digital pixel data representative of the optical image that has been focused on the image sensor 132. Further, the amplified analog signal 108 may subsequently or concurrently be converted to a second digital signal comprising a second set of digital pixel data representative of the optical image that has been focused on the image sensor 132. In one embodiment, any differences between the first set of digital pixel data and the second set of digital pixel data are a function of a difference between the first gain and the second gain applied by the signal amplifier 133. Further, each set of digital pixel data may include a digital image of the photographic scene. Thus, the amplified analog signals 106 and 108 may be used to generate two different digital images of the photographic scene. Furthermore, in one embodiment, each of the two different digital images may represent a different exposure level.

Figure 2:
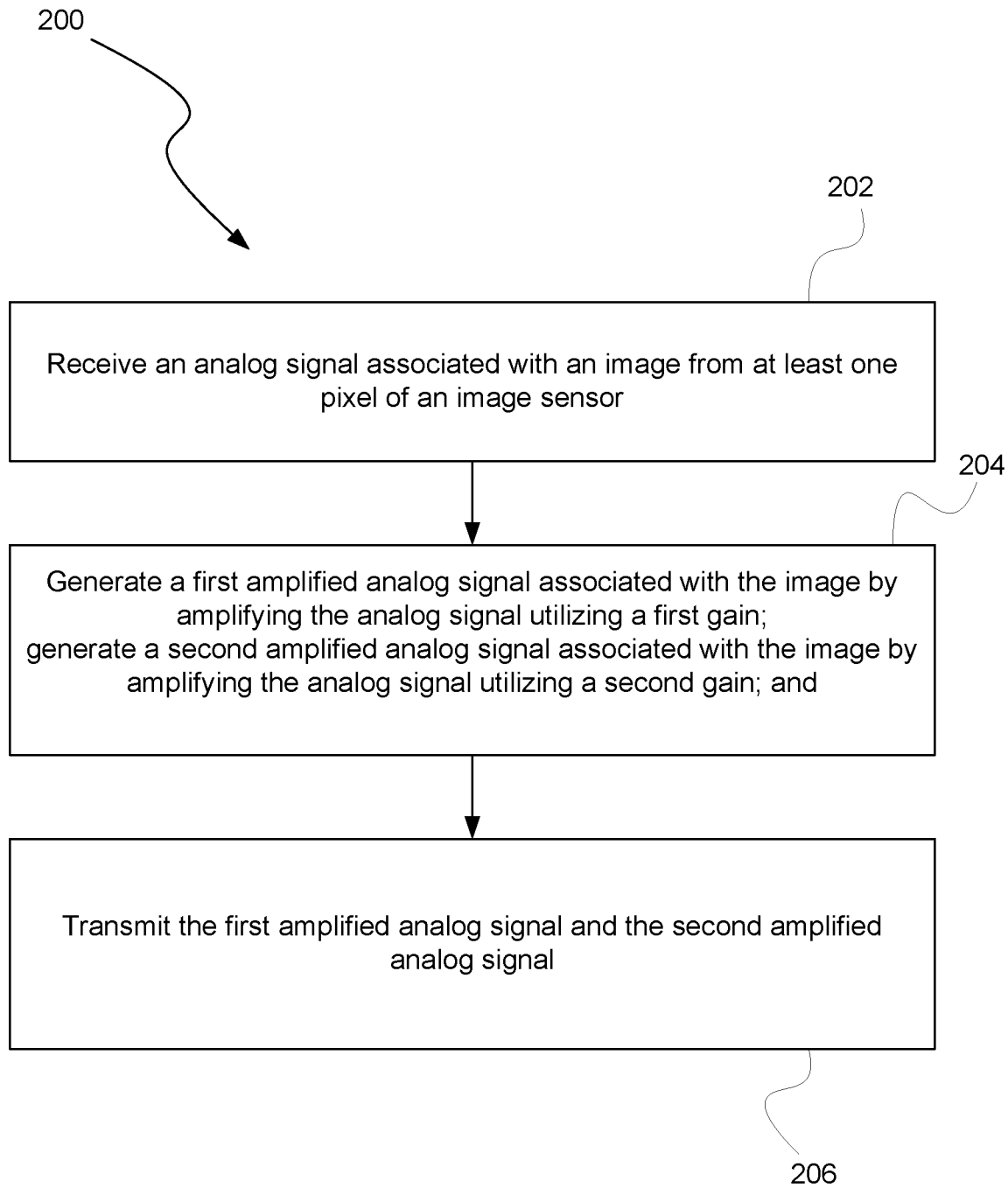
FIG. 2 illustrates an exemplary method carried out for obtaining multiple exposures with zero interframe time, in accordance with one embodiment.

FIG. 2 illustrates a method 200 for obtaining multiple exposures with zero interframe time, in accordance with one embodiment. As an option, the method 200 may be carried out in the context of any of the Figures disclosed herein. Of course, however, the method 200 may be carried out in any desired environment. Further, the aforementioned definitions may equally apply to the description below.

As shown in operation 202, an analog signal associated with an image is received from at least one pixel of an image sensor. In the context of the present embodiment, the analog signal may include analog pixel data for at least one pixel of an image sensor. In one embodiment, the analog signal may include analog pixel data for every pixel of an image sensor. In another embodiment, each pixel of an image sensor may include a plurality of photodiodes. In such an embodiment, the analog pixel data received in the analog signal may include an analog value for each photodiode of each pixel of the image sensor. Each analog value may be representative of a light intensity measured at the photodiode associated with the analog value. Accordingly, an analog signal may be a set of spatially discrete intensity samples, each represented by continuous analog values, and analog pixel data may be analog signal values associated with one or more given pixels.

Additionally, as shown in operation 204, a first amplified analog signal associated with the image is generated by amplifying the analog signal utilizing a first gain, and a second amplified analog signal associated with the image is generated by amplifying the analog signal utilizing a second gain. Accordingly, the analog signal is amplified utilizing both the first gain and the second gain, resulting in the first amplified analog signal and the second amplified analog signal, respectively. In one embodiment, the first amplified analog signal may include first gain-adjusted analog pixel data. In such an embodiment, the second amplified analog signal may include second gain-adjusted analog pixel data. In accordance with one embodiment, the analog signal may be amplified utilizing the first gain simultaneously with the amplification of the analog signal utilizing the second gain. In another embodiment, the analog signal may be amplified utilizing the first gain during a period of time other than when the analog signal is amplified utilizing the second gain. For example, the first gain and the second gain may be applied to the analog signal in sequence. In one embodiment, a sequence for applying the gains to the analog signal may be predetermined.

Further, as shown in operation 206, the first amplified analog signal and the second amplified analog signal are both transmitted, such that multiple amplified analog signals are transmitted based on the analog signal associated with the image. In the context of one embodiment, the first amplified analog signal and the second amplified analog signal are transmitted in sequence. For example, the first amplified analog signal may be transmitted prior to the second amplified analog signal. In another embodiment, the first amplified analog signal and the second amplified signal may be transmitted in parallel.

The embodiments disclosed herein advantageously enable a camera module to sample images comprising an image stack with lower (e.g. at or near zero, etc.) inter-sample time (e.g. interframe, etc.) than conventional techniques. In certain embodiments, images comprising the image stack are effectively sampled during overlapping time intervals, which may reduce inter-sample time to zero. In other embodiments, the camera module may sample images in coordination with the strobe unit to reduce inter-sample time between an image sampled without strobe illumination and an image sampled with strobe illumination.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3A:
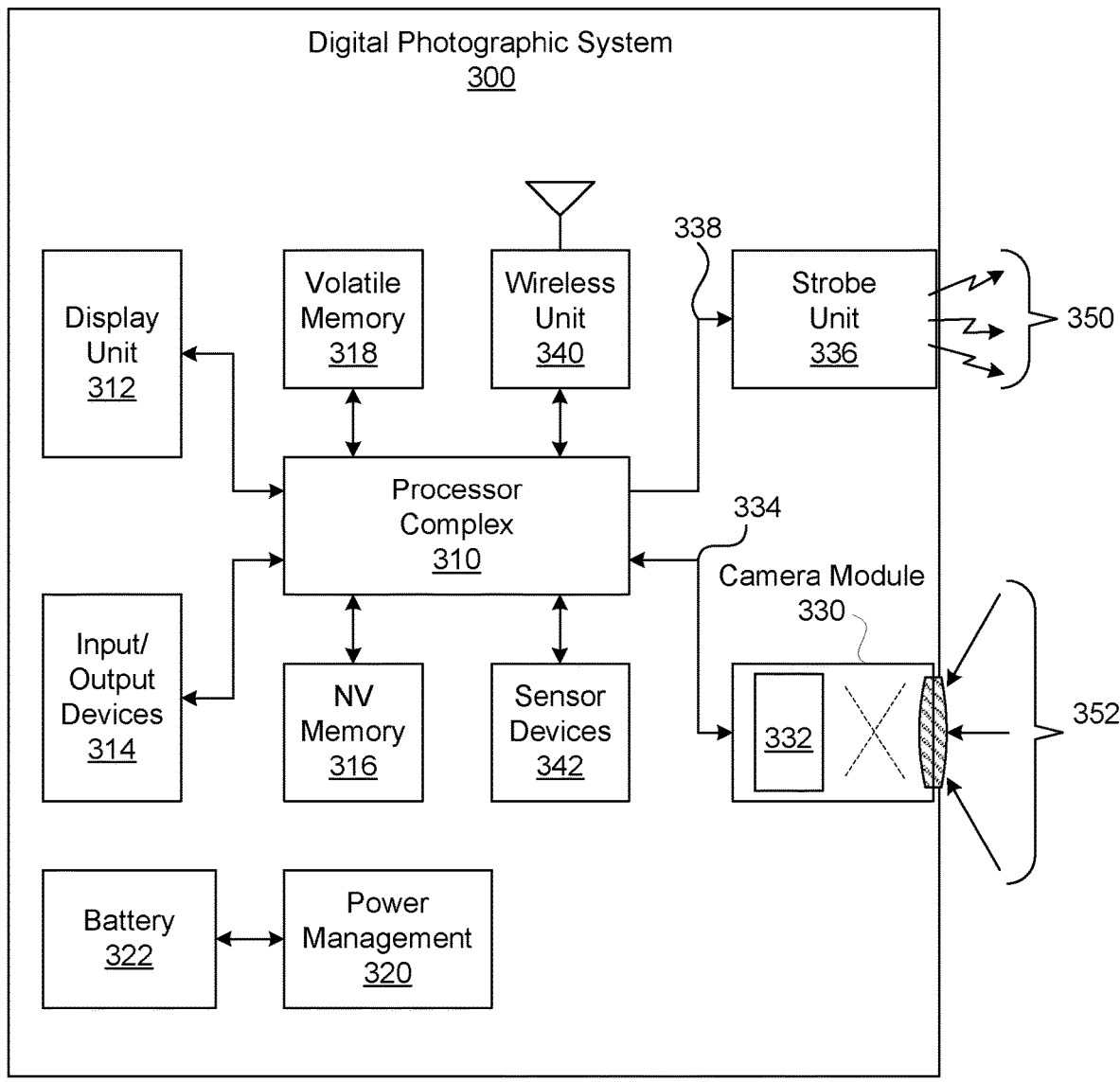
FIG. 3A illustrates a digital photographic system configured to obtain multiple exposures with zero interframe time, in accordance with an embodiment.

FIG. 3A illustrates a digital photographic system 300, in accordance with one embodiment. As an option, the digital photographic system 300 may be implemented in the context of the details of any of the Figures disclosed herein. Of course, however, the digital photographic system 300 may be implemented in any desired environment. Further, the aforementioned definitions may equally apply to the description below.

As shown, the digital photographic system 300 may include a processor complex 310 coupled to a camera module 330 via an interconnect 334. In one embodiment, the processor complex 310 is coupled to a strobe unit 336. The digital photographic system 300 may also include, without limitation, a display unit 312, a set of input/output devices 314, non-volatile memory 316, volatile memory 318, a wireless unit 340, and sensor devices 342, each coupled to the processor complex 310. In one embodiment, a power management subsystem 320 is configured to generate appropriate power supply voltages for each electrical load element within the digital photographic system 300. A battery 322 may be configured to supply electrical energy to the power management subsystem 320. The battery 322 may implement any technically feasible energy storage system, including primary or rechargeable battery technologies. Of course, in other embodiments, additional or fewer features, units, devices, sensors, or subsystems may be included in the system.

In one embodiment, a strobe unit 336 may be integrated into the digital photographic system 300 and configured to provide strobe illumination 350 during an image sample event performed by the digital photographic system 300. In another embodiment, a strobe unit 336 may be implemented as an independent device from the digital photographic system 300 and configured to provide strobe illumination 350 during an image sample event performed by the digital photographic system 300. The strobe unit 336 may comprise one or more LED devices, a gas-discharge illuminator (e.g. a Xenon strobe device, a Xenon flash lamp, etc.), or any other technically feasible illumination device. In certain embodiments, two or more strobe units are configured to synchronously generate strobe illumination in conjunction with sampling an image. In one embodiment, the strobe unit 336 is controlled through a strobe control signal 338 to either emit the strobe illumination 350 or not emit the strobe illumination 350. The strobe control signal 338 may be implemented using any technically feasible signal transmission protocol. The strobe control signal 338 may indicate a strobe parameter (e.g. strobe intensity, strobe color, strobe time, etc.), for directing the strobe unit 336 to generate a specified intensity and/or color of the strobe illumination 350. The strobe control signal 338 may be generated by the processor complex 310, the camera module 330, or by any other technically feasible combination thereof. In one embodiment, the strobe control signal 338 is generated by a camera interface unit within the processor complex 310 and transmitted to both the strobe unit 336 and the camera module 330 via the interconnect 334. In another embodiment, the strobe control signal 338 is generated by the camera module 330 and transmitted to the strobe unit 336 via the interconnect 334.

Optical scene information 352, which may include at least a portion of the strobe illumination 350 reflected from objects in the photographic scene, is focused as an optical image onto an image sensor 332 within the camera module 330. The image sensor 332 generates an electronic representation of the optical image. The electronic representation comprises spatial color intensity information, which may include different color intensity samples (e.g. red, green, and blue light, etc.). In other embodiments, the spatial color intensity information may also include samples for white light. The electronic representation is transmitted to the processor complex 310 via the interconnect 334, which may implement any technically feasible signal transmission protocol.

In one embodiment, input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, the input/output devices 314 include a capacitive touch input surface coupled to a display unit 312. A touch entry display system may include the display unit 312 and a capacitive touch input surface, also coupled to processor complex 310.

Additionally, in other embodiments, non-volatile (NV) memory 316 is configured to store data when power is interrupted. In one embodiment, the NV memory 316 comprises one or more flash memory devices (e.g. ROM, PCM, FeRAM, FRAM, PRAM, MRAM, NRAM, etc.). The NV memory 316 comprises a non-transitory computer-readable medium, which may be configured to include programming instructions for execution by one or more processing units within the processor complex 310. The programming instructions may implement, without limitation, an operating system (OS), UI software modules, image processing and storage software modules, one or more input/output devices 314 connected to the processor complex 310, one or more software modules for sampling an image stack through camera module 330, one or more software modules for presenting the image stack or one or more synthetic images generated from the image stack through the display unit 312. As an example, in one embodiment, the programming instructions may also implement one or more software modules for merging images or portions of images within the image stack, aligning at least portions of each image within the image stack, or a combination thereof. In another embodiment, the processor complex 310 may be configured to execute the programming instructions, which may implement one or more software modules operable to create a high dynamic range (HDR) image.

Still yet, in one embodiment, one or more memory devices comprising the NV memory 316 may be packaged as a module configured to be installed or removed by a user. In one embodiment, volatile memory 318 comprises dynamic random access memory (DRAM) configured to temporarily store programming instructions, image data such as data associated with an image stack, and the like, accessed during the course of normal operation of the digital photographic system 300. Of course, the volatile memory may be used in any manner and in association with any other input/output device 314 or sensor device 342 attached to the process complex 310.

In one embodiment, sensor devices 342 may include, without limitation, one or more of an accelerometer to detect motion and/or orientation, an electronic gyroscope to detect motion and/or orientation, a magnetic flux detector to detect orientation, a global positioning system (GPS) module to detect geographic position, or any combination thereof. Of course, other sensors, including but not limited to a motion detection sensor, a proximity sensor, an RGB light sensor, a gesture sensor, a 3-D input image sensor, a pressure sensor, and an indoor position sensor, may be integrated as sensor devices. In one embodiment, the sensor devices may be one example of input/output devices 314.

Wireless unit 340 may include one or more digital radios configured to send and receive digital data. In particular, the wireless unit 340 may implement wireless standards (e.g. WiFi, Bluetooth, NFC, etc.), and may implement digital cellular telephony standards for data communication (e.g. CDMA, 3G, 4G, LTE, LTE-Advanced, etc.). Of course, any wireless standard or digital cellular telephony standards may be used.

In one embodiment, the digital photographic system 300 is configured to transmit one or more digital photographs to a network-based (online) or "cloud-based" photographic media service via the wireless unit 340. The one or more digital photographs may reside within either the NV memory 316 or the volatile memory 318, or any other memory device associated with the processor complex 310. In one embodiment, a user may possess credentials to access an online photographic media service and to transmit one or more digital photographs for storage to, retrieval from, and presentation by the online photographic media service. The credentials may be stored or generated within the digital photographic system 300 prior to transmission of the digital photographs. The online photographic media service may comprise a social networking service, photograph sharing service, or any other network-based service that provides storage of digital photographs, processing of digital photographs, transmission of digital photographs, sharing of digital photographs, or any combination thereof. In certain embodiments, one or more digital photographs are generated by the online photographic media service based on image data (e.g. image stack, HDR image stack, image package, etc.) transmitted to servers associated with the online photographic media service. In such embodiments, a user may upload one or more source images from the digital photographic system 300 for processing by the online photographic media service.

In one embodiment, the digital photographic system 300 comprises at least one instance of a camera module 330. In another embodiment, the digital photographic system 300 comprises a plurality of camera modules 330. Such an embodiment may also include at least one strobe unit 336 configured to illuminate a photographic scene, sampled as multiple views by the plurality of camera modules 330. The plurality of camera modules 330 may be configured to sample a wide angle view (e.g., greater than forty-five degrees of sweep among cameras) to generate a panoramic photograph. In one embodiment, a plurality of camera modules 330 may be configured to sample two or more narrow angle views (e.g., less than forty-five degrees of sweep among cameras) to generate a stereoscopic photograph. In other embodiments, a plurality of camera modules 330 may be configured to generate a 3-D image or to otherwise display a depth perspective (e.g. a z-component, etc.) as shown on the display unit 312 or any other display device.

In one embodiment, a display unit 312 may be configured to display a two-dimensional array of pixels to form an image for display. The display unit 312 may comprise a liquid-crystal (LCD) display, a light-emitting diode (LED) display, an organic LED display, or any other technically feasible type of display. In certain embodiments, the display unit 312 may be able to display a narrower dynamic range of image intensity values than a complete range of intensity values sampled from a photographic scene, such as within a single HDR image or over a set of two or more images comprising a multiple exposure or HDR image stack. In one embodiment, images comprising an image stack may be merged according to any technically feasible HDR blending technique to generate a synthetic image for display within dynamic range constraints of the display unit 312. In one embodiment, the limited dynamic range may specify an eight-bit per color channel binary representation of corresponding color intensities. In other embodiments, the limited dynamic range may specify more than eight-bits (e.g., 10 bits, 12 bits, or 14 bits, etc.) per color channel binary representation.

Figure 3B:
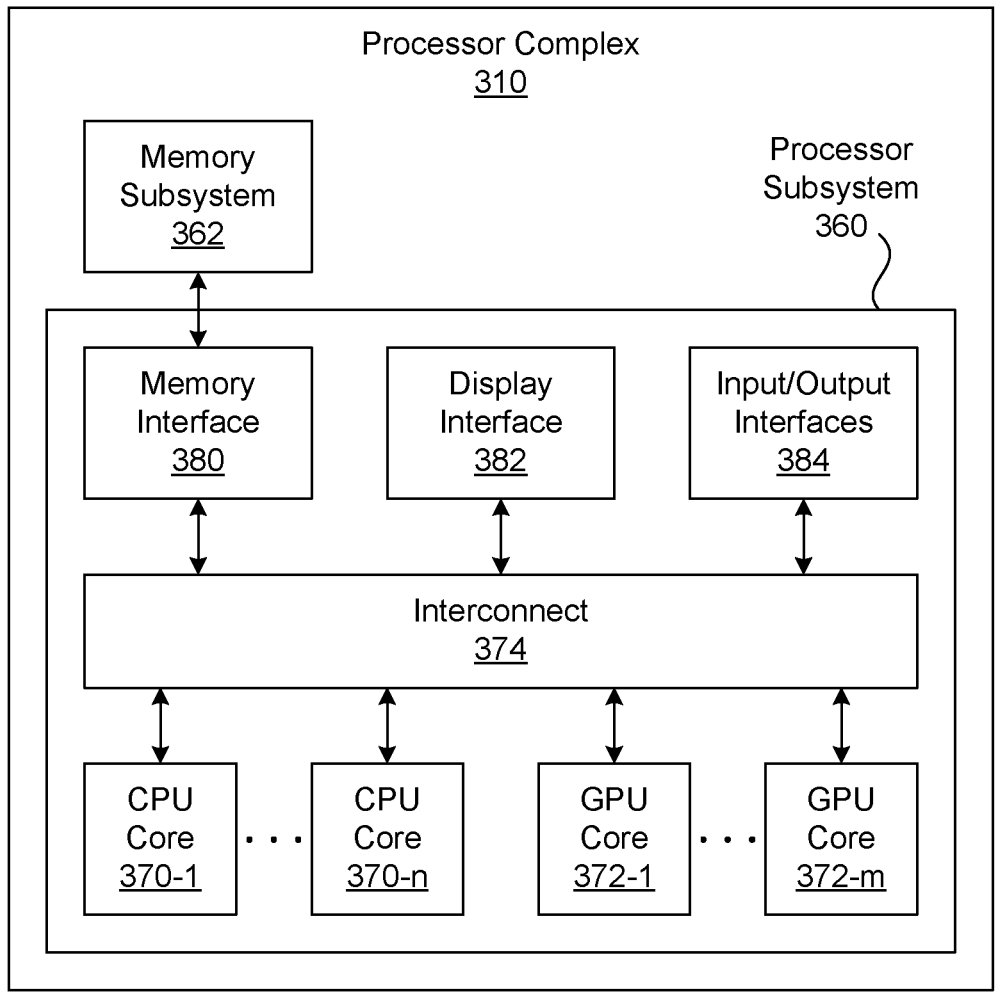
FIG. 3B illustrates a processor complex within a digital photographic system, according to one embodiment.

FIG. 3B illustrates a processor complex 310 within the digital photographic system 300 of FIG. 3A, in accordance with one embodiment. As an option, the processor complex 310 may be implemented in the context of the details of any of the Figures disclosed herein. Of course, however, the processor complex 310 may be implemented in any desired environment. Further, the aforementioned definitions may equally apply to the description below.

As shown, the processor complex 310 includes a processor subsystem 360 and may include a memory subsystem 362. In one embodiment, processor complex 310 may comprise a system on a chip (SoC) device that implements processor subsystem 360, and memory subsystem 362 comprises one or more DRAM devices coupled to the processor subsystem 360.

In another embodiment, the processor complex 310 may comprise a multi-chip module (MCM) encapsulating the SoC device and the one or more DRAM devices comprising the memory subsystem 362.

The processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within the memory subsystem 362, volatile memory 318, NV memory 316, or any combination thereof. Each of the one or more CPU cores 370 may be configured to retrieve and store data through interconnect 374 and the memory interface 380. In one embodiment, each of the one or more CPU cores 370 may include a data cache, and an instruction cache. Additionally, two or more of the CPU cores 370 may share a data cache, an instruction cache, or any combination thereof. In one embodiment, a cache hierarchy is implemented to provide each CPU core 370 with a private cache layer, and a shared cache layer.

In some embodiments, processor subsystem 360 may include one or more graphics processing unit (GPU) cores 372. Each GPU core 372 may comprise a plurality of multi-threaded execution units that may be programmed to implement, without limitation, graphics acceleration functions. In various embodiments, the GPU cores 372 may be configured to execute multiple thread programs according to well-known standards (e.g. OpenGL™, WebGL™, OpenCL™, CUDA™, etc.), and/or any other programmable rendering graphic standard. In certain embodiments, at least one GPU core 372 implements at least a portion of a motion estimation function, such as a well-known Harris detector or a well-known Hessian-Laplace detector. Such a motion estimation function may be used at least in part to align images or portions of images within an image stack. For example, in one embodiment, an HDR image may be compiled based on an image stack, where two or more images are first aligned prior to compiling the HDR image.

As shown, the interconnect 374 is configured to transmit data between and among the memory interface 380, the display interface unit 382, the input/output interfaces unit 384, the CPU cores 370, and the GPU cores 372. In various embodiments, the interconnect 374 may implement one or more buses, one or more rings, a cross-bar, a mesh, or any other technically feasible data transmission structure or technique. The memory interface 380 is configured to couple the memory subsystem 362 to the interconnect 374. The memory interface 380 may also couple NV memory 316, volatile memory 318, or any combination thereof to the interconnect 374. The display interface unit 382 may be configured to couple a display unit 312 to the interconnect 374. The display interface unit 382 may implement certain frame buffer functions (e.g. frame refresh, etc.). Alternatively, in another embodiment, the display unit 312 may implement certain frame buffer functions (e.g. frame refresh, etc.). The input/output interfaces unit 384 may be configured to couple various input/output devices to the interconnect 374.

In certain embodiments, a camera module 330 is configured to store exposure parameters for sampling each image associated with an image stack. For example, in one embodiment, when directed to sample a photographic scene, the camera module 330 may sample a set of images comprising the image stack according to stored exposure parameters. A software module comprising programming instructions executing within a processor complex 310 may generate and store the exposure parameters prior to directing the camera module 330 to sample the image stack. In other embodiments, the camera module 330 may be used to meter an image or an image stack, and the software module comprising programming instructions executing within a processor complex 310 may generate and store metering parameters prior to directing the camera module 330 to capture the image. Of course, the camera module 330 may be used in any manner in combination with the processor complex 310.

In one embodiment, exposure parameters associated with images comprising the image stack may be stored within an exposure parameter data structure that includes exposure parameters for one or more images. In another embodiment, a camera interface unit (not shown in FIG. 3B) within the processor complex 310 may be configured to read exposure parameters from the exposure parameter data structure and to transmit associated exposure parameters to the camera module 330 in preparation of sampling a photographic scene. After the camera module 330 is configured according to the exposure parameters, the camera interface may direct the camera module 330 to sample the photographic scene; the camera module 330 may then generate a corresponding image stack. The exposure parameter data structure may be stored within the camera interface unit, a memory circuit within the processor complex 310, volatile memory 318, NV memory 316, the camera module 330, or within any other technically feasible memory circuit. Further, in another embodiment, a software module executing within processor complex 310 may generate and store the exposure parameter data structure.

Figure 3C:
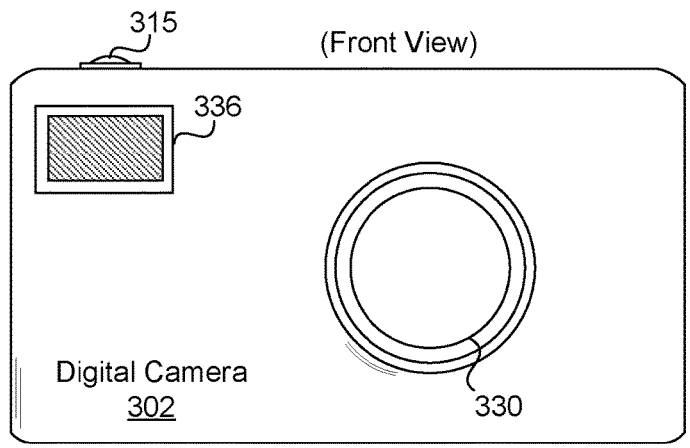
FIG. 3C illustrates a digital camera, in accordance with an embodiment.

FIG. 3C illustrates a digital camera 302, in accordance with one embodiment. As an option, the digital camera 302 may be implemented in the context of the details of any of the Figures disclosed herein. Of course, however, the digital camera 302 may be implemented in any desired environment. Further, the aforementioned definitions may equally apply to the description below.

In one embodiment, the digital camera 302 may be configured to include a digital photographic system, such as digital photographic system 300 of FIG. 3A. As shown, the digital camera 302 includes a camera module 330, which may include optical elements configured to focus optical scene information representing a photographic scene onto an image sensor, which may be configured to convert the optical scene information to an electronic representation of the photographic scene.

Additionally, the digital camera 302 may include a strobe unit 336, and may include a shutter release button 315 for triggering a photographic sample event, whereby digital camera 302 samples one or more images comprising the electronic representation. In other embodiments, any other technically feasible shutter release mechanism may trigger the photographic sample event (e.g. such as a timer trigger or remote control trigger, etc.).

Figure 3D:
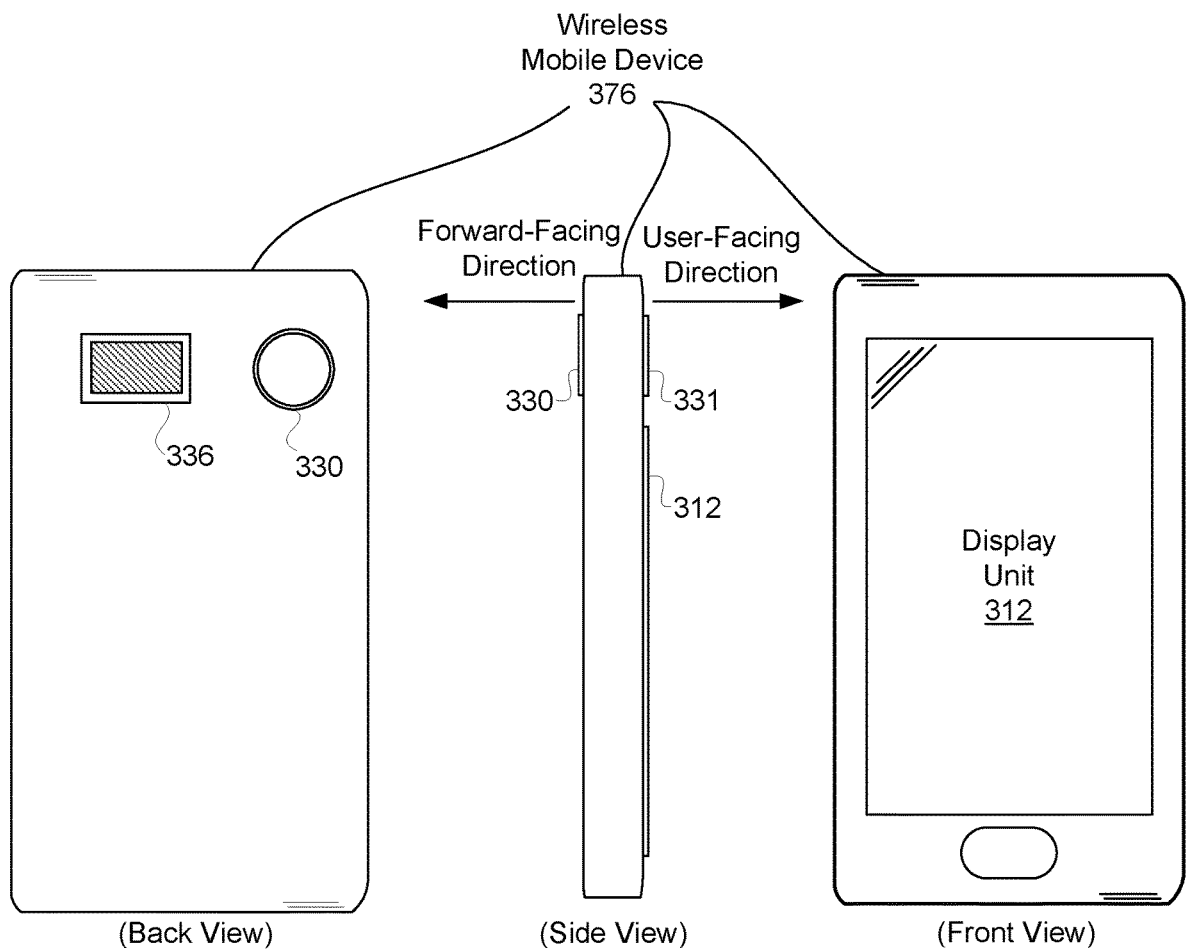
FIG. 3D illustrates a wireless mobile device, in accordance with another embodiment.

FIG. 3D illustrates a wireless mobile device 376, in accordance with one embodiment. As an option, the mobile device 376 may be implemented in the context of the details of any of the Figures disclosed herein. Of course, however, the mobile device 376 may be implemented in any desired environment. Further, the aforementioned definitions may equally apply to the description below.

In one embodiment, the mobile device 376 may be configured to include a digital photographic system (e.g. such as digital photographic system 300 of FIG. 3A), which is configured to sample a photographic scene. In various embodiments, a camera module 330 may include optical elements configured to focus optical scene information representing the photographic scene onto an image sensor, which may be configured to convert the optical scene information to an electronic representation of the photographic scene. Further, a shutter release command may be generated through any technically feasible mechanism, such as a virtual button, which may be activated by a touch gesture on a touch entry display system comprising display unit 312, or a physical button, which may be located on any face or surface of the mobile device 376. Of course, in other embodiments, any number of other buttons, external inputs/outputs, or digital inputs/outputs may be included on the mobile device 376, and which may be used in conjunction with the camera module 330.

As shown, in one embodiment, a touch entry display system comprising display unit 312 is disposed on the opposite side of mobile device 376 from camera module 330. In certain embodiments, the mobile device 376 includes a user-facing camera module 331 and may include a user-facing strobe unit (not shown). Of course, in other embodiments, the mobile device 376 may include any number of user-facing camera modules or rear-facing camera modules, as well as any number of user-facing strobe units or rear-facing strobe units.

In some embodiments, the digital camera 302 and the mobile device 376 may each generate and store a synthetic image based on an image stack sampled by camera module 330. The image stack may include one or more images sampled under ambient lighting conditions, one or more images sampled under strobe illumination from strobe unit 336, or a combination thereof.

Figure 3E:
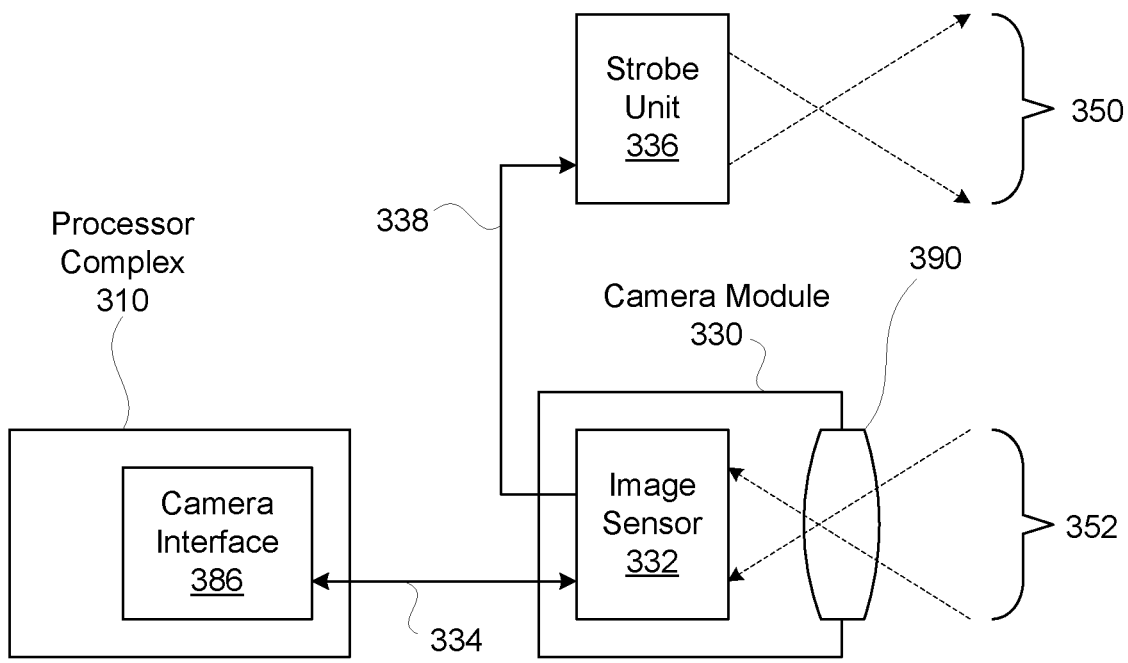
FIG. 3E illustrates a camera module configured to sample an image, according to one embodiment.

FIG. 3E illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to control strobe unit 336 through strobe control signal 338. As shown, a lens 390 is configured to focus optical scene information 352 onto image sensor 332 to be sampled. In one embodiment, image sensor 332 advantageously controls detailed timing of the strobe unit 336 though the strobe control signal 338 to reduce inter-sample time between an image sampled with the strobe unit 336 enabled, and an image sampled with the strobe unit 336 disabled. For example, the image sensor 332 may enable the strobe unit 336 to emit strobe illumination 350 less than one microsecond (or any desired length) after image sensor 332 completes an exposure time associated with sampling an ambient image and prior to sampling a strobe image.

In other embodiments, the strobe illumination 350 may be configured based on a desired one or more target points. For example, in one embodiment, the strobe illumination 350 may light up an object in the foreground, and depending on the length of exposure time, may also light up an object in the background of the image. In one embodiment, once the strobe unit 336 is enabled, the image sensor 332 may then immediately begin exposing a strobe image. The image sensor 332 may thus be able to directly control sampling operations, including enabling and disabling the strobe unit 336 associated with generating an image stack, which may comprise at least one image sampled with the strobe unit 336 disabled, and at least one image sampled with the strobe unit 336 either enabled or disabled. In one embodiment, data comprising the image stack sampled by the image sensor 332 is transmitted via interconnect 334 to a camera interface unit 386 within processor complex 310. In some embodiments, the camera module 330 may include an image sensor controller, which may be configured to generate the strobe control signal 338 in conjunction with controlling operation of the image sensor 332.

Figure 3F:
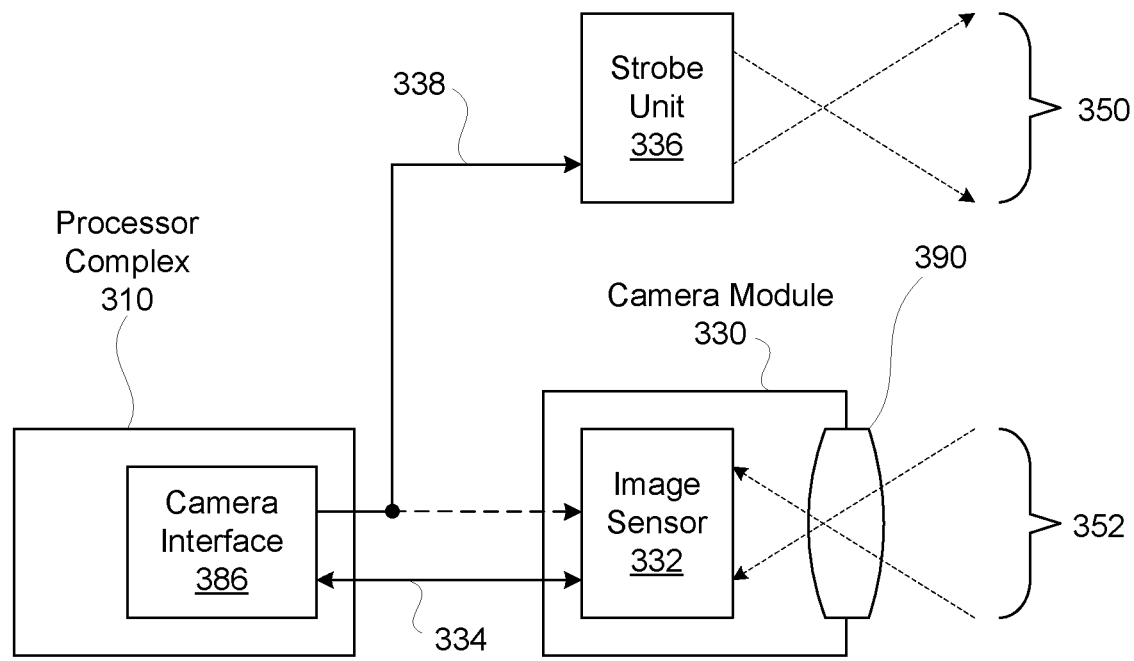
FIG. 3F illustrates a camera module configured to sample an image, according to another embodiment.

FIG. 3F illustrates a camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to sample an image based on state information for strobe unit 336. The state information may include, without limitation, one or more strobe parameters (e.g. strobe intensity, strobe color, strobe time, etc.), for directing the strobe unit 336 to generate a specified intensity and/or color of the strobe illumination 350. In one embodiment, commands for configuring the state information associated with the strobe unit 336 may be transmitted through a strobe control signal 338, which may be monitored by the camera module 330 to detect when the strobe unit 336 is enabled. For example, in one embodiment, the camera module 330 may detect when the strobe unit 336 is enabled or disabled within a microsecond or less of the strobe unit 336 being enabled or disabled by the strobe control signal 338. To sample an image requiring strobe illumination, a camera interface unit 386 may enable the strobe unit 336 by sending an enable command through the strobe control signal 338. In one embodiment, the camera interface unit 386 may be included as an interface of input/output interfaces 384 in a processor subsystem 360 of the processor complex 310 of FIG. 3B The enable command may comprise a signal level transition, a data packet, a register write, or any other technically feasible transmission of a command. The camera module 330 may sense that the strobe unit 336 is enabled and then cause image sensor 332 to sample one or more images requiring strobe illumination while the strobe unit 336 is enabled. In such an implementation, the image sensor 332 may be configured to wait for an enable signal destined for the strobe unit 336 as a trigger signal to begin sampling a new exposure.

In one embodiment, camera interface unit 386 may transmit exposure parameters and commands to camera module 330 through interconnect 334. In certain embodiments, the camera interface unit 386 may be configured to directly control strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In one embodiment, precise time synchronization may be less than five hundred microseconds of event timing error. Additionally, event timing error may be a difference in time from an intended event occurrence to the time of a corresponding actual event occurrence.

In another embodiment, camera interface unit 386 may be configured to accumulate statistics while receiving image data from camera module 330. In particular, the camera interface unit 386 may accumulate exposure statistics for a given image while receiving image data for the image through interconnect 334. Exposure statistics may include, without limitation, one or more of an intensity histogram, a count of over-exposed pixels, a count of under-exposed pixels, an intensity-weighted sum of pixel intensity, or any combination thereof. The camera interface unit 386 may present the exposure statistics as memory-mapped storage locations within a physical or virtual address space defined by a processor, such as one or more of CPU cores 370, within processor complex 310. In one embodiment, exposure statistics reside in storage circuits that are mapped into a memory-mapped register space, which may be accessed through the interconnect 334. In other embodiments, the exposure statistics are transmitted in conjunction with transmitting pixel data for a captured image. For example, the exposure statistics for a given image may be transmitted as in-line data, following transmission of pixel intensity data for the captured image. Exposure statistics may be calculated, stored, or cached within the camera interface unit 386.

In one embodiment, camera interface unit 386 may accumulate color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image.

In one embodiment, camera interface unit 386 may accumulate spatial color statistics for performing color-matching between or among images, such as between or among an ambient image and one or more images sampled with strobe illumination. As with the exposure statistics, the color statistics may be presented as memory-mapped storage locations within processor complex 310. In one embodiment, the color statistics are mapped in a memory-mapped register space, which may be accessed through interconnect 334, within processor subsystem 360. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386.

In one embodiment, camera module 330 may transmit strobe control signal 338 to strobe unit 336, enabling the strobe unit 336 to generate illumination while the camera module 330 is sampling an image. In another embodiment, camera module 330 may sample an image illuminated by strobe unit 336 upon receiving an indication signal from camera interface unit 386 that the strobe unit 336 is enabled. In yet another embodiment, camera module 330 may sample an image illuminated by strobe unit 336 upon detecting strobe illumination within a photographic scene via a rapid rise in scene illumination. In one embodiment, a rapid rise in scene illumination may include at least a rate of increasing intensity consistent with that of enabling strobe unit 336. In still yet another embodiment, camera module 330 may enable strobe unit 336 to generate strobe illumination while sampling one image, and disable the strobe unit 336 while sampling a different image.

Figure 3G:
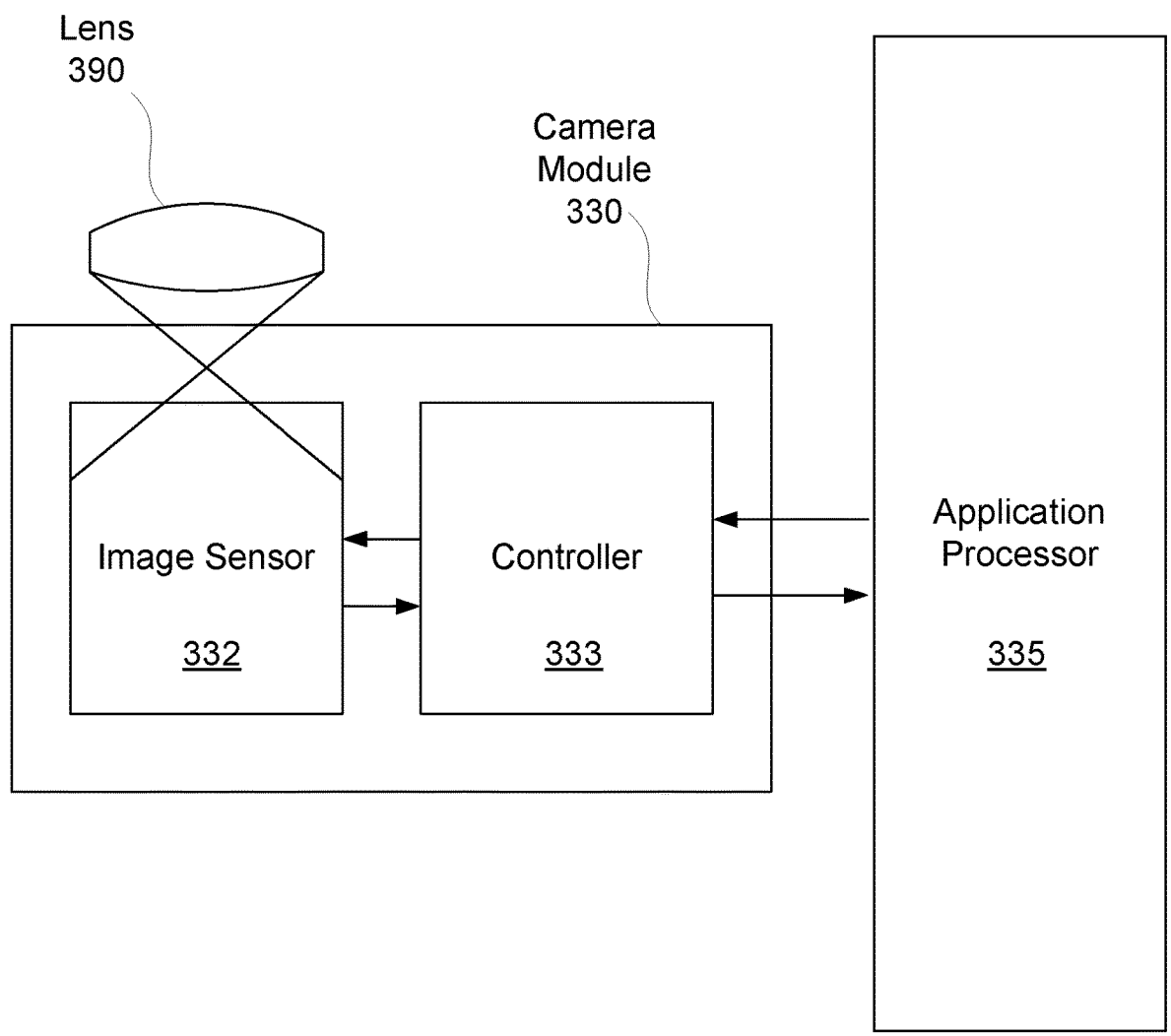
FIG. 3G illustrates a camera module in communication with an application processor, in accordance with an embodiment.

FIG. 3G illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be in communication with an application processor 335. The camera module 330 is shown to include image sensor 332 in communication with a controller 333. Further, the controller 333 is shown to be in communication with the application processor 335.

In one embodiment, the application processor 335 may reside outside of the camera module 330. As shown, the lens 390 may be configured to focus optical scene information onto image sensor 332 to be sampled. The optical scene information sampled by the image sensor 332 may then be communicated from the image sensor 332 to the controller 333 for at least one of subsequent processing and communication to the application processor 335. In another embodiment, the controller 333 may control storage of the optical scene information sampled by the image sensor 332, or storage of processed optical scene information.

In another embodiment, the controller 333 may enable a strobe unit to emit strobe illumination for a short time duration (e.g. less than one microsecond, etc.) after image sensor 332 completes an exposure time associated with sampling an ambient image. Further, the controller 333 may be configured to generate strobe control signal 338 in conjunction with controlling operation of the image sensor 332.

In one embodiment, the image sensor 332 may be a complementary metal oxide semiconductor (CMOS) sensor or a charge-coupled device (CCD) sensor. In another embodiment, the controller 333 and the image sensor 332 may be packaged together as an integrated system or integrated circuit. In yet another embodiment, the controller 333 and the image sensor 332 may comprise discrete packages. In one embodiment, the controller 333 may provide circuitry for receiving optical scene information from the image sensor 332, processing of the optical scene information, timing of various functionalities, and signaling associated with the application processor 335. Further, in another embodiment, the controller 333 may provide circuitry for control of one or more of exposure, shuttering, white balance, and gain adjustment. Processing of the optical scene information by the circuitry of the controller 333 may include one or more of gain application, amplification, and analog-to-digital conversion. After processing the optical scene information, the controller 333 may transmit corresponding digital pixel data, such as to the application processor 335.

In one embodiment, the application processor 335 may be implemented on processor complex 310 and at least one of volatile memory 318 and NV memory 316, or any other memory device and/or system. The application processor 335 may be previously configured for processing of received optical scene information or digital pixel data communicated from the camera module 330 to the application processor 335.

Figure 4:
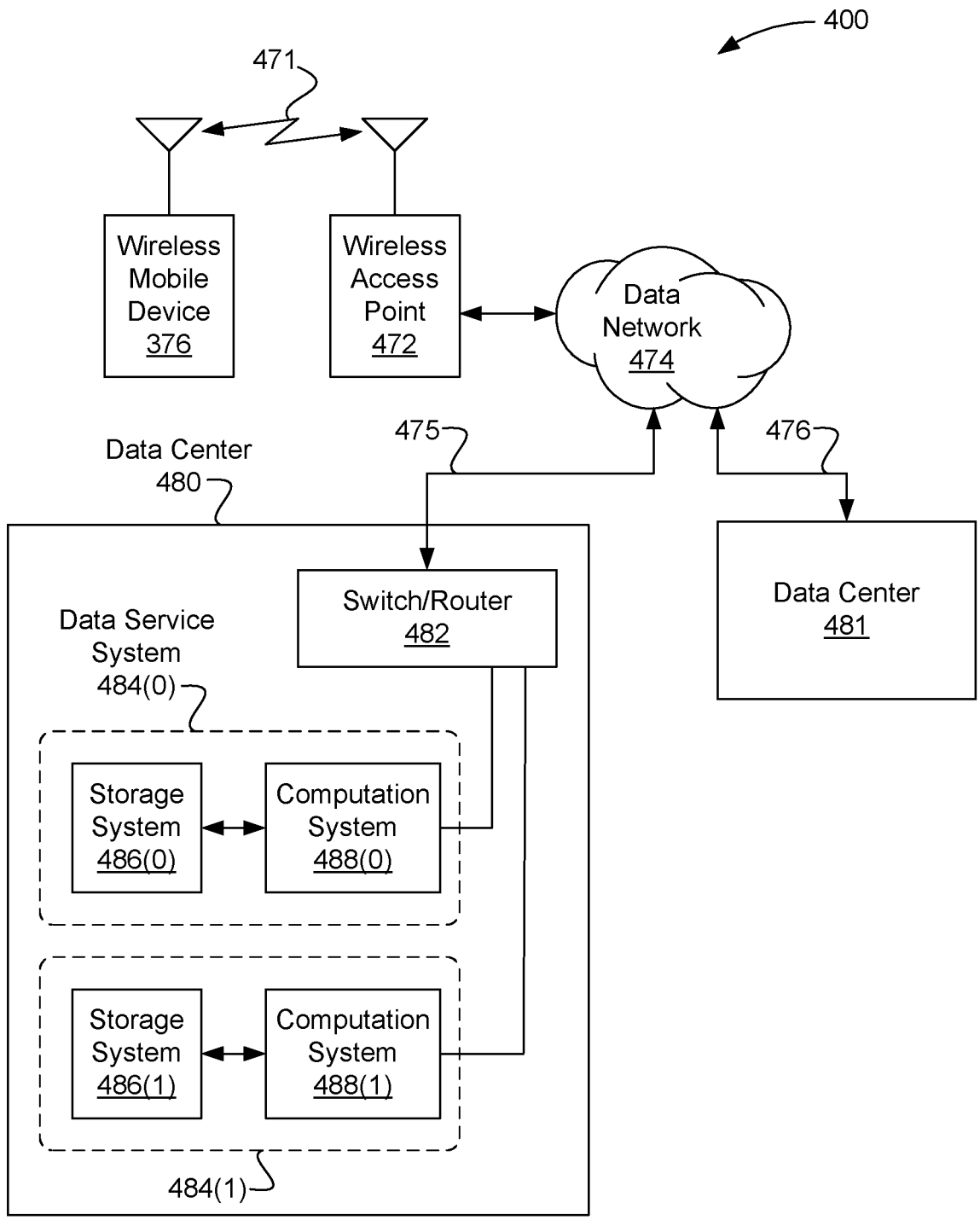
FIG. 4 illustrates a network service system, in accordance with another embodiment.

FIG. 4 illustrates a network service system 400, in accordance with one embodiment. As an option, the network service system 400 may be implemented in the context of the details of any of the Figures disclosed herein. Of course, however, the network service system 400 may be implemented in any desired environment. Further, the aforementioned definitions may equally apply to the description below.

In one embodiment, the network service system 400 may be configured to provide network access to a device implementing a digital photographic system. As shown, network service system 400 includes a wireless mobile device 376, a wireless access point 472, a data network 474, data center 480, and a data center 481. The wireless mobile device 376 may communicate with the wireless access point 472 via a digital radio link 471 to send and receive digital data, including data associated with digital images. The wireless mobile device 376 and the wireless access point 472 may implement any technically feasible transmission techniques for transmitting digital data via digital a radio link 471. In certain embodiments, one or more of data centers 480, 481 may be implemented using virtual constructs so that each system and subsystem within a given data center 480, 481 may comprise virtual machines configured to perform specified data processing and network tasks. In other implementations, one or more of data centers 480, 481 may be physically distributed over a plurality of physical sites.

The wireless mobile device 376 may comprise a smart phone configured to include a digital camera, a digital camera configured to include wireless network connectivity, a reality augmentation device, a laptop configured to include a digital camera and wireless network connectivity, or any other technically feasible computing device configured to include a digital photographic system and wireless network connectivity.

In various embodiments, the wireless access point 472 may be configured to communicate with wireless mobile device 376 via the digital radio link 471 and to communicate with the data network 474 via any technically feasible transmission media, such as any electrical, optical, or radio transmission media. For example, in one embodiment, wireless access point 472 may communicate with data network 474 through an optical fiber coupled to the wireless access point 472 and to a router system or a switch system within the data network 474. A network link 475, such as a wide area network (WAN) link, may be configured to transmit data between the data network 474 and the data center 480.

In one embodiment, the data network 474 may include routers, switches, long-haul transmission systems, provisioning systems, authorization systems, and any technically feasible combination of communications and operations subsystems configured to convey data between network endpoints, such as between the wireless access point 472 and the data center 480. In one implementation, a wireless the mobile device 376 may comprise one of a plurality of wireless mobile devices configured to communicate with the data center 480 via one or more wireless access points coupled to the data network 474.

Additionally, in various embodiments, the data center 480 may include, without limitation, a switch/router 482 and at least one data service system 484. The switch/router 482 may be configured to forward data traffic between and among a network link 475, and each data service system 484. The switch/router 482 may implement any technically feasible transmission techniques, such as Ethernet media layer transmission, layer 2 switching, layer 3 routing, and the like. The switch/router 482 may comprise one or more individual systems configured to transmit data between the data service systems 484 and the data network 474.

In one embodiment, the switch/router 482 may implement session-level load balancing among a plurality of data service systems 484. Each data service system 484 may include at least one computation system 488 and may also include one or more storage systems 486. Each computation system 488 may comprise one or more processing units, such as a central processing unit, a graphics processing unit, or any combination thereof. A given data service system 484 may be implemented as a physical system comprising one or more physically distinct systems configured to operate together. Alternatively, a given data service system 484 may be implemented as a virtual system comprising one or more virtual systems executing on an arbitrary physical system. In certain scenarios, the data network 474 may be configured to transmit data between the data center 480 and another data center 481, such as through a network link 476.

In another embodiment, the network service system 400 may include any networked mobile devices configured to implement one or more embodiments of the present invention. For example, in some embodiments, a peer-to-peer network, such as an ad-hoc wireless network, may be established between two different wireless mobile devices. In such embodiments, digital image data may be transmitted between the two wireless mobile devices without having to send the digital image data to a data center 480.

Figure 5A:
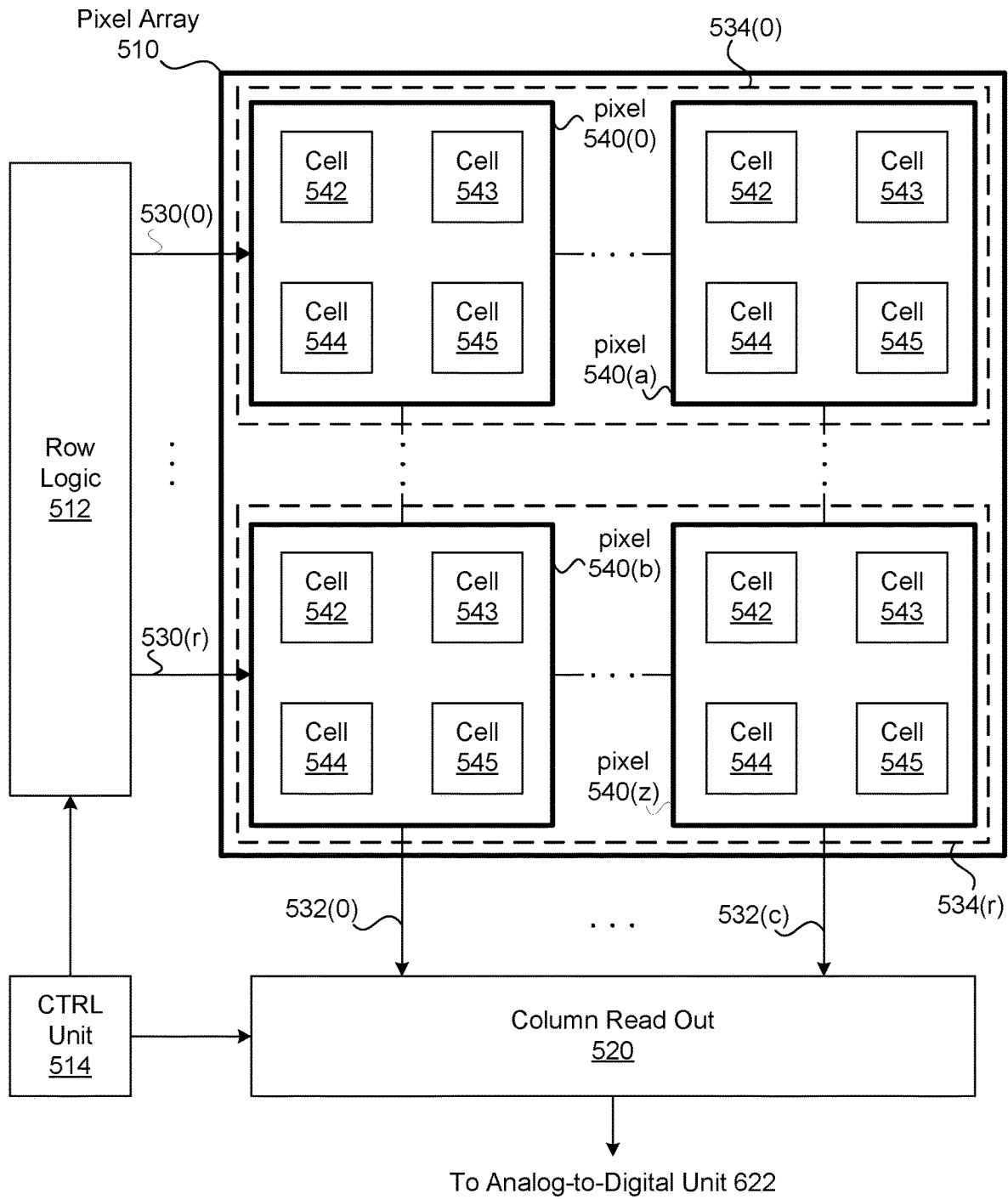
FIGS. 5A-5E illustrate systems for converting optical scene information to an electronic representation of a photographic scene, in accordance with other embodiments.

FIG. 5A illustrates a system for capturing optical scene information for conversion to an electronic representation of a photographic scene, in accordance with one embodiment.

As an option, the system of FIG. 5A may be implemented in the context of the details of any of the Figures. As shown in FIG. 5A, a pixel array 510 is in communication with row logic 512 and a column read out circuit 520. Further, the row logic 512 and the column read out circuit 520 are both in communication with a control unit 514. Still further, the pixel array 510 is shown to include a plurality of pixels 540, where each pixel 540 may include four cells, cells 542-545. In the context of the present description, the pixel array 510 may be included in an image sensor, such as image sensor 132 or image sensor 332 of camera module 330.

As shown, the pixel array 510 includes a 2-dimensional array of the pixels 540. For example, in one embodiment, the pixel array 510 may be built to comprise 4,000 pixels 540 in a first dimension, and 3,000 pixels 540 in a second dimension, for a total of 12,000,000 pixels 540 in the pixel array 510, which may be referred to as a 12 megapixel pixel array. Further, as noted above, each pixel 540 is shown to include four cells 542-545. In one embodiment, cell 542 may be associated with (e.g. selectively sensitive to, etc.) a first color of light, cell 543 may be associated with a second color of light, cell 544 may be associated with a third color of light, and cell 545 may be associated with a fourth color of light. In one embodiment, each of the first color of light, second color of light, third color of light, and fourth color of light are different colors of light, such that each of the cells 542-545 may be associated with different colors of light. In another embodiment, at least two cells of the cells 542-545 may be associated with a same color of light. For example, the cell 543 and the cell 544 may be associated with the same color of light.

Further, each of the cells 542-545 may be capable of storing an analog value. In one embodiment, each of the cells 542-545 may be associated with a capacitor for storing a charge that corresponds to an accumulated exposure during an exposure time. In such an embodiment, asserting a row select signal to circuitry of a given cell may cause the cell to perform a read operation, which may include, without limitation, generating and transmitting a current that is a function of the stored charge of the capacitor associated with the cell. In one embodiment, prior to a readout operation, current received at the capacitor from an associated photodiode may cause the capacitor, which has been previously charged, to discharge at a rate that is proportional to an incident light intensity detected at the photodiode. The remaining charge of the capacitor of the cell may then be read using the row select signal, where the current transmitted from the cell is an analog value that reflects the remaining charge on the capacitor. To this end, an analog value received from a cell during a readout operation may reflect an accumulated intensity of light detected at a photodiode. The charge stored on a given capacitor, as well as any corresponding representations of the charge, such as the transmitted current, may be referred to herein as a type of analog pixel data. Of course, analog pixel data may include a set of spatially discrete intensity samples, each represented by continuous analog values.

Still further, the row logic 512 and the column read out circuit 520 may work in concert under the control of the control unit 514 to read a plurality of cells 542-545 of a plurality of pixels 540. For example, the control unit 514 may cause the row logic 512 to assert a row select signal comprising row control signals 530 associated with a given row of pixels 540 to enable analog pixel data associated with the row of pixels to be read. As shown in FIG. 5A, this may include the row logic 512 asserting one or more row select signals comprising row control signals 530(0) associated with a row 534(0) that includes pixel 540(0) and pixel 540(a). In response to the row select signal being asserted, each pixel 540 on row 534(0) transmits at least one analog value based on charges stored within the cells 542-545 of the pixel 540. In certain embodiments, cell 542 and cell 543 are configured to transmit corresponding analog values in response to a first row select signal, while cell 544 and cell 545 are configured to transmit corresponding analog values in response to a second row select signal.

In one embodiment, analog values for a complete row of pixels 540 comprising each row 534(0) through 534(r) may be transmitted in sequence to column read out circuit 520 through column signals 532. In one embodiment, analog values for a complete row or pixels or cells within a complete row of pixels may be transmitted simultaneously. For example, in response to row select signals comprising row control signals 530(0) being asserted, the pixel 540(0) may respond by transmitting at least one analog value from the cells 542-545 of the pixel 540(0) to the column read out circuit 520 through one or more signal paths comprising column signals 532(0); and simultaneously, the pixel 540(a) will also transmit at least one analog value from the cells 542-545 of the pixel 540(a) to the column read out circuit 520 through one or more signal paths comprising column signals 532(c). Of course, one or more analog values may be received at the column read out circuit 520 from one or more other pixels 540 concurrently to receiving the at least one analog value from pixel 540(0) and concurrently receiving the at least one analog value from the pixel 540(a). Together, a set of analog values received from the pixels 540 comprising row 534(0) may be referred to as an analog signal, and this analog signal may be based on an optical image focused on the pixel array 510.

Further, after reading the pixels 540 comprising row 534(0), the row logic 512 may select a second row of pixels 540 to be read. For example, the row logic 512 may assert one or more row select signals comprising row control signals 530(r) associated with a row of pixels 540 that includes pixel 540(b) and pixel 540(z). As a result, the column read out circuit 520 may receive a corresponding set of analog values associated with pixels 540 comprising row 534(r).

Figure 6:
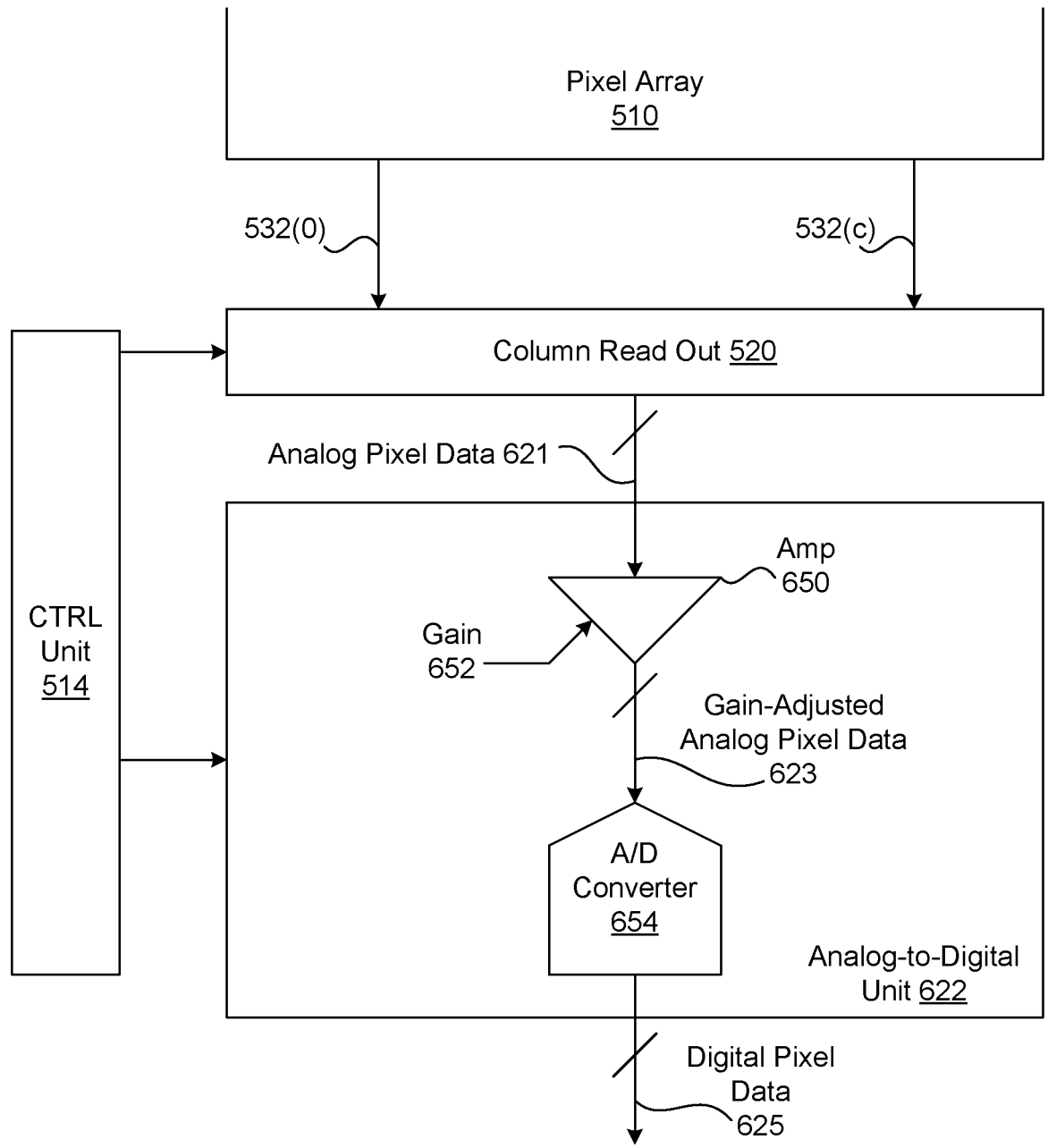
FIG. 6 illustrates a system for converting analog pixel data to digital pixel data, in accordance with an embodiment.

The column read out circuit 520 may serve as a multiplexer to select and forward one or more received analog values to an analog-to-digital converter circuit, such as analog-to-digital unit 622 of FIG. 6. The column read out circuit 520 may forward the received analog values in a predefined order or sequence. In one embodiment, row logic 512 asserts one or more row selection signals comprising row control signals 530, causing a corresponding row of pixels to transmit analog values through column signals 532. The column read out circuit 520 receives the analog values and sequentially selects and forwards one or more of the analog values at a time to the analog-to-digital unit 622. Selection of rows by row logic 512 and selection of columns by column read out circuit 620 may be directed by control unit 514. In one embodiment, rows 534 are sequentially selected to be read, starting with row 534(0) and ending with row 534(r), and analog values associated with sequential columns are transmitted to the analog-to-digital unit 622. In other embodiments, other selection patterns may be implemented to read analog values stored in pixels 540.

Further, the analog values forwarded by the column read out circuit 520 may comprise analog pixel data, which may later be amplified and then converted to digital pixel data for generating one or more digital images based on an optical image focused on the pixel array 510.

Figure 5B:
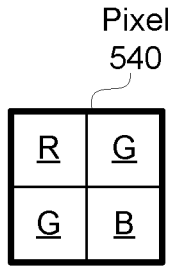
Figure 5C:
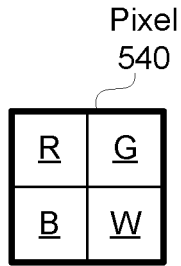
Figure 5D:
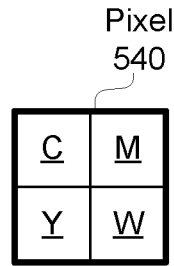

FIGS. 5B-5D illustrate three optional pixel configurations, according to one or more embodiments. As an option, these pixel configurations may be implemented in the context of the details of any of the Figures disclosed herein. Of course, however, these pixel configurations may be implemented in any desired environment. By way of a specific example, any of the pixels 540 of FIGS. 5B-5D may operate as one or more of the pixels 540 of the pixel array 510.

As shown in FIG. 5B, a pixel 540 is illustrated to include a first cell (R) for measuring red light intensity, second and third cells (G) for measuring green light intensity, and a fourth cell (B) for measuring blue light intensity, in accordance with one embodiment. As shown in FIG. 5C, a pixel 540 is illustrated to include a first cell (R) for measuring red light intensity, a second cell (G) for measuring green light intensity, a third cell (B) for measuring blue light intensity, and a fourth cell (W) for measuring white light intensity, in accordance with another embodiment. As shown in FIG. 5D, a pixel 540 is illustrated to include a first cell (C) for measuring cyan light intensity, a second cell (M) for measuring magenta light intensity, a third cell (Y) for measuring yellow light intensity, and a fourth cell (W) for measuring white light intensity, in accordance with yet another embodiment.

Of course, while pixels 540 are each shown to include four cells, a pixel 540 may be configured to include fewer or more cells for measuring light intensity. Still further, in another embodiment, while certain of the cells of pixel 540 are shown to be configured to measure a single peak wavelength of light, or white light, the cells of pixel 540 may be configured to measure any wavelength, range of wavelengths of light, or plurality of wavelengths of light.

Figure 5E:
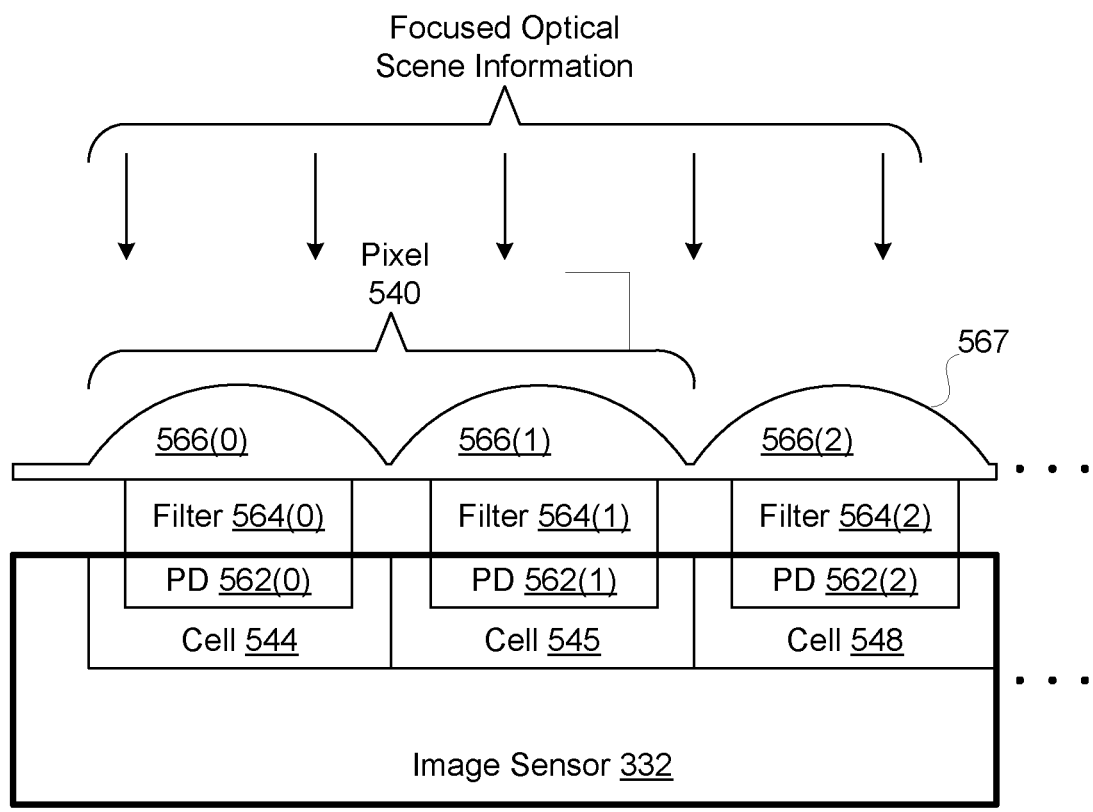

Referring now to FIG. 5E, a system is shown for capturing optical scene information focused as an optical image on an image sensor 332, in accordance with one embodiment. As an option, the system of FIG. 5E may be implemented in the context of the details of any of the Figures. Of course, however, the system of FIG. 5E may be carried out in any desired environment. Further, the aforementioned definitions may equally apply to the description below.

As shown in FIG. 5E, an image sensor 332 is shown to include a first cell 544, a second cell 545, and a third cell 548. Further, each of the cells 544-548 is shown to include a photodiode 562. Still further, upon each of the photodiodes 562 is a corresponding filter 564, and upon each of the filters 564 is a corresponding microlens 566. For example, the cell 544 is shown to include photodiode 562(0), upon which is filter 564(0), and upon which is microlens 566(0). Similarly, the cell 545 is shown to include photodiode 562(1), upon which is filter 564(1), and upon which is microlens 566(1). Still yet, as shown in FIG. 5E, pixel 540 is shown to include each of cells 544 and 545, photodiodes 562(0) and 562(1), filters 564(0) and 564(1), and microlenses 566(0) and 566 (1).

In one embodiment, each of the microlenses 566 may be any lens with a diameter of less than 50 microns. However, in other embodiments each of the microlenses 566 may have a diameter greater than or equal to 50 microns. In one embodiment, each of the microlenses 566 may include a spherical convex surface for focusing and concentrating received light on a supporting substrate beneath the microlens 566. For example, as shown in FIG. 5E, the microlens 566(0) focuses and concentrates received light on the filter 564(0). In one embodiment, a microlens array 567 may include microlenses 566, each corresponding in placement to photodiodes 562 within cells 544 of image sensor 332.

In the context of the present description, the photodiodes 562 may comprise any semiconductor diode that generates a potential difference, or changes its electrical resistance, in response to photon absorption. Accordingly, the photodiodes 562 may be used to detect or measure light intensity. Further, each of the filters 564 may be optical filters for selectively transmitting light of one or more predetermined wavelengths. For example, the filter 564(0) may be configured to selectively transmit substantially only green light received from the corresponding microlens 566(0), and the filter 564(1) may be configured to selectively transmit substantially only blue light received from the microlens 566(1). Together, the filters 564 and microlenses 566 may be operative to focus selected wavelengths of incident light on a plane. In one embodiment, the plane may be a 2-dimensional grid of photodiodes 562 on a surface of the image sensor 332. Further, each photodiode 562 receives one or more predetermined wavelengths of light, depending on its associated filter. In one embodiment, each photodiode 562 receives only one of red, blue, or green wavelengths of filtered light. As shown with respect to FIGS. 5B-5D, it is contemplated that a photodiode may be configured to detect wavelengths of light other than only red, green, or blue. For example, in the context of FIGS. 5C-5D specifically, a photodiode may be configured to detect white, cyan, magenta, yellow, or non-visible light such as infrared or ultraviolet light.

To this end, each coupling of a cell, photodiode, filter, and microlens may be operative to receive light, focus and filter the received light to isolate one or more predetermined wavelengths of light, and then measure, detect, or otherwise quantify an intensity of light received at the one or more predetermined wavelengths. The measured or detected light may then be represented as an analog value stored within a cell. For example, in one embodiment, the analog value may be stored within the cell utilizing a capacitor, as discussed in more detail above. Further, the analog value stored within the cell may be output from the cell based on a selection signal, such as a row selection signal, which may be received from row logic 512. Further still, the analog value transmitted from a single cell may comprise one analog value in a plurality of analog values of an analog signal, where each of the analog values is output by a different cell. Accordingly, the analog signal may comprise a plurality of analog pixel data values from a plurality of cells. In one embodiment, the analog signal may comprise analog pixel data values for an entire image of a photographic scene. In another embodiment, the analog signal may comprise analog pixel data values for a subset of the entire image of the photographic scene. For example, the analog signal may comprise analog pixel data values for a row of pixels of the image of the photographic scene. In the context of FIGS. 5A-5E, the row 534(0) of the pixels 540 of the pixel array 510 may be one such row of pixels of the image of the photographic scene.

FIG. 6 illustrates a system for converting analog pixel data to digital pixel data, in accordance with an embodiment. As an option, the system of FIG. 6 may be implemented in the context of the details of any of the Figures disclosed herein. Of course, however, the system of FIG. 6 may be implemented in any desired environment. Further, the aforementioned definitions may equally apply to the description below.

As shown in FIG. 6, analog pixel data 621 is received from column read out circuit 520 at analog-to-digital unit 622 under the control of control unit 514. The analog pixel data 621 may be received within an analog signal, as noted hereinabove. Further, the analog-to-digital unit 622 generates digital pixel data 625 based on the received analog pixel data 621.

More specifically, and as shown in FIG. 6, the analog-to-digital unit 622 includes an amplifier 650 and an analog-to-digital converter 654. In one embodiment, the amplifier 650 receives both the analog pixel data 621 and a gain 652, and applies the gain 652 to the analog pixel data 621 to generate gain-adjusted analog pixel data 623. The gain-adjusted analog pixel data 623 is transmitted from the amplifier 650 to the analog-to-digital converter 654. The analog-to-digital converter 654 receives the gain-adjusted analog pixel data 623, and converts the gain-adjusted analog pixel data 623 to the digital pixel data 625, which is then transmitted from the analog-to-digital converter 654. In other embodiments, the amplifier 650 may be implemented within the column read out circuit 520 instead of within the analog-to-digital unit 622. The analog-to-digital converter 654 may convert the gain-adjusted analog pixel data 623 to the digital pixel data 625 using any technically feasible analog-to-digital conversion system.

In an embodiment, the gain-adjusted analog pixel data 623 results from the application of the gain 652 to the analog pixel data 621. In one embodiment, the gain 652 may be selected by the analog-to-digital unit 622. In another embodiment, the gain 652 may be selected by the control unit 514, and then supplied from the control unit 514 to the analog-to-digital unit 622 for application to the analog pixel data 621.

It should be noted, in one embodiment, that a consequence of applying the gain 652 to the analog pixel data 621 is that analog noise may appear in the gain-adjusted analog pixel data 623. If the amplifier 650 imparts a significantly large gain to the analog pixel data 621 in order to obtain highly sensitive data from of the pixel array 510, then a significant amount of noise may be expected within the gain-adjusted analog pixel data 623. In one embodiment, the detrimental effects of such noise may be reduced by capturing the optical scene information at a reduced overall exposure. In such an embodiment, the application of the gain 652 to the analog pixel data 621 may result in gain-adjusted analog pixel data with proper exposure and reduced noise.

In one embodiment, the amplifier 650 may be a transimpedance amplifier (TIA). Furthermore, the gain 652 may be specified by a digital value. In one embodiment, the digital value specifying the gain 652 may be set by a user of a digital photographic device, such as by operating the digital photographic device in a "manual" mode. Still yet, the digital value may be set by hardware or software of a digital photographic device. As an option, the digital value may be set by the user working in concert with the software of the digital photographic device.

In one embodiment, a digital value used to specify the gain 652 may be associated with an ISO. In the field of photography, the ISO system is a well-established standard for specifying light sensitivity. In one embodiment, the amplifier 650 receives a digital value specifying the gain 652 to be applied to the analog pixel data 621. In another embodiment, there may be a mapping from conventional ISO values to digital gain values that may be provided as the gain 652 to the amplifier 650. For example, each of ISO 100, ISO 200, ISO 400, ISO 800, ISO 1600, etc. may be uniquely mapped to a different digital gain value, and a selection of a particular ISO results in the mapped digital gain value being provided to the amplifier 650 for application as the gain 652. In one embodiment, one or more ISO values may be mapped to a gain of 1. Of course, in other embodiments, one or more ISO values may be mapped to any other gain value.

Accordingly, in one embodiment, each analog pixel value may be adjusted in brightness given a particular ISO value. Thus, in such an embodiment, the gain-adjusted analog pixel data 623 may include brightness corrected pixel data, where the brightness is corrected based on a specified ISO. In another embodiment, the gain-adjusted analog pixel data 623 for an image may include pixels having a brightness in the image as if the image had been sampled at a certain ISO.

In accordance with an embodiment, the digital pixel data 625 may comprise a plurality of digital values representing pixels of an image captured using the pixel array 510.

Figure 7:
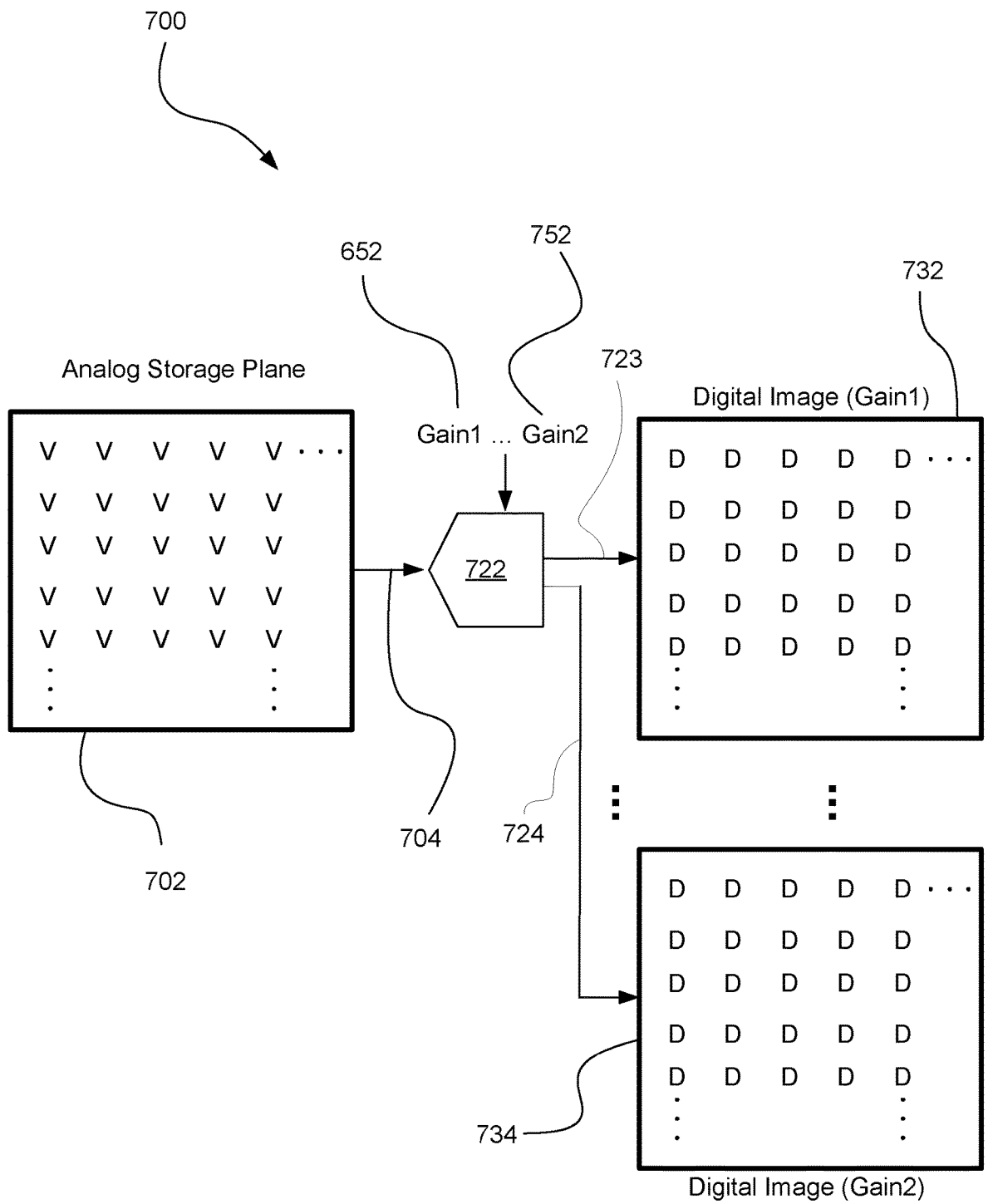
FIG. 7 illustrates a system for converting analog pixel data of an analog signal to digital pixel data, in accordance with another embodiment.

FIG. 7 illustrates a system 700 for converting analog pixel data of an analog signal to digital pixel data, in accordance with an embodiment. As an option, the system 700 may be implemented in the context of the details of any of the Figures disclosed herein. Of course, however, the system 700 may be implemented in any desired environment. Further, the aforementioned definitions may equally apply to the description below.

The system 700 is shown in FIG. 7 to include an analog storage plane 702, an analog-to-digital unit 722, a first digital image 732, and a second digital image 734. Additionally, in one embodiment, analog values may each be depicted as a "V" within the analog storage plane 702 and corresponding digital values may each be depicted as a "D" within first digital image 732 and second digital image 734.

In the context of the present description, the analog storage plane 702 may comprise any collection of one or more analog values. In one embodiment, the analog storage plane 702 may comprise one or more analog pixel values. In some embodiments, the analog storage plane 702 may comprise at least one analog pixel value for each pixel of a row or line of a pixel array. Still yet, in another embodiment, the analog storage plane 702 may comprise at least one analog pixel value for each pixel of an entirety of a pixel array, which may be referred to as a frame. In one embodiment, the analog storage plane 702 may comprise an analog value for each cell of a pixel. In yet another embodiment, the analog storage plane 702 may comprise an analog value for each cell of each pixel of a row or line of a pixel array. In another embodiment, the analog storage plane 702 may comprise an analog value for each cell of each pixel of multiple lines or rows of a pixel array. For example, the analog storage plane 702 may comprise an analog value for each cell of each pixel of every line or row of a pixel array.

Further, the analog values of the analog storage plane 702 are output as analog pixel data 704 to the analog-to-digital unit 722. In one embodiment, the analog-to-digital unit 722 may be substantially identical to the analog-to-digital unit 622 described within the context of FIG. 6. For example, the analog-to-digital unit 722 may comprise at least one amplifier and at least one analog-to-digital converter, where the amplifier is operative to receive a gain value and utilize the gain value to gain-adjust analog pixel data received at the analog-to-digital unit 722. Further, in such an embodiment, the amplifier may transmit gain-adjusted analog pixel data to an analog-to-digital converter, which then generates digital pixel data from the gain-adjusted analog pixel data.

In the context of the system 700 of FIG. 7, the analog-to-digital unit 722 receives the analog pixel data 704, and applies at least two different gains to the analog pixel data 704 to generate at least a first gain-adjusted analog pixel data and a second gain-adjusted analog pixel data. Further, the analog-to-digital unit 722 converts each generated gain-adjusted analog pixel data to digital pixel data, and then outputs at least two digital outputs. To this end, the analog-to-digital unit 722 provides a different digital output corresponding to each gain applied to the analog pixel data 704. With respect to FIG. 7 specifically, the analog-to-digital unit 722 is shown to generate a first digital signal comprising first digital pixel data 723 corresponding to a first gain 652, and a second digital signal comprising second digital pixel data 724 corresponding to a second gain 752.

In one embodiment, the analog-to-digital unit 722 applies in sequence the at least two gains to the analog values. For example, the analog-to-digital unit 722 first applies the first gain 652 to the analog pixel data 704, and then subsequently applies the second gain 752 to the same analog pixel data 704. In other embodiments, the analog-to-digital unit 722 may apply in parallel the at least two gains to the analog values. For example, the analog-to-digital unit 722 may apply the first gain 652 to the analog pixel data 704 in parallel with the application of the second gain 752 to the analog pixel data 704. To this end, as a result of applying the at least two gains, the analog pixel data 704 is amplified utilizing at least the first gain 652 and the second gain 752.

In accordance with one embodiment, the at least two gains may be determined using any technically feasible technique based on an exposure of a photographic scene, metering data, user input, detected ambient light, a strobe control, or any combination of the foregoing. For example, a first gain of the at least two gains may be determined such that half of the digital values from the analog storage plane 702 are converted to digital values above a specified threshold (e.g., a threshold of 0.5 in a range of 0.0 to 1.0) for the dynamic range associated with digital values comprising the first digital image 732, which can be characterized as having an "EV0" exposure. Continuing the example, a second gain of the at least two gains may be determined as being twice that of the first gain to generate a second digital image 734 characterized as having an "EV+1" exposure.

In one embodiment, the analog-to-digital unit 722 converts in sequence the first gain-adjusted analog pixel data to the first digital pixel data 723, and the second gain-adjusted analog pixel data to the second digital pixel data 724. For example, the analog-to-digital unit 722 first converts the first gain-adjusted analog pixel data to the first digital pixel data 723, and then subsequently converts the second gain-adjusted analog pixel data to the second digital pixel data 724. In other embodiments, the analog-to-digital unit 722 may perform such conversions in parallel, such that the first digital pixel data 723 is generated in parallel with the second digital pixel data 724.

Still further, as shown in FIG. 7, the first digital pixel data 723 is used to provide the first digital image 732. Similarly, the second digital pixel data 724 is used to provide the second digital image 734. The first digital image 732 and the second digital image 734 are both based upon the same analog pixel data 704, however the first digital image 732 may differ from the second digital image 734 as a function of a difference between the first gain 652 (used to generate the first digital image 732) and the second gain 752 (used to generate the second digital image 752). Specifically, the digital image generated using the largest gain of the at least two gains may be visually perceived as the brightest or more exposed. Conversely, the digital image generated using the smallest gain of the at least two gains may be visually perceived as the darkest and less exposed. To this end, a first light sensitivity value may be associated with the first digital pixel data 723, and a second light sensitivity value may be associated with the second digital pixel data 724. Further, because each of the gains may be associated with a different light sensitivity value, the first digital image or first digital signal may be associated with a first light sensitivity value, and the second digital image or second digital signal may be associated with a second light sensitivity value.

It should be noted that while a controlled application of gain to the analog pixel data may greatly aid in HDR image generation, an application of too great of gain may result in a digital image that is visually perceived as being noisy, over-exposed, and/or blown-out. In one embodiment, application of two stops of gain to the analog pixel data may impart visually perceptible noise for darker portions of a photographic scene, and visually imperceptible noise for brighter portions of the photographic scene. In another embodiment, a digital photographic device may be configured to provide an analog storage plane of analog pixel data for a captured photographic scene, and then perform at least two analog-to-digital samplings of the same analog pixel data using the analog-to-digital unit 722. To this end, a digital image may be generated for each sampling of the at least two samplings, where each digital image is obtained at a different exposure despite all the digital images being generated from the same analog sampling of a single optical image focused on an image sensor.

In one embodiment, an initial exposure parameter may be selected by a user or by a metering algorithm of a digital photographic device. The initial exposure parameter may be selected based on user input or software selecting particular capture variables. Such capture variables may include, for example, ISO, aperture, and shutter speed. An image sensor may then capture a single exposure of a photographic scene at the initial exposure parameter, and populate an analog storage plane with analog values corresponding to an optical image focused on the image sensor. Next, a first digital image may be obtained utilizing a first gain in accordance with the above systems and methods. For example, if the digital photographic device is configured such that the initial exposure parameter includes a selection of ISO 400, the first gain utilized to obtain the first digital image may be mapped to, or otherwise associated with, ISO 400. This first digital image may be referred to as an exposure or image obtained at exposure value 0 (EV0). Further at least one more digital image may be obtained utilizing a second gain in accordance with the above systems and methods. For example, the same analog pixel data used to generate the first digital image may be processed utilizing a second gain to generate a second digital image.

In one embodiment, at least two digital images may be generated using the same analog pixel data and blended to generate an HDR image. The at least two digital images generated using the same analog signal may be blended by blending a first digital signal and a second digital signal. Because the at least two digital images are generated using the same analog pixel data, there may be zero interframe time between the at least two digital images. As a result of having zero interframe time between at least two digital images of a same photographic scene, an HDR image may be generated without motion blur or other artifacts typical of HDR photographs.

In another embodiment, the second gain may be selected based on the first gain. For example, the second gain may be selected on the basis of it being one stop away from the first gain. More specifically, if the first gain is mapped to or associated with ISO 400, then one stop down from ISO 400 provides a gain associated with ISO 200, and one stop up from ISO 400 provides a gain associated with ISO 800. In such an embodiment, a digital image generated utilizing the gain associated with ISO 200 may be referred to as an exposure or image obtained at exposure value −1 (EV−1), and a digital image generated utilizing the gain associated with ISO 800 may be referred to as an exposure or image obtained at exposure value +1 (EV+1).

Still further, if a more significant difference in exposures is desired between digital images generated utilizing the same analog signal, then the second gain may be selected on the basis of it being two stops away from the first gain. For example, if the first gain is mapped to or associated with ISO 400, then two stops down from ISO 400 provides a gain associated with ISO 100, and two stops up from ISO 400 provides a gain associated with ISO 1600. In such an embodiment, a digital image generated utilizing the gain associated with ISO 100 may be referred to as an exposure or image obtained at exposure value −2 (EV−2), and a digital image generated utilizing the gain associated with ISO 1600 may be referred to as an exposure or image obtained at exposure value +2 (EV+2).

In one embodiment, an ISO and exposure of the EV0 image may be selected according to a preference to generate darker or more saturated digital images. In such an embodiment, the intention may be to avoid blowing out or overexposing what will be the brightest digital image, which is the digital image generated utilizing the greatest gain. In another embodiment, an EV−1 digital image or EV−2 digital image may be a first generated digital image. Subsequent to generating the EV−1 or EV−2 digital image, an increase in gain at an analog-to-digital unit may be utilized to generate an EV0 digital image, and then a second increase in gain at the analog-to-digital unit may be utilized to generate an EV+1 or EV+2 digital image. In one embodiment, the initial exposure parameter corresponds to an EV−N digital image and subsequent gains are used to obtain an EV0 digital image, an EV+M digital image, or any combination thereof, where N and M are values ranging from 0 to −10.

In one embodiment, an EV−2 digital image, an EV0 digital image, and an EV+2 digital image may be generated in parallel by implementing three analog-to-digital units. Such an implementation may be also capable of simultaneously generating all of an EV−1 digital image, an EV0 digital image, and an EV+1 digital image. Similarly, any combination of exposures may be generated in parallel from two or more analog-to-digital units, three or more analog-to-digital units, or an arbitrary number of analog-to-digital units.

Figure 8:
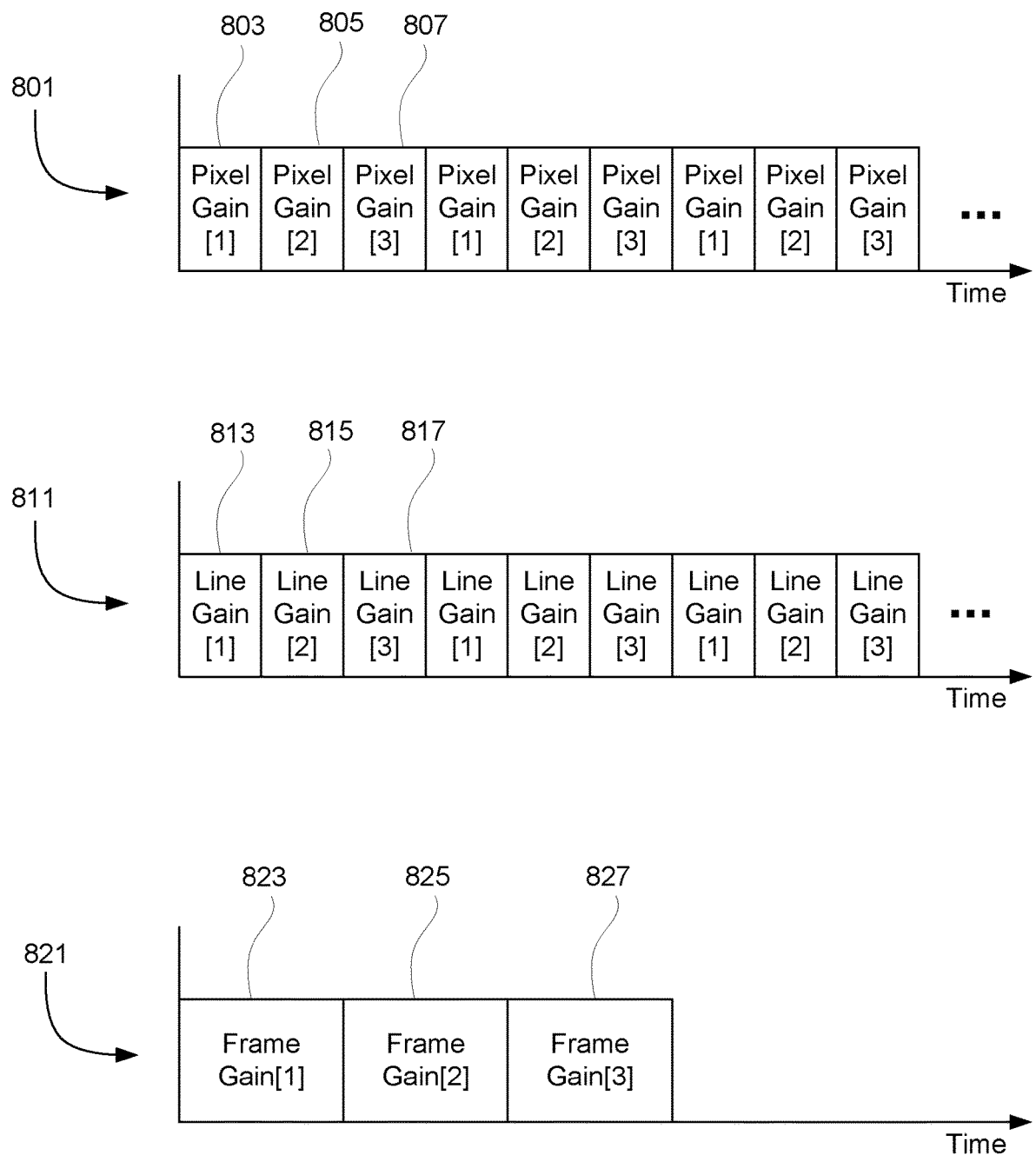
FIG. 8 illustrates various timing configurations for amplifying analog signals, in accordance with other embodiments.

FIG. 8 illustrates various timing configurations for amplifying analog signals, in accordance with various embodiments. As an option, the timing configurations of FIG. 8 may be implemented in the context of the details of any of the Figures disclosed herein. Of course, however, the timing configurations of FIG. 8 may be carried out in any desired environment. Further, the aforementioned definitions may equally apply to the description below.

Specifically, as shown in FIG. 8, per pixel timing configuration 801 is shown to amplify analog signals on a pixel-by-pixel basis. Further, per line timing configuration 811 is shown to amplify analog signals on a line-by-line basis. Finally, per frame timing configuration 821 is shown to amplify analog signals on a frame-by-frame basis. Each amplified analog signal associated with analog pixel data may be converted to a corresponding digital signal value.

In systems that implement per pixel timing configuration 801, an analog signal containing analog pixel data may be received at an analog-to-digital unit. Further, the analog pixel data may include individual analog pixel values. In such an embodiment, a first analog pixel value associated with a first pixel may be identified within the analog signal and selected. Next, each of a first gain 803, a second gain 805, and a third gain 807 may be applied in sequence or concurrently to the same first analog pixel value. In some embodiments less than or more than three different gains may be applied to a selected analog pixel value. For example, in some embodiments applying only two different gains to the same analog pixel value may be sufficient for generating a satisfactory HDR image. In one embodiment, after applying each of the first gain 803, the second gain 805, and the third gain 807, a second analog pixel value associated with a second pixel may be identified within the analog signal and selected. The second pixel may be a neighboring pixel of the first pixel. For example, the second pixel may be in a same row as the first pixel and located adjacent to the first pixel on a pixel array of an image sensor. Next, each of the first gain 803, the second gain 805, and the third gain 807 may be applied in sequence or concurrently to the same second analog pixel value. To this end, in the per pixel timing configuration 801, a plurality of sequential analog pixel values may be identified within an analog signal, and a set of at least two gains are applied to each pixel in the analog signal on a pixel-by-pixel basis.

Further, in systems that implement the per pixel timing configuration 801, a control unit may select a next gain to be applied after each pixel is amplified using a previously selected gain. In another embodiment, a control unit may control an amplifier to cycle through a set of predetermined gains that will be applied to a first analog pixel value, such a first analog pixel data value comprising analog pixel data 704, associated with a first pixel so that each gain in the set may be used to amplify the first analog pixel data before applying the set of predetermined gains to a second analog pixel data that subsequently arrives at the amplifier. In one embodiment, and as shown in the context of FIG. 8, this may include selecting a first gain, applying the first gain to a received first analog pixel value, selecting a second gain, applying the second gain to the received first analog pixel value, selecting a third gain, applying the third selected gain to the received first analog pixel value, and then receiving a second analog pixel value and applying the three selected gains to the second pixel value in the same order as applied to the first pixel value. In one embodiment, each analog pixel value may be read a plurality of times. In general, an analog storage plane may be utilized to hold the analog pixel values of the pixels for reading.

In systems that implement per line timing configuration 811, an analog signal containing analog pixel data may be received at an analog-to-digital unit. Further, the analog pixel data may include individual analog pixel values. In one embodiment, a first line of analog pixel values associated with a first line of pixels of a pixel array may be identified within the analog signal and selected. Next, each of a first gain 813, a second gain 815, and a third gain 817 may be applied in sequence or concurrently to the same first line of analog pixel values. In some embodiments less than or more than three different gains may be applied to a selected line of analog pixel values. For example, in some embodiments applying only two different gains to the same line of analog pixel values may be sufficient for generating a satisfactory HDR image. In one embodiment, after applying each of the first gain 813, the second gain 815, and the third gain 817, a second line of analog pixel values associated with a second line of pixels may be identified within the analog signal and selected. The second line of pixels may be a neighboring line of the first line of pixels. For example, the second line of pixels may be located immediately above or immediately below the first line of pixels in a pixel array of an image sensor. Next, each of the first gain 813, the second gain 815, and the third gain 817 may be applied in sequence or concurrently to the same second line of analog pixel values. To this end, in the per line timing configuration 811, a plurality of sequential lines of analog pixel values are identified within an analog signal, and a set of at least two gains are applied to each line of analog pixel values in the analog signal on a line-by-line basis.

Further, in systems that implement the per line timing configuration 811, a control unit may select a next gain to be applied after each line is amplified using a previously selected gain. In another embodiment, a control unit may control an amplifier to cycle through a set of predetermined gains that will be applied to a line so that each gain in the set is used to amplify a first line of analog pixel values before applying the set of predetermined gains to a second line of analog pixel values that arrives at the amplifier subsequent to the first line of analog pixel values. In one embodiment, and as shown in the context of FIG. 8, this may include selecting a first gain, applying the first gain to a received first line of analog pixel values, selecting a second gain, applying the second gain to the received first line of analog pixel values, selecting a third gain, applying the third selected gain to the received first line of analog pixel values, and then receiving a second line of analog pixel values and applying the three selected gains to the second line of analog pixel values in the same order as applied to the first line of analog pixel values. In one embodiment, each line of analog pixel values may be read a plurality of times. In another embodiment, an analog storage plane may be utilized to hold the analog pixel data values of one or more lines for reading.

In systems that implement per frame timing configuration 821, an analog signal that contains a plurality of analog pixel data values comprising analog pixel values may be received at an analog-to-digital unit. In such an embodiment, a first frame of analog pixel values associated with a first frame of pixels may be identified within the analog signal and selected. Next, each of a first gain 823, a second gain 825, and a third gain 827 may be applied in sequence or concurrently to the same first frame of analog pixel values. In some embodiments less than or more than three different gains may be applied to a selected frame of analog pixel values. For example, in some embodiments applying only two different gains to the same frame of analog pixel values may be sufficient for generating a satisfactory HDR image.

In one embodiment, after applying each of the first gain 823, the second gain 825, and the third gain 827, a second frame of analog pixel values associated with a second frame of pixels may be identified within the analog signal and selected. The second frame of pixels may be a next frame in a sequence of frames that capture video data associated with a photographic scene. For example, a digital photographic system may be operative to capture 30 frames per second of video data. In such digital photographic systems, the first frame of pixels may be one frame of said thirty frames, and the second frame of pixels may be a second frame of said thirty frames. Further still, each of the first gain 823, the second gain 825, and the third gain 827 may be applied in sequence to the analog pixel values of the second frame. To this end, in the per frame timing configuration 821, a plurality of sequential frames of analog pixel values may be identified within an analog signal, and a set of at least two gains are applied to each frame of analog pixel values on a frame-by-frame basis.

Further, in systems that implement the per frame timing configuration 821, a control unit may select a next gain to be applied after each frame is amplified using a previously selected gain. In another embodiment, a control unit may control an amplifier to cycle through a set of predetermined gains that will be applied to a frame so that each gain is used to amplify a analog pixel values associated with the first frame before applying the set of predetermined gains to analog pixel values associated with a second frame that subsequently arrive at the amplifier. In one embodiment, and as shown in the context of FIG. 8, this may include selecting a first gain, applying the first gain to analog pixel values associated with the first frame, selecting a second gain, applying the second gain to analog pixel values associated with the first frame, selecting a third gain, and applying the third gain to analog pixel values associated with the first frame. In another embodiment, analog pixel values associated with a second frame may be received following the application of all three selected gains to analog pixel values associated with the first frame, and the three selected gains may then be applied to analog pixel values associated with the second frame in the same order as applied to the first frame.

In yet another embodiment, selected gains applied to the first frame may be different than selected gains applied to the second frame, such as may be the case when the second frame includes different content and illumination than the first frame. In general, an analog storage plane may be utilized to hold the analog pixel data values of one or more frames for reading.

Figure 9:
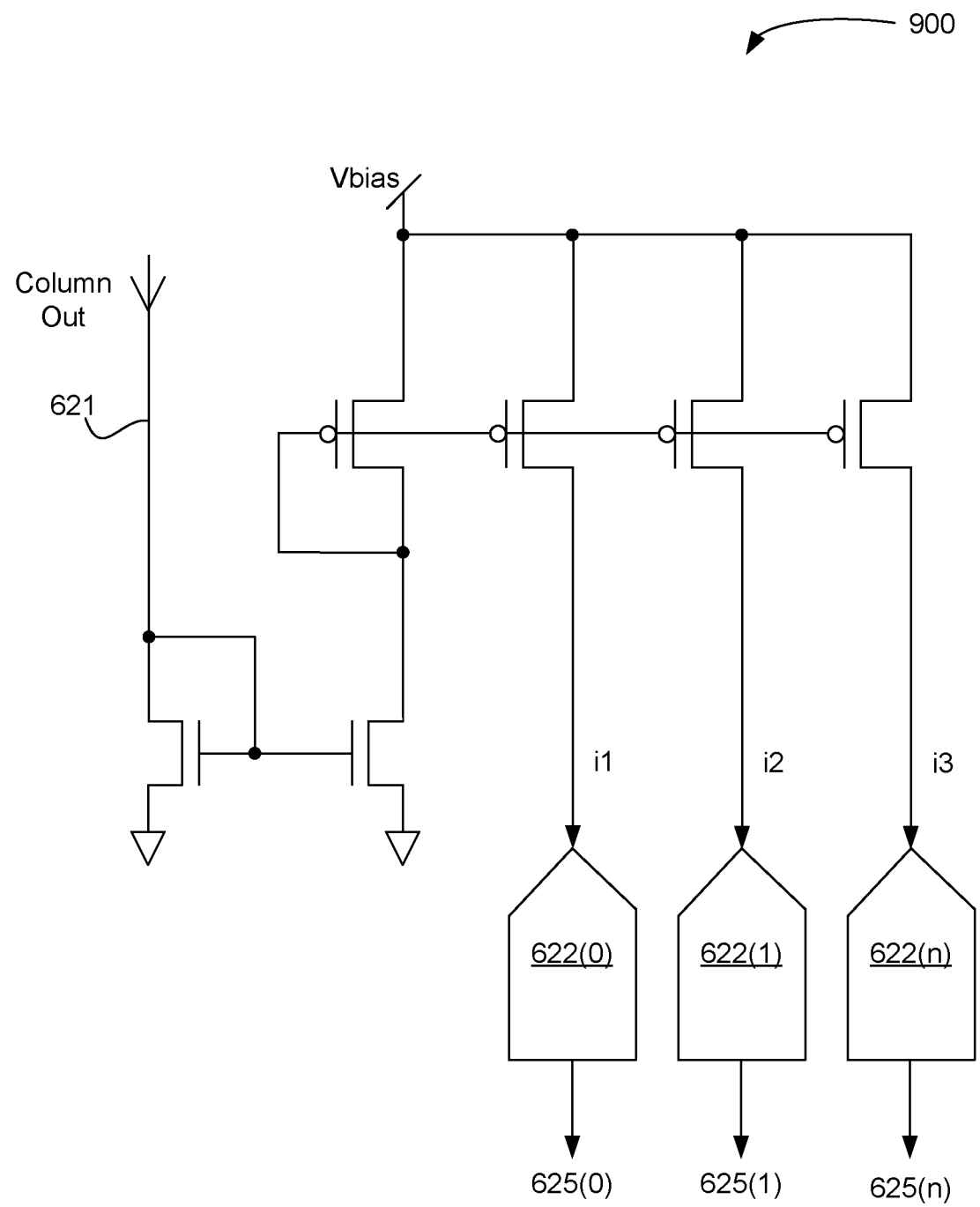
FIG. 9 illustrates a system for converting in parallel analog pixel data to multiple signals of digital pixel data, in accordance with one embodiment.

FIG. 9 illustrates a system 900 for converting in parallel analog pixel data to multiple signals of digital pixel data, in accordance with one embodiment. As an option, the system 900 may be implemented in the context of the details of any of the Figures disclosed herein. Of course, however, the system 900 may be implemented in any desired environment. Further, the aforementioned definitions may equally apply to the description below.

In the context of FIG. 9, the system 900 is shown to receive as input analog pixel data 621. The analog pixel data 621 may be received within an analog signal, as noted hereinabove. Further, the analog-to-digital units 622 may be configured to generate digital pixel data 625 based on the received analog pixel data 621.

As shown in FIG. 9, the system 900 is configured to mirror the current of the analog pixel data 621 such that each of analog-to-digital unit 622(0), analog-to-digital unit 622(1), and analog-to-digital unit 622(n) receive a scaled copy of the analog pixel data 621. In one embodiment, each of the analog-to-digital unit 622(0), the analog-to-digital unit 622(1), and the analog-to-digital unit 622(n) may be configured to apply a unique gain to the analog pixel data 621. Each scaled copy may be scaled according to physical dimensions for the transistors comprising system 900, which comprises a structure known in the art as a current mirror. As shown, each current i1, i2, i3 may be generated in an arbitrary ratio relative to input current Iin, based on the physical dimensions. For example, currents i1, i2, i3 may be generated in a ratio of 1:1:1, 1:2:4, 0.5:1:2, or any other technically feasible ratio relative to Iin.

In an embodiment, the unique gains may be configured at each of the analog-to-digital units 622 by a controller. By way of a specific example, the analog-to-digital unit 622(0) may be configured to apply a gain of 1.0 to the analog pixel data 621, the analog-to-digital unit 622(1) may be configured to apply a gain of 2.0 to the analog pixel data 621, and the analog-to-digital unit 622(n) may be configured to apply a gain of 4.0 to the analog pixel data 621. Accordingly, while the same analog pixel data 621 may be input transmitted to each of the analog-to-digital unit 622(0), the analog-to-digital unit 622(1), and the analog-to-digital unit 622(n), each of digital pixel data 625(0), digital pixel data 625(1), and digital pixel data 625(n) may include different digital values based on the different gains applied within the analog-to-digital units 622, and thereby provide unique exposure representations of the same photographic scene.

In the embodiment described above, where the analog-to-digital unit 622(0) may be configured to apply a gain of 1.0, the analog-to-digital unit 622(1) may be configured to apply a gain of 2.0, and the analog-to-digital unit 622(n) may be configured to apply a gain of 4.0, the digital pixel data 625(0) may provide the least exposed corresponding digital image. Conversely, the digital pixel data 625(n) may provide the most exposed digital image. In another embodiment, the digital pixel data 625(0) may be utilized for generating an EV−1 digital image, the digital pixel data 625(1) may be utilized for generating an EV0 digital image, and the digital pixel data 625(n) may be utilized for generating an EV+2 image. In another embodiment, system 900 is configured to generate currents i1, i2, and i3 in a ratio of 2:1:4, and each analog-to-digital unit 622 may be configured to apply a gain of 1.0, which results in corresponding digital images having exposure values of EV−1, EV0, and EV+1 respectively. In such an embodiment, further differences in exposure value may be achieved by applying non-unit gain within one or more analog-to-digital unit 622.

While the system 900 is illustrated to include three analog-to-digital units 622, it is contemplated that multiple digital images may be generated by similar systems with more or less than three analog-to-digital units 622. For example, a system with two analog-to-digital units 622 may be implemented for simultaneously generating two exposures of a photographic scene with zero interframe time in a manner similar to that described above with respect to system 900. In one embodiment, the two analog-to-digital units 622 may be configured to generate two exposures each, for a total of four different exposures relative to one frame of analog pixel data.

Figure 10:
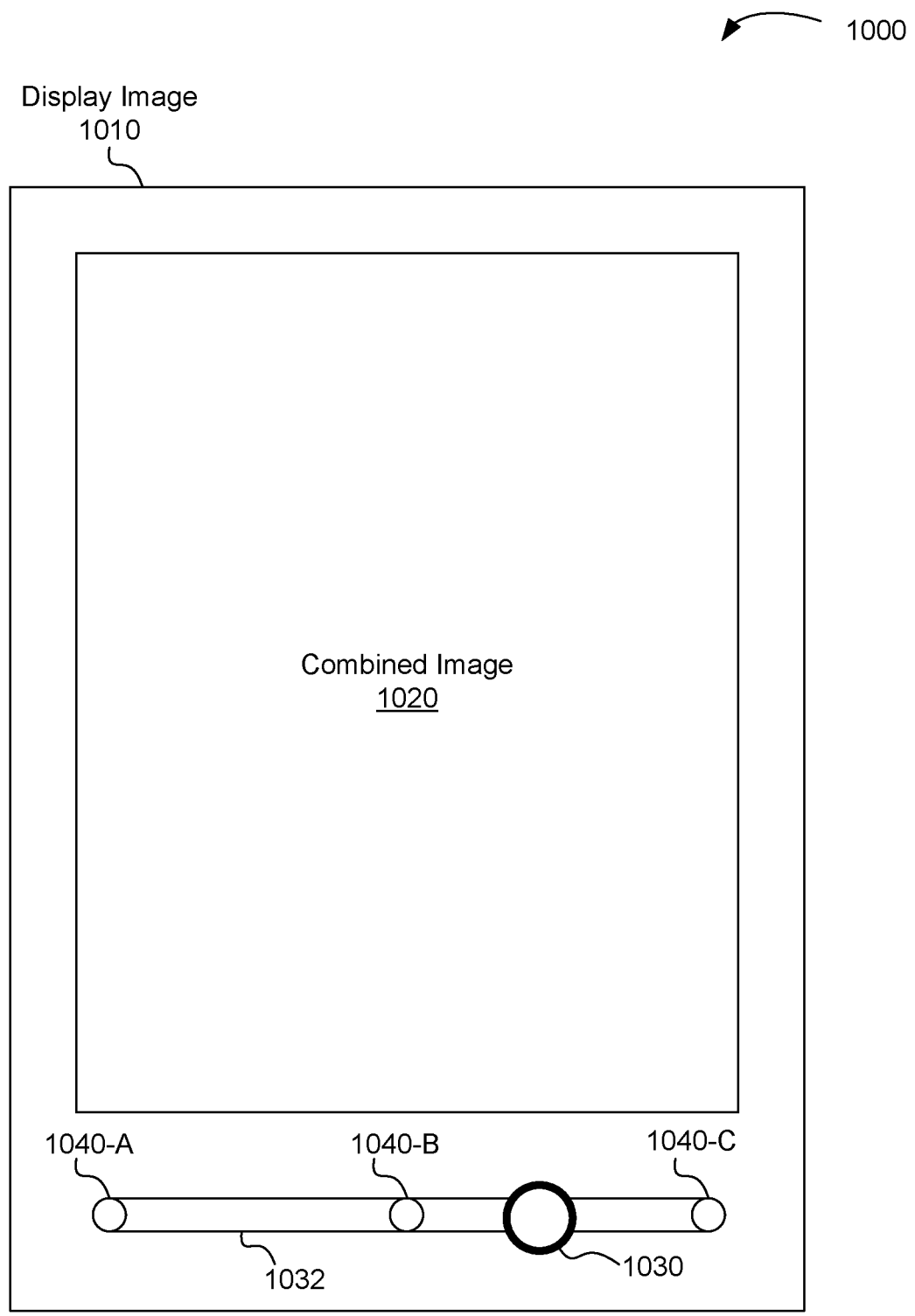
FIG. 10 illustrates a user interface system for generating a combined image, according to an embodiment.

FIG. 10 illustrates a user interface (UI) system 1000 for generating a combined image 1020, according to one embodiment. As an option, the UI system 1000 may be implemented in the context of the details of any of the Figures disclosed herein. Of course, however, the UI system 1000 may be carried out in any desired environment. Further, the aforementioned definitions may equally apply to the description below.

In one embodiment, a combined image 1020 comprises a combination of at least two related digital images. In one embodiment, the combined image 1020 comprises, without limitation, a combined rendering of a first digital image and a second digital image, such first digital image 732 and second digital image 734 of FIG. 7. In another embodiment, the digital images used to compute the combined image 1020 may be generated by amplifying an analog signal with at least two different gains, where the analog signal includes optical scene information captured based on an optical image focused on an image sensor. In yet another embodiment, the analog signal may be amplified using the at least two different gains on a pixel-by-pixel, line-by-line, or frame-by-frame basis.

In one embodiment, the UI system 1000 presents a display image 1010 that includes, without limitation, a combined image 1020, a slider control 1030 configured to move along track 1032, and two or more indication points 1040, which may each include a visual marker displayed within display image 1010.

In one embodiment, the UI system 1000 is generated by an adjustment tool executing within a processor complex 310 of a digital photographic system 300, and the display image 1010 is displayed on display unit 312. In one embodiment, at least two digital images, such as the at least two related digital images, comprise source images for generating the combined image 1020. The at least two digital images may reside within NV memory 316, volatile memory 318, memory subsystem 362, or any combination thereof. In another embodiment, the UI system 1000 is generated by an adjustment tool executing within a computer system, such as a laptop computer or a desktop computer. The at least two digital images may be transmitted to the computer system or may be generated by an attached camera device. In yet another embodiment, the UI system 1000 may be generated by a cloud-based server computer system, which may download the at least two digital images to a client browser, which may execute combining operations described below. In another embodiment, the UI system 1000 is generated by a cloud-based server computer system, which receives the at least two digital images from a digital photographic system in a mobile device, and which may execute the combining operations described below in conjunction with generating combined image 1020.

The slider control 1030 may be configured to move between two end points corresponding to indication points 1040-A and 1040-C. One or more indication points, such as indication point 1040-B may be positioned between the two end points. Each indication point 1040 may be associated with a specific version of combined image 1020, or a specific combination of the at least two digital images. For example, the indication point 1040-A may be associated with a first digital image generated utilizing a first gain, and the indication point 1040-C may be associated with a second digital image generated utilizing a second gain, where both of the first digital image and the second digital image are generated from a same analog signal of a single captured photographic scene. In one embodiment, when the slider control 1030 is positioned directly over the indication point 1040-A, only the first digital image may be displayed as the combined image 1020 in the display image 1010, and similarly when the slider control 1030 is positioned directly over the indication point 1040-C, only the second digital image may be displayed as the combined image 1020 in the display image 1010.

In one embodiment, indication point 1040-B may be associated with a blending of the first digital image and the second digital image. For example, when the slider control 1030 is positioned at the indication point 1040-B, the combined image 1020 may be a blend of the first digital image and the second digital image. In one embodiment, blending of the first digital image and the second digital image may comprise alpha blending, brightness blending, dynamic range blending, and/or tone mapping or other non-linear blending and mapping operations. In another embodiment, any blending of the first digital image and the second digital image may provide a new image that has a greater dynamic range or other visual characteristics that are different than either of the first image and the second image alone. Thus, a blending of the first digital image and the second digital image may provide a new computed HDR image that may be displayed as combined image 1020 or used to generate combined image 1020. To this end, a first digital signal and a second digital signal may be combined, resulting in at least a portion of a HDR image. Further, one of the first digital signal and the second digital signal may be further combined with at least a portion of another digital image or digital signal. In one embodiment, the other digital image may include another HDR image.

In one embodiment, when the slider control 1030 is positioned at the indication point 1040-A, the first digital image is displayed as the combined image 1020, and when the slider control 1030 is positioned at the indication point 1040-C, the second digital image is displayed as the combined image 1020; furthermore, when slider control 1030 is positioned at indication point 1040-B, a blended image is displayed as the combined image 1020. In such an embodiment, when the slider control 1030 is positioned between the indication point 1040-A and the indication point 1040-C, a mix (e.g. blend) weight may be calculated for the first digital image and the second digital image. For the first digital image, the mix weight may be calculated as having a value of 0.0 when the slider control 1030 is at indication point 1040-C and a value of 1.0 when slider control 1030 is at indication point 1040-A, with a range of mix weight values between 0.0 and 1.0 located between the indication points 1040-C and 1040-A, respectively. Referencing the mix operation instead to the second digital image, the mix weight may be calculated as having a value of 0.0 when the slider control 1030 is at indication point 1040-A and a value of 1.0 when slider control 1030 is at indication point 1040-C, with a range of mix weight values between 0.0 and 1.0 located between the indication points 1040-A and 1040-C, respectively.

A mix operation may be applied to the first digital image and the second digital image based upon at least one mix weight value associated with at least one of the first digital image and the second digital image. In one embodiment, a mix weight of 1.0 gives complete mix weight to the digital image associated with the 1.0 mix weight. In this way, a user may blend between the first digital image and the second digital image. To this end, a first digital signal and a second digital signal may be blended in response to user input. For example, sliding indicia may be displayed, and a first digital signal and a second digital signal may be blended in response to the sliding indicia being manipulated by a user.

This system of mix weights and mix operations provides a UI tool for viewing the first digital image, the second digital image, and a blended image as a gradual progression from the first digital image to the second digital image. In one embodiment, a user may save a combined image 1020 corresponding to an arbitrary position of the slider control 1030. The adjustment tool implementing the UI system 1000 may receive a command to save the combined image 1020 via any technically feasible gesture or technique. For example, the adjustment tool may be configured to save the combined image 1020 when a user gestures within the area occupied by combined image 1020. Alternatively, the adjustment tool may save the combined image 1020 when a user presses, but does not otherwise move the slider control 1030. In another implementation, the adjustment tool may save the combined image 1020 when a user gestures, such as by pressing a UI element (not shown), such as a save button, dedicated to receive a save command.

To this end, a slider control may be used to determine a contribution of two or more digital images to generate a final computed image, such as combined image 1020. Persons skilled in the art will recognize that the above system of mix weights and mix operations may be generalized to include two or more indication points, associated with two or more related images. Such related images may comprise, without limitation, any number of digital images that have been generated using a same analog signal to have different brightness values, which may have zero interframe time.

Furthermore, a different continuous position UI control, such as a rotating knob, may be implemented rather than the slider control 1030 to provide mix weight input or color adjustment input from the user.

Figure 11:
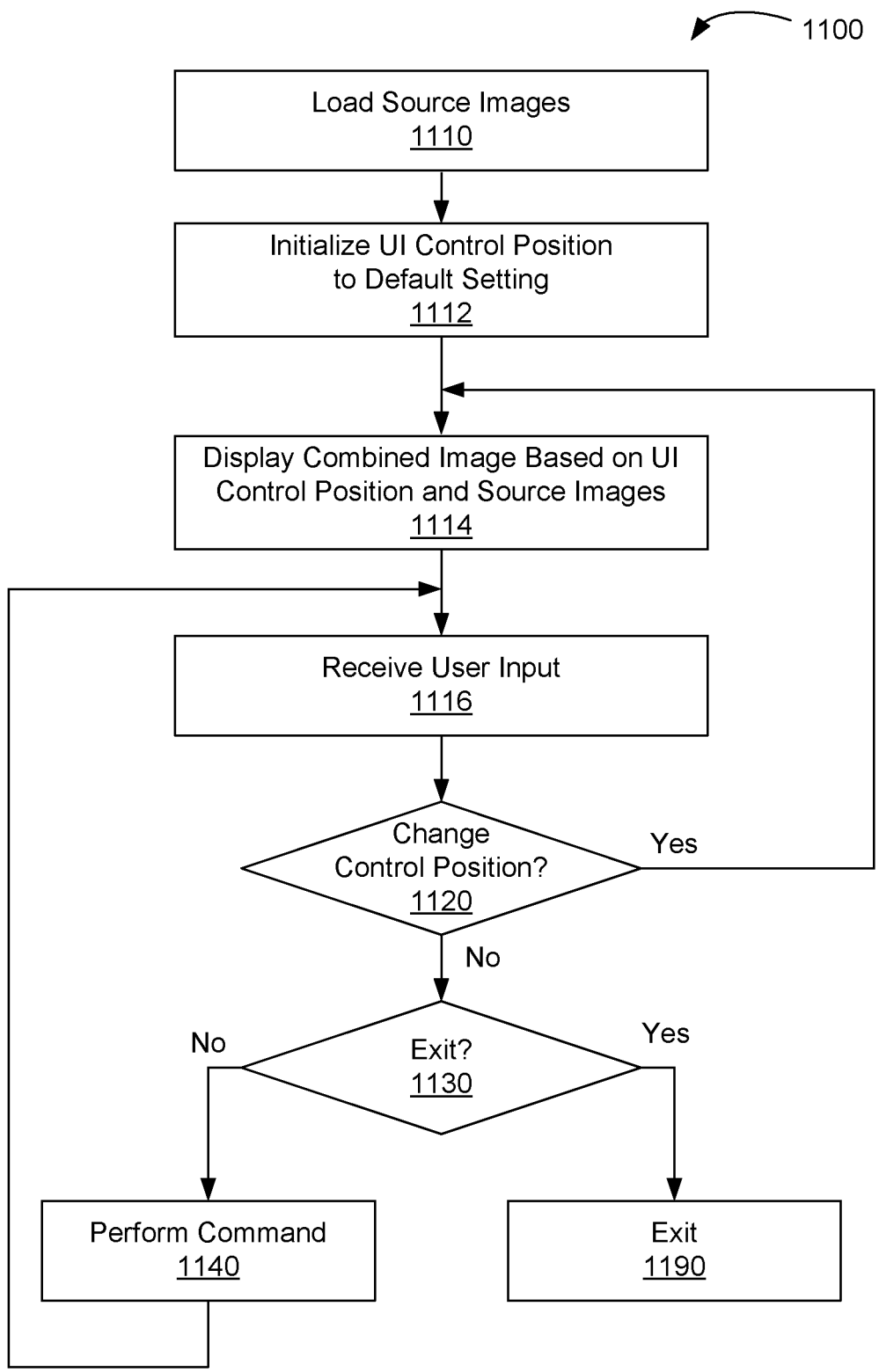
FIG. 11 is a flow diagram of method steps for generating a combined image, according to one embodiment.

FIG. 11 is a flow diagram of method 1100 for generating a combined image, according to one embodiment. As an option, the method 1100 may be implemented in the context of the details of any of the Figures disclosed herein. Of course, however, the method 1100 may be carried out in any desired environment. Further, the aforementioned definitions may equally apply to the description below.

The method 1100 begins in step 1110, where an adjustment tool executing within a processor complex, such as processor complex 310, loads at least two related source images, such as the first digital image and the second digital image described in the context of FIG. 10. In step 1112, the adjustment tool initializes a position for a UI control, such as slider control 1030 of FIG. 10, to a default setting. In one embodiment, the default setting comprises an end point, such as indication point 1040-A, for a range of values for the UI control. In another embodiment, the default setting comprises a calculated value based on one or more of the at least two related source images. In certain embodiments, the default setting is initialized to a value previously selected by a user in association with an image object comprising at least the first digital image and the second digital image.

In step 1114, the adjustment tool generates and displays a combined image, such as combined image 1020 of FIG. 10, based on a position of the UI control and the at least two related source images. In one embodiment, generating the combined image comprises mixing the at least two related source images as described previously in FIG. 10. In step 1116, the adjustment tool receives user input. The user input may include, without limitation, a UI gesture such as a selection gesture or click gesture within display image 1010. If, in step 1120, the user input should change the position of the UI control, then the adjustment tool changes the position of the UI control and the method proceeds back to step 1114. Otherwise, the method proceeds to step 1130.

If, in step 1130, the user input does not comprise a command to exit, then the method proceeds to step 1140, where the adjustment tool performs a command associated with the user input. In one embodiment, the command comprises a save command and the adjustment tool then saves the combined image, which is generated according to a position of the UI control. The method then proceeds back to step 1116.

Returning to step 1130, if the user input comprises a command to exit, then the method terminates in step 1190, where the adjustment tool exits, thereby terminating execution.

In summary, a technique is disclosed for generating a new digital photograph that beneficially blends a first digital image and a second digital image, where the first digital image and the second digital image are both based on a single analog signal received from an image sensor. The first digital image may be blended with the second digital image based on a function that implements any technically feasible blend technique. An adjustment tool may implement a user interface technique that enables a user to select and save the new digital photograph from a gradation of parameters for combining related images.

One advantage of the present invention is that a digital photograph may be selectively generated based on user input using two or more different exposures of a single capture of a photographic scene. Accordingly, the digital photograph generated based on the user input may have a greater dynamic range than any of the individual exposures. Further, the generation of an HDR image using two or more different exposures with zero interframe time allows for the rapid generation of HDR images without motion artifacts.

Figure 12:
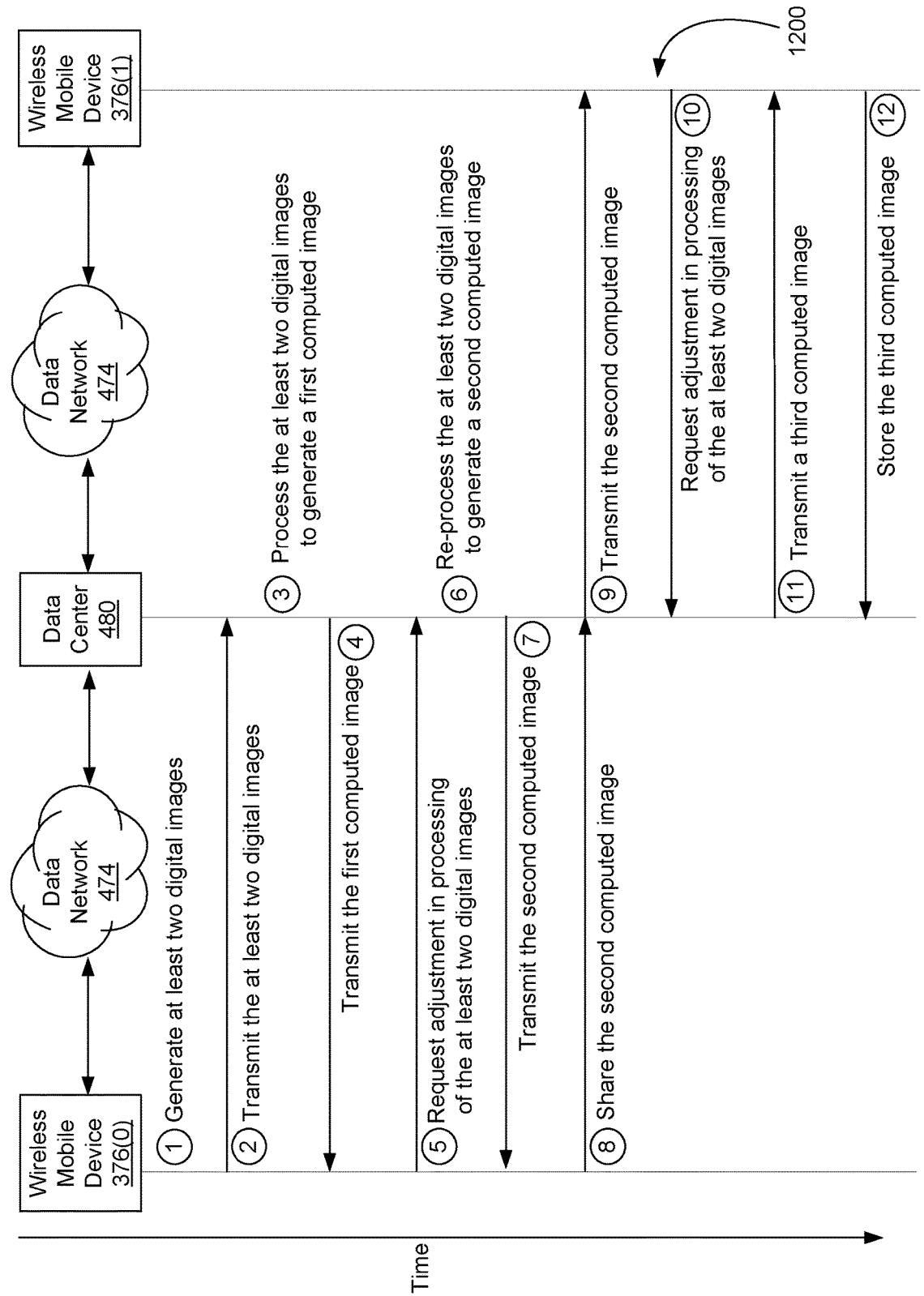
FIG. 12 illustrates a message sequence for generating a combined image utilizing a network, according to another embodiment.

FIG. 12 illustrates a message sequence 1200 for generating a combined image utilizing a network, according to one embodiment. As an option, the message sequence 1200 may be implemented in the context of the details of any of the Figures disclosed herein. Of course, however, the message sequence 1200 may be carried out in any desired environment. Further, the aforementioned definitions may equally apply to the description below.

As shown in FIG. 12, a wireless mobile device 376(0) generates at least two digital images. In one embodiment, the at least two digital images may be generated by amplifying an analog signal with at least two gains, where each generated digital image corresponds to digital output of an applied gain. As described previously, at least two different gains may be applied by one or more amplifiers to an analog signal containing analog pixel data in order to generate gain-adjusted analog pixel data. Further, the gain-adjusted analog pixel data may then be converted to the at least two digital images utilizing at least one analog-to-digital converter, where each of the digital images provides a different exposure of a same photographic scene. For example, in one embodiment, the at least two digital images may include an EV−1 exposure of the photographic scene and an EV+1 exposure of the photographic scene. In another embodiment, the at least two digital images may include an EV−2 exposure of the photographic scene, an EV0 exposure of the photographic scene, and an EV+2 exposure of the photographic scene.

Referring again to FIG. 12, the at least two digital images are transmitted from the wireless mobile device 376(0) to a data center 480 by way of a data network 474. The at least two digital images may be transmitted by the wireless mobile device 376(0) to the data center 480 using any technically feasible network communication method.

Further, in one embodiment, the data center 480 may then process the at least two digital images to generate a first computed image. The processing of the at least two digital images may include any processing of the at least two digital images that blends or merges at least a portion of each of the at least two digital images to generate the first computed image. To this end, the first digital image and the second digital image may be combined remotely from the wireless mobile device 376(0). For example, the processing of the at least two digital images may include an any type of blending operation, including but not limited to, an HDR image combining operation. In one embodiment, the processing of the at least two digital images may include any computations that produce a first computed image having a greater dynamic range than any one of the digital images received at the data center 480. Accordingly, in one embodiment, the first computed image generated by the data center 480 may be an HDR image. In other embodiments, the first computed image generated by the data center 480 may be at least a portion of an HDR image.

After generating the first computed image, the data center 480 may then transmit the first computed image to the wireless mobile device 376(0). In one embodiment, the transmission of the at least two digital images from the wireless mobile device 376(0), and the receipt of the first computed image at the wireless device 376(0), may occur without any intervention or instruction being received from a user of the wireless mobile device 376(0). For example, in one embodiment, the wireless mobile device 376(0) may transmit the at least two digital images to the data center 480 immediately after capturing a photographic scene and generating the at least two digital images utilizing an analog signal representative of the photographic scene. The photographic scene may be captured based on a user input or selection of an electronic shutter control, or pressing of a manual shutter button, on the wireless mobile device 376(0). Further, in response to receiving the at least two digital images, the data center 480 may generate an HDR image based on the at least two digital images, and transmit the HDR image to the wireless mobile device 376(0). The wireless mobile device 376(0) may then display the received HDR image. Accordingly, a user of the wireless mobile device 376(0) may view on the display of the wireless mobile device 376(0) an HDR image computed by the data center 480. Thus, even though the wireless mobile device 376(0) does not perform any HDR image processing, the user may view on the wireless mobile device 376(0) the newly computed HDR image substantially instantaneously after capturing the photographic scene and generating the at least two digital images on which the HDR image is based.

As shown in FIG. 12, the wireless mobile device 376(0) requests adjustment in processing of the at least two digital images. In one embodiment, upon receiving the first computed image from the data center 480, the wireless mobile device 376(0) may display the first computed image in a UI system, such as the UI system 1000 of FIG. 10. In such an embodiment, the user may control a slider control, such as the slider control 1030, to adjust the processing of the at least two digital images transmitted to the data center 480. For example, user manipulation of a slider control may result in commands being transmitted to the data center 480. In one embodiment, the commands transmitted to the data center 480 may include mix weights for use in adjusting the processing of the at least two digital images. In other embodiments, the request to adjust processing of the at least two digital images includes any instructions from the wireless mobile device 376(0) that the data center 480 may use to again process the at least two digital images and generate a second computed image.

As shown in FIG. 12, upon receiving the request to adjust processing, the data center 480 re-processes the at least two digital images to generate a second computed image. In one embodiment, the data center 480 may re-process the at least two digital images using parameters received from the wireless mobile device 376(0). In such an embodiment, the parameters may be provided as input with the at least two digital images to an HDR processing algorithm that executes at the data center 480. After generating the second computed image, the second computed image may be then transmitted from the data center 480 to the wireless mobile device 376(0) for display to the user.

Referring again to FIG. 12, the wireless mobile device 376(0) shares the second computed image with another wireless mobile device 376(1). In one embodiment, the wireless mobile device 376(0) may share any computed image received from the data center 480 with the other wireless mobile device 376(1). For example, the wireless mobile device 376(0) may share the first computed image received from the data center 480. As shown in FIG. 12, the data center 480 communicates with the wireless mobile device 376(0) and the wireless mobile device 376(1) over the same data network 474. Of course, in other embodiments the wireless mobile device 376(0) may communicate with the data center 480 via a network different than a network utilized by the data center 480 and the wireless mobile device 376(1) for communication.

In another embodiment, the wireless mobile device 376(0) may share a computed image with the other wireless mobile device 376(1) by transmitting a sharing request to data center 480. For example, the wireless mobile device 376(0) may request that the data center 480 forward the second computed to the other wireless mobile device 376(1). In response to receiving the sharing request, the data center 480 may then transmit the second computed image to the wireless mobile device 376(1). In an embodiment, transmitting the second computed image to the other wireless mobile device 376(1) may include sending a URL at which the other wireless mobile device 376(1) may access the second computed image.

Still further, as shown in FIG. 12, after receiving the second computed image, the other wireless mobile device 376(1) may send to the data center 480 a request to adjust processing of the at least two digital images. For example, the other wireless mobile device 376(1) may display the second computed image in a UI system, such as the UI system 1000 of FIG. 10. A user of the other wireless mobile device 376(1) may manipulate UI controls to adjust the processing of the at least two digital images transmitted to the data center 480 by the wireless mobile device 376(0). For example, user manipulation of a slider control at the other wireless mobile device 376(1) may result in commands being generated and transmitted to data center 480 for processing. In an embodiment, the request to adjust the processing of the at least two digital images sent from the other wireless mobile device 376(1) includes the commands generated based on the user manipulation of the slider control at the other wireless mobile device 376(1). In other embodiments, the request to adjust processing of the at least two digital images includes any instructions from the wireless mobile device 376(1) that the data center 480 may use to again process the at least two digital images and generate a third computed image.

As shown in FIG. 12, upon receiving the request to adjust processing, the data center 480 re-processes the at least two digital images to generate a third computed image. In one embodiment, the data center 480 may re-process the at least two digital images using mix weights received from the wireless mobile device 376(1). In such an embodiment, the mix weights received from the wireless mobile device 376(1) may be provided as input with the at least two digital images to an HDR processing algorithm that executes at the data center 480. After generating the third computed image, the third computed image is then transmitted from the data center 480 to the wireless mobile device 376(1) for display. Still further, after receiving the third computed image, the wireless mobile device 376(1) may send to the data center 480 a request to store the third computed image. In another embodiment, other wireless mobile devices 376 in communication with the data center 480 may request storage of a computed image. For example, in the context of FIG. 12, the wireless mobile device 376(0) may at any time request storage of the first computed image or the second computed image.

In response to receiving a request to store a computed image, the data center 480 may store the computed image for later retrieval. For example, the stored computed image may be stored such that the computed image may be later retrieved without re-applying the processing that was applied to generate the computed image. In one embodiment, the data center 480 may store computed images within a storage system 486 local to the data center 480. In other embodiments, the data center 480 may store computed images within hardware devices not local to the data center 480, such as a data center 481. In such embodiments, the data center 480 may transmit the computed images over the data network 474 for storage.

Still further, in some embodiments, a computed image may be stored with a reference to the at least two digital images utilized to generate the computed image. For example, the computed image may be associated with the at least two digital images utilized to generate the computed image, such as through a URL served by data center 480 or 481. By linking the stored computed image to the at least two digital images, any user or device with access to the computed image may also be given the opportunity to subsequently adjust the processing applied to the at least two digital images, and thereby generate a new computed image.

To this end, users of wireless mobile devices 376 may leverage processing capabilities of a data center 480 accessible via a data network 474 to generate an HDR image utilizing digital images that other wireless mobile devices 376 have captured and subsequently provided access to. For example, digital signals comprising digital images may be transferred over a network for being combined remotely, and the combined digital signals may result in at least a portion of a HDR image. Still further, a user may be able to adjust a blending of two or more digital images to generate a new HDR photograph without relying on their wireless mobile device 376 to perform the processing or computation necessary to generate the new HDR photograph. Subsequently, the user's device may receive at least a portion of a HDR image resulting from a combination of two or more digital signals. Accordingly, the user's wireless mobile device 376 may conserve power by offloading HDR processing to a data center. Further, the user may be able to effectively capture HDR photographs despite not having a wireless mobile device 376 capable of performing high-power processing tasks associated with HDR image generation. Finally, the user may be able to obtain an HDR photograph generated using an algorithm determined to be best for a photographic scene without having to select the HDR algorithm himself or herself and without having installed software that implements such an HDR algorithm on their wireless mobile device 376. For example, the user may rely on the data center 480 to identify and to select a best HDR algorithm for a particular photographic scene.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
   an image sensor;
   at least one circuit in communication with the image sensor to generate a first amplified analog signal based on application of a first gain to at least one analog pixel value of at least one of a plurality of frames captured by the image sensor, and to generate a second amplified analog signal based on application of a second gain to the at least one analog pixel value, such that the second gain differs from the first gain;
   a first analog-to-digital converter in communication with the at least one circuit to convert the first amplified analog signal to a first digital signal; and
   a second analog-to-digital converter in communication with the at least one circuit to convert the second amplified analog signal to a second digital signal;

wherein the apparatus is configured such that a high dynamic range (HDR) image is created based on at least a portion of the first digital signal and at least a portion of the second digital signal, where an amount of the at least portion of the first digital signal and an amount of the at least portion of the second digital signal, are based on detected user input.

2. The apparatus of claim 1, wherein the apparatus is configured such that the first amplified analog signal is generated simultaneously with the second amplified analog signal.

3. The apparatus of claim 1, wherein the apparatus is configured such that the first amplified analog signal is generated in serial with the second amplified analog signal.

4. The apparatus of claim 1, wherein the apparatus is configured such that the first amplified analog signal is converted to the first digital signal concurrent with the conversion of the second amplified analog signal to the second digital signal.

5. The apparatus of claim 1, wherein the apparatus is configured such that the first digital signal is associated with a first light sensitivity value, and the second digital signal is associated with a second light sensitivity value.

6. The apparatus of claim 1, wherein the apparatus is configured such that sliding indicia is displayed, and the HDR image is created in response to user manipulation of the sliding indicia being detected.

7. The apparatus of claim 1, wherein the apparatus is configured such that at least one of the first digital signal or the second digital signal is combined with at least a portion of another image other than the HDR image.

8. The apparatus of claim 7, wherein the apparatus is configured such that the another image is another HDR image.

9. The apparatus of claim 1, wherein the apparatus is configured such that a first digital value specifies the first gain, and a second digital value specifies the second gain.

10. The apparatus of claim 9, wherein the apparatus is configured such that at least one of the first digital value or the second digital value is selected based on a mapping from the at least one of the first digital value or the second digital value to an International Organization for Standardization (ISO) value.

11. The apparatus of claim 1, wherein the apparatus is configured such that the first amplified analog signal and the second amplified analog signal each include gain-adjusted analog pixel data representative of a common analog value from analog pixel values of a pixel array of the image sensor.

12. An apparatus, comprising:
image sensor means for capturing a plurality of frames;
at least one circuit means for generating a first amplified analog signal based on application of a first gain to at least one analog signal from at least one of the plurality of frames, and for generating a second amplified analog signal based on application of a second gain to the at least one analog signal from the plurality of frames, such that the second gain differs from the first gain;
a first analog-to-digital converter means for converting the first amplified analog signal to a first digital signal;
a second analog-to-digital converter means for converting the second amplified analog signal to a second digital signal; and
means for generating a high dynamic range (HDR) image based on the first digital signal and the second digital signal.

13. An apparatus, comprising:
an image sensor including a plurality of cells each corresponding with a pixel and each including a first photodiode and a second photodiode both positioned behind a filter for a single color; and
a plurality of circuits each including:
a first amplifier in communication with the image sensor, the first amplifier amplifying a first signal generated by one of the cells based on a first gain and, subsequently, amplifying the first signal based on a second gain that is greater than the first gain,
a second amplifier in communication with the image sensor, the second amplifier amplifying a second signal generated by the one of the cells based on the first gain and, subsequently, amplifying the second signal based on the second gain that is greater than the first gain,
a first analog-to-digital converter in communication with the first amplifier, the first analog-to-digital converter converting an output of the first amplifier from an analog format to a digital format, and
a second analog-to-digital converter in communication with the second amplifier, the second analog-to-digital converter converting an output of the second amplifier from the analog format to the digital format, such that a high dynamic range (HDR) image is generated based, at least in part, on an output of the first analog-to-digital converter and an output of the second analog-to-digital converter.

14. The apparatus of claim 13, wherein the apparatus is configured such that the first photodiode and the second photodiode are the only photodiodes included in a single cavity of the one of the cells.

15. The apparatus of claim 13, wherein the apparatus is configured such that the plurality of cells each include a single lens that the filter for the single color is positioned behind.

16. The apparatus of claim 13, wherein the apparatus is configured such that the image sensor includes a complementary metal oxide semiconductor (CMOS) image sensor.

17. The apparatus of claim 13, wherein the apparatus is configured such that the first signal is generated by the first photodiode of the one of the cells, and the second signal is generated by the second photodiode of the one of the cells.

18. The apparatus of claim 13, wherein the apparatus is configured such that the first signal is generated based on the first photodiode of the one of the cells and not generated based on the second photodiode of the one of the cells, and the second signal is generated based on the second photodiode of the one of the cells and not generated based on the first photodiode of the one of the cells.

19. The apparatus of claim 13, wherein the apparatus is configured such that the first signal and the second signal are concurrently generated.

20. The apparatus of claim 13, wherein the apparatus is configured such that the first photodiode and the second photodiode are in communication with two sampling circuits that each include:
a sampling transistor having: a first node coupled to at least one of the first photodiode or the second photodiode, and a second node coupled to at least one reset transistor and at least one additional transistor; and
a selection transistor having: a first node coupled to the at least one additional transistor, and a second node coupled to a corresponding output.

21. The apparatus of claim 13, wherein the apparatus is configured such that the one of the cells concurrently generate the first signal and the second signal; the first amplifier amplifies the first signal based on the first gain concurrently with the second amplifier amplifying the second signal based on the first gain; the first amplifier amplifies the first signal based on the second gain concurrently with the second amplifier amplifying the second signal based on the second gain; and the first analog-to-digital converter converts the output of the first amplifier concurrently with the second analog-to-digital converter converting the output of the second amplifier.

22. The apparatus of claim 13, wherein the apparatus is configured such that the first gain includes a gain of one (1).

23. The apparatus of claim 13, wherein the apparatus is configured such that the first signal and the second signal are each generated by the one of the cells without using different sample times, where the first gain is applied for a frame in its entirety without any gain other than the first gain being applied for the frame, after which the second gain is applied for the frame in its entirety without any gain other than the second gain being applied for the frame.

24. The apparatus of claim 13, wherein the apparatus is configured such that at least one of the first signal or the second signal is generated by the one of the cells utilizing a sample time, such that the HDR image is output utilizing another sample time that is greater than the sample time.

25. The apparatus of claim 13, wherein the apparatus is configured such that at least one of the first signal or the second signal is generated by the one of the cells utilizing a sample time of substantially 1/120 second.

26. The apparatus of claim 13, wherein the apparatus is configured such that the first signal is processed by the first amplifier and the first analog-to-digital converter, with a sample time, such that the HDR image is output utilizing another sample time that is greater than the sample time.

27. The apparatus of claim 13, wherein the apparatus is configured such that the first signal is processed by the first amplifier and the first analog-to-digital converter, with a sample time including substantially 1/120 second, such that the HDR image is output utilizing another sample time that is greater than the sample time.

28. The apparatus of claim 13, wherein the apparatus includes at least one storage storing the first signal and the second signal, such that the first signal is read multiple times from the at least one storage by the first amplifier and the second signal is read multiple times from the at least one storage by the second amplifier.

29. The apparatus of claim 13, wherein the apparatus includes a first capacitor storing the first signal and a second capacitor storing the second signal, such that the first signal is read multiple times from the first capacitor by the first amplifier and the second signal is read multiple times from the second capacitor by the second amplifier.

30. The apparatus of claim 13, wherein the apparatus is configured such that the first amplifier and the second amplifier of all of the plurality of circuits collectively amplify based on the first gain across all of the plurality of cells of the image sensor for one frame, before the first amplifier and the second amplifier of all of the plurality of circuits collectively amplify based on the second gain across all of the plurality of cells of the image sensor for the one frame.

31. The apparatus of claim 13, wherein the apparatus is configured such that the first amplifier and the second amplifier of the plurality of circuits collectively amplify based on the first gain across the plurality of cells of the image sensor for one frame, for a first duration of substantially 1/120 second, before the first amplifier and the second amplifier of the plurality of circuits collectively amplify based on the second gain across the plurality of cells of the image sensor for the one frame, for a subsequent second duration of substantially 1/120 second.

32. The apparatus of claim 13, wherein the apparatus is configured such that a number of the plurality of circuits is equal to a number of a subset of the plurality of cells in a single line of the image sensor, such that the plurality of circuits collectively process all of the subset of the plurality of cells in the single line of the image sensor, in parallel, where the first amplifier and the second amplifier of the plurality of circuits amplify based on the first gain, line-by-line, for all lines of the image sensor in connection with one frame, before the first amplifier and the second amplifier of the plurality of circuits amplify based on the second gain, line-by-line, for all lines of the image sensor in connection with the one frame.

33. The apparatus of claim 13, wherein the apparatus is configured such that the first amplifier the second amplifier only amplify based on the first gain and the second gain.

34. The apparatus of claim 13, wherein the apparatus is configured such that the first amplifier amplifies the first signal and the second amplifier amplifies the second signal, before the first signal and the second signal are further processed for output via a line readout circuit.

35. The apparatus of claim 13, wherein the apparatus is configured such that the first signal and the second signal that are amplified based on the second gain are gain adjusted in the digital format.

36. The apparatus of claim 13, wherein the apparatus is configured such that the first signal and the second signal that are amplified based on the second gain are adjusted, based on a normalization, in the digital format.

37. The apparatus of claim 13, wherein the apparatus is configured such that at least one of the first signal or the second signal that is amplified based on the second gain is gain adjusted in the digital format, without the at least one of the first signal or the second signal that is amplified based on the first gain being subject to the gain adjustment in the digital format.

38. The apparatus of claim 13, wherein the apparatus is configured such that the first signal and the second signal that are amplified based on the second gain are gain adjusted in the digital format, without the first signal and the second signal that are amplified based on the first gain being subject to the gain adjustment in the digital format.

39. The apparatus of claim 13, wherein the apparatus is configured such that the first signal and the second signal that are amplified based on the second gain are gain adjusted in the digital format, such that the gain adjustment is performed by a processor that is communication with a controller that is in communication with the first amplifier, the second amplifier, the first analog-to-digital converter, and the second analog-to-digital converter, where the controller controls the first amplifier, the second amplifier, the first analog-to-digital converter, and the second analog-to-digital converter.

40. The apparatus of claim 13, wherein the apparatus is configured such that at least one of the first signal or the second signal that is amplified based on the second gain is subject to a limit in the digital format.

41. The apparatus of claim 13, wherein the apparatus is configured such that at least one of the first signal or the second signal that is amplified based on the second gain is subject to a limit in the digital format, without the at least one of the first signal or the second signal that is amplified based on the first gain being subject to the limit in the digital format.

42. The apparatus of claim 13, wherein the apparatus is configured such that the first signal and the second signal that are amplified based on the second gain are subject to a gain adjustment and a limit in the digital format, without the first signal and the second signal that are amplified based on the first gain being subject to the gain adjustment and the limit in the digital format.

43. The apparatus of claim 42, wherein the apparatus is configured such that the gain adjustment and the limit are implemented by an application processor that is communication with a controller that is in communication with the first amplifier, the second amplifier, the first analog-to-digital converter, and the second analog-to-digital converter, where the controller controls the first amplifier, the second amplifier, the first analog-to-digital converter, and the second analog-to-digital converter.

44. The apparatus of claim 13, wherein the apparatus is configured such that each of the plurality of circuits include, for a corresponding one of the cells of each of a plurality of lines of the image sensor, no amplifier other than the first amplifier and the second amplifier, and no analog-to-digital converter other than the first analog-to-digital converter and the second analog-to-digital converter.

45. The apparatus of claim 13, wherein the apparatus is configured such that:
the image sensor includes a complementary metal oxide semiconductor (CMOS) image sensor;
the first photodiode and the second photodiode are the only photodiodes of the one of the cells;
the first amplifier the second amplifier do not amplify based on any gain other than the first gain and the second gain;
each of the plurality of circuits include, for the one of the cells of the image sensor, no amplifier other than the first amplifier and the second amplifier, and no analog-to-digital converter other than the first analog-to-digital converter and the second analog-to-digital converter; and
the plurality of circuits amplify based on the first gain across the plurality of cells of the image sensor for the one frame, before the plurality of circuits amplify based on the second gain across the plurality of cells of the image sensor for the one frame.

46. The apparatus of claim 45, wherein the apparatus is configured such that the first signal is generated based on the first photodiode of the one of the cells and not generated based on the second photodiode of the one of the cells, and the second signal is generated based on the second photodiode of the one of the cells and not generated based on the first photodiode of the one of the cells.

47. The apparatus of claim 45, wherein the apparatus is configured such that the first photodiode and the second photodiode are in communication with two sampling circuits that each include:
a sampling transistor having: a first node coupled to at least one of the first photodiode or the second photodiode, and a second node coupled to at least one reset transistor and at least one additional transistor; and
a selection transistor having: a first node coupled to the at least one additional transistor, and a second node coupled to a corresponding output.

48. The apparatus of claim 45, wherein the apparatus is configured such that at least one of the first signal or the second signal is generated by the one of the cells utilizing a sample time, such that the HDR image is output utilizing another sample time that is greater than the sample time.

49. The apparatus of claim 48, wherein the apparatus is configured such that the sample time includes substantially 1/120 second.

50. The apparatus of claim 45, wherein the apparatus includes a first capacitor storing the first signal and a second capacitor storing the second signal, such that the first signal is read multiple times from the first capacitor by the first amplifier and the second signal is read multiple times from the second capacitor by the second amplifier.

51. The apparatus of claim 45, wherein the apparatus is configured such that a number of the plurality of circuits is equal to a number of a subset of the plurality of cells in a single line of the image sensor, such that the plurality of circuits collectively process all of the subset of the plurality of cells in the single line of the image sensor, in parallel, where the first amplifier and the second amplifier of the plurality of circuits amplify based on the first gain, line-by-line, for lines of the image sensor in connection with one frame, before the first amplifier and the second amplifier of the plurality of circuits amplify based on the second gain, line-by-line, for the lines of the image sensor in connection with the one frame.

52. The apparatus of claim 45, wherein the apparatus is configured such that the first amplifier amplifies the first signal and the second amplifier amplifies the second signal, before the first signal and the second signal are further processed for output via a line readout circuit.

53. The apparatus of claim 45, wherein the apparatus is configured such that the first signal and the second signal that are amplified based on the second gain are subject to a limit in the digital format, without the first signal and the second signal that are amplified based on the first gain being subject to the limit in the digital format.

54. The apparatus of claim 45, wherein the apparatus is configured such that the first signal and the second signal that are amplified based on the second gain are gain adjusted in the digital format, without the first signal and the second signal that are amplified based on the first gain being subject to the gain adjustment in the digital format.

55. The apparatus of claim 45, wherein the apparatus is configured such that:
the apparatus includes a first capacitor storing the first signal and a second capacitor storing the second signal, such that the first signal is read multiple times from the first capacitor by the first amplifier and the second signal is read multiple times from the second capacitor by the second amplifier;
the first photodiode and the second photodiode are in communication with two sampling circuits that each include:
a sampling transistor having: a first node coupled to at least one of the first photodiode or the second photodiode, and a second node coupled to at least one reset transistor and at least one additional transistor, and
a selection transistor having: a first node coupled to the at least one additional transistor, and a second node coupled to a corresponding output;
a number of the plurality of circuits is equal to a number of a subset of the plurality of cells in a single line of the image sensor, such that the plurality of circuits collectively process all of the subset of the plurality of cells in the single line of the image sensor, in parallel, where the first amplifier and the second amplifier of the plurality of circuits amplify based on the first gain, line-by-line, for all lines of the image sensor in connection with one frame, before the first amplifier and the second amplifier of the plurality of circuits amplify based on the second gain, line-by-line, for all lines of the image sensor in connection with the one frame; and the first amplifier amplifies the first signal and the second amplifier amplifies the second signal, before the first signal and the second signal are further processed for output via a line readout circuit.

56. The apparatus of claim 55, wherein the first gain includes a gain of one (1).

57. The apparatus of claim 55, wherein the apparatus is configured such that the first signal and the second signal that are amplified based on the second gain are subject to a limit in the digital format, without the first signal and the second signal that are amplified based on the first gain being subject to the limit in the digital format.

58. The apparatus of claim 55, wherein the apparatus is configured such that the first signal and the second signal that are amplified based on the second gain are gain adjusted in the digital format, without the first signal and the second signal that are amplified based on the first gain being subject to the gain adjustment in the digital format.

59. A method, comprising:
at one of a plurality of circuits for one of a plurality of cells of an image sensor, where each of the plurality of circuits includes a first amplifier, a second amplifier, a first analog-to-digital converter, and a second analog-to-digital converter, and each of the plurality of cells corresponds with a pixel and includes a first photodiode and a second photodiode both receiving light via a single filter:
identifying a first gain for the first amplifier and the second amplifier;
amplifying, utilizing the first amplifier and based on the first gain, a first signal generated by the one of the cells;
amplifying, utilizing the second amplifier and based on the first gain, a second signal generated by the one of the cells;
converting, utilizing the first analog-to-digital converter, the first signal amplified based on the first gain from an analog format to a digital format;
converting, utilizing the second analog-to-digital converter, the second signal amplified based on the first gain from the analog format to the digital format;
identifying a second gain, that is greater than the first gain, for the first amplifier and the second amplifier;
amplifying, utilizing the first amplifier and based on the second gain, the first signal generated by the one of the cells;
amplifying, utilizing the second amplifier and based on the second gain, the second signal generated by the one of the cells;
converting, utilizing the first analog-to-digital converter, the first signal amplified based on the second gain from the analog format to the digital format;
converting, utilizing the second analog-to-digital converter, the second signal amplified based on the second gain from the analog format to the digital format; and
outputting the converted first signal amplified based on the first gain, the converted second signal amplified based on the first gain, the converted first signal amplified based on the second gain, and the converted second signal amplified based on the second gain, for generation of at least a portion of at least one high dynamic range (HDR) image.

60. The method of claim 59, wherein the first signal is generated based on the first photodiode of the one of the cells and not generated based on the second photodiode of the one of the cells, and the second signal is generated based on the second photodiode of the one of the cells and not generated based on the first photodiode of the one of the cells.

61. The method of claim 59, wherein:
the image sensor includes a complementary metal oxide semiconductor (CMOS) image sensor;
the first photodiode and the second photodiode are the only photodiodes included in the one of the cells;
the first signal and the second signal are concurrently generated by the one of the cells;
the first amplifier the second amplifier do not amplify based on any gain other than the first gain and the second gain;
each of the plurality of circuits include, for the one of the cells, no amplifier other than the first amplifier and the second amplifier, and no analog-to-digital converter other than the first analog-to-digital converter and the second analog-to-digital converter; and
the first signal and the second signal are amplified based on the first gain for an entire frame, before the first signal and the second signal are amplified based on the second gain for the entire frame, such that the HDR image is generated based on an intermediate signal that includes a first-gain frame-level signal portion immediately followed by a second-gain frame-level signal portion.

62. The method of claim 61, wherein the first signal is generated based on the first photodiode of the one of the cells and not generated based on the second photodiode of the one of the cells, and the second signal is generated based on the second photodiode of the one of the cells and not generated based on the first photodiode of the one of the cells.

63. The method of claim 61, and further comprising:
storing, utilizing a first capacitor, the first signal; and
storing, utilizing a second capacitor, the second signal;
wherein:
the first signal is read multiple times from the first capacitor by the first amplifier and the second signal is read multiple times from the second capacitor by the second amplifier;
the first photodiode and the second photodiode are in communication with two sampling circuits that each include:
a sampling transistor having: a first node coupled to at least one of the first photodiode or the second photodiode, and a second node coupled to at least one reset transistor and at least one additional transistor, and
a selection transistor having: a first node coupled to the at least one additional transistor, and a second node coupled to a corresponding output;
a number of the plurality of circuits is equal to a number of a subset of the plurality of cells in a single line of the image sensor, such that the plurality of circuits collectively process all of the subset of the plurality of cells in the single line of the image sensor, in parallel, where the first amplifier and the second amplifier of the plurality of circuits amplify based on the first gain, line-by-line, for all lines of the image sensor in connection with the entire frame, before the first amplifier and the second amplifier of the plurality of circuits amplify based on the second gain, line-by-line, for all lines of the image sensor in connection with the entire frame; and the first amplifier amplifies the first signal and the second amplifier amplifies the second signal, before the first signal and the second signal are further processed for output via a line readout circuit.

64. The method of claim 63, wherein the first signal and the second signal that are amplified based on the second gain are subject to a limit in the digital format, without the first signal and the second signal that are amplified based on the first gain being subject to the limit in the digital format.

65. The method of claim 63, wherein the first signal and the second signal that are amplified based on the second gain are gain adjusted in the digital format, without the first signal and the second signal that are amplified based on the first gain being subject to the gain adjustment in the digital format.

66. The method of claim 63, wherein the first gain includes a gain of one (1).

67. An apparatus, comprising:
an image sensor including a plurality of lines of cells with each cell corresponding with a pixel and with each cell including a first photodiode and a second photodiode both receiving light via a filter for a single color, the first photodiode generating a first analog signal corresponding to a portion of one frame of a plurality of frames captured by the first photodiode of the image sensor, the second photodiode generating a second analog signal corresponding to a portion of the one frame of the plurality of frames captured by the second photodiode of the image sensor; and a plurality of circuits in communication with the image sensor, the plurality of circuits together processing the plurality of lines of cells for the one frame, one line at a time, each of the plurality of circuits including, for use with a corresponding cell of each of the plurality of lines:

a first variable amplifier in communication with the image sensor, the first variable amplifier, for the corresponding cell of each of the plurality of lines for the one frame, sequentially generating a first-amplifier/first-gain analog signal based on application of a first gain to the first analog signal until the first-amplifier/first-gain analog signal is generated for the corresponding cell of each of the plurality of lines for the one frame, after which a first-amplifier/second-gain analog signal is sequentially generated by the first variable amplifier based on application of a second gain greater than the first gain to the first analog signal until the first-amplifier/second-gain analog signal is generated for the corresponding cell of each of the plurality of lines for the one frame, a second variable amplifier in communication with the image sensor, the second variable amplifier, for the corresponding cell of each of the plurality of lines for the one frame, sequentially generating a second-amplifier/first-gain analog signal based on application of the first gain to the second analog signal until the second-amplifier/first-gain analog signal is generated for the corresponding cell of each of the plurality of lines for the one frame, after which a second-amplifier/second-gain analog signal is sequentially generated by the second variable amplifier based on application of the second gain to the second analog signal until the second-amplifier/second-gain analog signal is generated for the corresponding cell of each of the plurality of lines for the one frame, a first analog-to-digital converter in communication with the first variable amplifier, the first analog-to-digital converter, for the corresponding cell of each of the plurality of lines for the one frame, sequentially converting the first-amplifier/first-gain analog signal to a first-amplifier/first-gain digital signal until the first-amplifier/first-gain digital signal is generated for the corresponding cell of each of the plurality of lines for the one frame, after which the first-amplifier/second-gain analog signal is sequentially converted by the first analog-to-digital converter to a first-amplifier/second-gain digital signal until the first-amplifier/second-gain digital signal is generated for the corresponding cell of each of the plurality of lines for the one frame, and a second analog-to-digital converter in communication with the second variable amplifier, the second analog-to-digital converter, for the corresponding cell of each of the plurality of lines for the one frame, sequentially converting the second-amplifier/first-gain analog signal to a second-amplifier/first-gain digital signal until the second-amplifier/first-gain digital signal is generated for the corresponding cell of each of the plurality of lines for the one frame, after which the second-amplifier/second-gain analog signal is sequentially converted by the second analog-to-digital converter to a second-amplifier/second-gain digital signal until the second-amplifier/second-gain digital signal is generated for the corresponding cell of each of the plurality of lines for the one frame;

wherein the apparatus is configured such that a high dynamic range (HDR) image is generated, for the one frame, by:
generating a first-amplifier/first-gain frame-level digital signal based on each first-amplifier/first-gain digital signal that is generated for the corresponding cell of each of the plurality of lines for the one frame,
generating a first-amplifier/second-gain frame-level digital signal based on each first-amplifier/second-gain digital signal that is generated for the corresponding cell of each of the plurality of lines for the one frame,
generating a second-amplifier/first-gain frame-level digital signal based on each second-amplifier/first-gain digital signal that is generated for the corresponding cell of each of the plurality of lines for the one frame,
generating a second-amplifier/second-gain frame-level digital signal based on each second-amplifier/second-gain digital signal that is generated for the corresponding cell of each of the plurality of lines for the one frame, and
combining at least two of: the first-amplifier/first-gain frame-level digital signal, the first-amplifier/second-gain frame-level digital signal, the second-amplifier/first-gain frame-level digital signal, and the second-amplifier/second-gain frame-level digital signal, to generate a combined frame-level digital signal, which is combined with another combined frame-level digital signal.

68. The apparatus of claim 67, wherein the apparatus is configured such that the first photodiode and the second photodiode of each of the plurality of circuits are the only photodiodes of the corresponding cell.

69. The apparatus of claim 67, wherein the apparatus is configured such that the cells each include a first lens associated with the first photodiode and a second lens associated with the second photodiode.

70. The apparatus of claim 67, wherein the apparatus is configured such that the first photodiode is the only photodiode that generates the first analog signal, and the second photodiode is the only photodiode that generates the second analog signal, where the first analog signal and the second analog signal are concurrently generated.

71. The apparatus of claim 67, wherein the apparatus is configured such that the first photodiode generates the first analog signal, and the second photodiode generates the second analog signal, simultaneously, at least in part.

72. The apparatus of claim 67, wherein the apparatus is configured such that the first analog signal and the second analog signal generated by each cell of one of the plurality of lines are communicated to the plurality of circuits as part of a column read out.

73. The apparatus of claim 67, wherein the apparatus is configured such that the portion of the one frame captured by the first photodiode of the corresponding cell, and the portion of the one frame captured by the second photodiode of the corresponding cell, are captured without using different sample times.

74. The apparatus of claim 67, wherein the apparatus is configured such that the first-amplifier/first-gain analog signal, the first-amplifier/second-gain analog signal, the second-amplifier/first-gain analog signal, and the second-amplifier/second-gain analog signal, are generated without using different sample times.

75. The apparatus of claim 67, wherein the apparatus is configured such that the first variable amplifier does not receive the second analog signal, and the second variable amplifier does not receive the first analog signal.

76. The apparatus of claim 67, wherein the apparatus is configured such that the first analog signal is captured by only the first photodiode of the corresponding cell, and the second analog signal is captured by only the second photodiode of the corresponding cell.

77. The apparatus of claim 67, wherein the apparatus is configured such that the first photodiode and the second photodiode are in communication with two sampling circuits that each include:
 a sampling transistor having: a first node coupled to at least one of the first photodiode or the second photodiode, and a second node coupled to at least one reset transistor and at least one additional transistor; and
 a selection transistor having: a first node coupled to the at least one additional transistor, and a second node coupled to a corresponding output.

78. The apparatus of claim 67, wherein the apparatus includes at least one storage in communication with the first photodiode and the second photodiode, the at least one storage storing the first analog signal corresponding to the portion of the one frame captured by the first photodiode of the image sensor, and storing the second analog signal corresponding to the portion of the one frame captured by the second photodiode of the image sensor.

79. The apparatus of claim 78, wherein the apparatus is configured such that the at least one storage includes a first storage dedicated solely for the first variable amplifier, and a second storage dedicated solely for the second variable amplifier.

80. The apparatus of claim 67, wherein the apparatus includes a first single capacitor for the first variable amplifier, and a second single capacitor for the second variable amplifier.

81. The apparatus of claim 67, wherein the apparatus is configured such that the first variable amplifier generates the first-amplifier/first-gain analog signal, and the second variable amplifier generates the second-amplifier/first-gain analog signal, before being output via a line readout circuit.

82. The apparatus of claim 67, wherein the apparatus is configured such that the first variable amplifier receives the first analog signal only twice, and only the first gain and the second gain, with no other gains, are applied by the first variable amplifier to the first analog signal; and the second variable amplifier receives the second analog signal only twice, and only the first gain and the second gain, with no other gains, are applied by the second variable amplifier to the second analog signal.

83. The apparatus of claim 67, wherein the apparatus is configured such that the first variable amplifier and the second variable amplifier each alternate between only the first gain and the second gain, on a frame-by-frame basis.

84. The apparatus of claim 67, wherein the apparatus is configured such that a controller is in communication with the first variable amplifier and the second variable amplifier, the controller controlling a timing of: receipt of the first analog signal at the first variable amplifier; the generation of the first-amplifier/first-gain analog signal and the first-amplifier/second-gain analog signal by the first variable amplifier; receipt of the second analog signal at the second variable amplifier; and the generation of the second-amplifier/first-gain analog signal and the second-amplifier/second-gain analog signal by the second variable amplifier.

85. The apparatus of claim 67, wherein the apparatus is configured such that a controller is in communication with the first variable amplifier, the second variable amplifier, the first analog-to-digital converter, and the second analog-to-digital converter, where the controller, based on a sample period of time including 1/120 of a second, controls: receipt of the first analog signal at the first variable amplifier; receipt of the second analog signal at the second variable amplifier; and the generation of: the first-amplifier/first-gain analog signal, the first-amplifier/second-gain analog signal, the second-amplifier/first-gain analog signal, the second-amplifier/second-gain analog signal, the first-amplifier/first-gain digital signal, the first-amplifier/second-gain digital signal, the second-amplifier/first-gain digital signal, and the second-amplifier/second-gain digital signal.

86. The apparatus of claim 85, wherein the apparatus is configured such that the controller is in communication with an application processor for generating the HDR image, where the controller is synchronized with the application processor.

87. The apparatus of claim 67, wherein the apparatus is configured such that, for each of the plurality of circuits, the first analog-to-digital converter is the only analog-to-digital converter that receives any output from the first variable amplifier, and the second analog-to-digital converter is the only analog-to-digital converter that receives any output from the second variable amplifier.

88. The apparatus of claim 67, wherein the apparatus is configured such that an adjustment is performed in a digital domain in connection with only a subset of signals that have been subjected to the second gain in an analog domain.

89. The apparatus of claim 67, wherein the apparatus is configured such that a gain adjustment is performed in a digital domain for a subset of signals that have been subjected to the second gain in an analog domain, but not for another subset of signals that have been subjected to the first gain in the analog domain, for generating the HDR image.

90. The apparatus of claim 89, wherein the apparatus is configured such that the gain adjustment is performed by an application processor that is signaled by a controller that is in communication with the first variable amplifier, the second variable amplifier, the first analog-to-digital converter, and the second analog-to-digital converter, to control the first variable amplifier, the second variable amplifier, the first analog-to-digital converter, and the second analog-to-digital converter.

91. The apparatus of claim 67, wherein the apparatus is configured such that only a subset of signals that have been subjected to the second gain in an analog domain, is subjected to a limit in a digital domain.

92. The apparatus of claim 67, wherein the apparatus is configured such that a subset of signals that have been subjected to the second gain in an analog domain is subsequently subjected to a limit while in a digital format, and another subset of signals that have not been subjected to the second gain in the analog domain is not subsequently subjected to the limit in the digital format.

93. The apparatus of claim 92, wherein the apparatus is configured such that the limit is implemented by an application processor that is signaled by a controller that is in communication with the first variable amplifier, the second variable amplifier, the first analog-to-digital converter, and the second analog-to-digital converter, to control the first variable amplifier, the second variable amplifier, the first analog-to-digital converter, and the second analog-to-digital converter.

94. The apparatus of claim 67, wherein the apparatus is configured such that the first analog signal, the second analog signal, the first-amplifier/first-gain analog signal, the first-amplifier/second-gain analog signal, the second-amplifier/first-gain analog signal, and the second-amplifier/second-gain analog signal, all have a duration of substantially 1/120 second.

95. The apparatus of claim 94, wherein the apparatus is configured such that the HDR image is output via signals having a duration that is greater than 1/120 second.

96. The apparatus of claim 67, wherein the apparatus is configured such that the first variable amplifier generates, in sequence for the corresponding cell of each of the plurality of lines for the one frame, the first-amplifier/first-gain analog signal based on application of the first gain to the first analog signal, for a first duration of 1/120 second, after which the first-amplifier/second-gain analog signal is generated, in sequence for the corresponding cell of each of the plurality of lines for the one frame, based on application of the second gain to the first analog signal, for a subsequent second duration of 1/120 second.

97. The apparatus of claim 67, wherein the apparatus is configured such that the high dynamic range (HDR) image is generated with no interframe time between the first-amplifier/first-gain frame-level digital signal and the first-amplifier/second-gain frame-level digital signal.

98. The apparatus of claim 67, wherein the apparatus is configured such that the combining includes combining the first-amplifier/first-gain frame-level digital signal and the second-amplifier/first-gain frame-level digital signal to generate the combined frame-level digital signal, which includes a combined first-gain frame-level digital signal.

99. The apparatus of claim 67, wherein the apparatus is configured such that the combining includes combining the first-amplifier/second-gain frame-level digital signal and the second-amplifier/second-gain frame-level digital signal to generate the combined frame-level digital signal, which includes a combined second-gain frame-level digital signal.

100. The apparatus of claim 67, wherein the apparatus is configured such that the combining includes:
   combining the first-amplifier/first-gain frame-level digital signal and the second-amplifier/first-gain frame-level digital signal to generate the combined frame-level digital signal, which includes a combined first-gain frame-level digital signal, and
   combining the first-amplifier/second-gain frame-level digital signal and the second-amplifier/second-gain frame-level digital signal to generate the another combined frame-level digital signal, which includes a combined second-gain frame-level digital signal.

101. The apparatus of claim 100, wherein the apparatus is configured such that a gain adjustment is performed for the combined second-gain frame-level digital signal, but not for the combined first-gain frame-level digital signal, for generating the HDR image.

102. The apparatus of claim 100, wherein the apparatus is configured such that a gain adjustment is performed only for the combined second-gain frame-level digital signal, before the combined first-gain frame-level digital signal and the combined second-gain frame-level digital signal are combined, for generating the HDR image.

103. The apparatus of claim 100, wherein the apparatus is configured such that a limit is applied to the combined second-gain frame-level digital signal, but not to the combined first-gain frame-level digital signal, for generating the HDR image.

104. The apparatus of claim 100, wherein the apparatus is configured such that a limit is applied to only the combined second-gain frame-level digital signal, before the combined first-gain frame-level digital signal and the combined second-gain frame-level digital signal are combined, for generating the HDR image.

105. The apparatus of claim 67, wherein the apparatus is configured such that, for each of the plurality of circuits, the first analog-to-digital converter is in direct communication with the first variable amplifier, and the second analog-to-digital converter is in direct communication with the second variable amplifier.

106. The apparatus of claim 67, wherein the apparatus is configured such that the plurality of circuits is collectively capable of processing:
   a set of analog signals, for all the cells of an entire line, simultaneously;
   a set of amplified analog signals, for all the cells of the entire line, simultaneously; and
   a set of digital signals, for all the cells of the entire line, simultaneously.

107. The apparatus of claim 67, wherein the apparatus is configured such that:
   the first photodiode and the second photodiode are the only photodiodes of the corresponding cell;
   the first analog signal is generated concurrently with the second analog signal;
   only the first gain and the second gain, with no other gains, are applied by the first variable amplifier to the first analog signal;
   only the first gain and the second gain, with no other gains, are applied by the second variable amplifier to the second analog signal; and
   for each of the plurality of circuits, the first analog-to-digital converter is the only analog-to-digital converter that is in communication with the first variable amplifier, and the second analog-to-digital converter is the only analog-to-digital converter that is in communication with the second variable amplifier.

108. The apparatus of claim 107, wherein the apparatus is configured such that, for one of the cells, the first analog signal is generated based on the first photodiode of the one of the cells and not generated based on the second photodiode of the one of the cells, and the second analog signal is generated based on the second photodiode of the one of the cells and not generated based on the first photodiode of the one of the cells.

109. The apparatus of claim 107, wherein the apparatus is configured such that the combining includes:
- combining the first-amplifier/first-gain frame-level digital signal and the second-amplifier/first-gain frame-level digital signal to generate the combined frame-level digital signal, which includes a combined first-gain frame-level digital signal, and
- combining the first-amplifier/second-gain frame-level digital signal and the second-amplifier/second-gain frame-level digital signal to generate the another combined frame-level digital signal, which includes a combined second-gain frame-level digital signal.

110. The apparatus of claim 109, wherein the apparatus is configured such that a gain adjustment is performed for the combined second-gain frame-level digital signal, but not for the combined first-gain frame-level digital signal, for generating the HDR image.

111. The apparatus of claim 109, wherein the apparatus is configured such that a gain adjustment is performed only for the combined second-gain frame-level digital signal, before the combined first-gain frame-level digital signal and the combined second-gain frame-level digital signal are combined, for generating the HDR image.

112. The apparatus of claim 109, wherein the apparatus is configured such that a limit is applied to only the combined second-gain frame-level digital signal, before the combined first-gain frame-level digital signal and the combined second-gain frame-level digital signal are combined, for generating the HDR image.

113. The apparatus of claim 109, wherein the apparatus is configured such that a limit is applied to the combined second-gain frame-level digital signal, but not to the combined first-gain frame-level digital signal, for generating the HDR image.

114. The apparatus of claim 113, wherein the apparatus is configured such that, for one of the cells, the first analog signal is generated based on the first photodiode of the one of the cells and not generated based on the second photodiode of the one of the cells, and the second analog signal is generated based on the second photodiode of the one of the cells and not generated based on the first photodiode of the one of the cells.

115. The apparatus of claim 109, wherein the apparatus is configured such that, for one of the cells, the first analog signal is generated based on the first photodiode of the one of the cells and not generated based on the second photodiode of the one of the cells, and the second analog signal is generated based on the second photodiode of the one of the cells and not generated based on the first photodiode of the one of the cells.

116. The apparatus of claim 109, wherein the apparatus is configured such that the first photodiode and the second photodiode are in communication with two sampling circuits that each include:
- a sampling transistor having: a first node coupled to at least one of the first photodiode or second photodiode, and a second node coupled to at least one reset transistor and at least one additional transistor; and
- a selection transistor having: a first node coupled to the at least one additional transistor, and a second node coupled to a corresponding output.

117. The apparatus of claim 109, wherein the apparatus includes a first single capacitor read by the first variable amplifier, and a second single capacitor read by the second variable amplifier.

118. The apparatus of claim 109, wherein the apparatus is configured such that a gain adjustment is performed by a digital processor for a subset of signals that have been subjected to the second gain under control of an analog component controller that signals the digital processor, but not for another subset of signals that have been subjected to the first gain under control of the analog component controller, for generating the HDR image.

119. The apparatus of claim 118, wherein the apparatus is configured such that the subset of signals that have been subjected to the second gain under control of the analog component controller is subjected to a limit by the digital processor, and the another subset of signals that have not been subjected to the second gain under control of the analog component controller is not subjected to the limit by the digital processor.

120. The apparatus of claim 119, wherein the apparatus is configured such that the first gain includes a gain of one (1).

121. The apparatus of claim 119, wherein the apparatus is configured such that the first gain includes a gain of one (1), such that the application of the first gain results in a digital representation representing a full dynamic range signal output from the image sensor.

122. The apparatus of claim 109, wherein the apparatus is configured such that the application of the first gain results in a digital representation representing a full dynamic range signal output from the image sensor.

123. The apparatus of claim 67, wherein the apparatus is configured such that at least one of:
- the cells each include only the first photodiode and the second photodiode;
- the cells each include the first photodiode and the second photodiode, in addition to at least one additional photodiode;
- the corresponding cell changes for each of the plurality of lines being processed for the one frame;
- the corresponding cell changes when changing lines among each of the plurality of lines being processed for the one frame;
- each cell includes a site of the first photodiode and the second photodiode;
- each cell includes a site of the first photodiode and the second photodiode, thus forming a photosite;
- each cell includes a photosite;
- each single cell corresponds with a single pixel;
- a plurality of cells are included for each pixel;
- a single cell is included for each pixel;
- multiple of the cells correspond with a single pixel;
- each cell corresponds with the pixel, by analog signals generated thereby being used to generate pixel data used to display the pixel;
- the lines include rows;
- the lines include columns;
- the plurality of frames are processed in sequence;
- the plurality of circuits cooperate so as to collectively process all cells of the one line at a time;

the plurality of circuits cooperate to each independently process the corresponding cell, so that the plurality of circuits collectively process all cells of the one line at a time;

after processing the one frame, the plurality of circuits cooperate to process, in sequence, one line of the plurality of lines of cells at a time until each of the plurality of lines for another frame have been processed;

the one frame reflects a scene at a single instant of time;

the one frame reflects a scene to which the image sensor is exposed;

the one frame reflects a scene to which the image sensor is subject via a single exposure of the image sensor;

the one frame includes at least one analog pixel value for each pixel of an entirety of a pixel array;

the one frame includes at least one analog pixel value for each pixel of an entirety of a pixel array, for a single exposure;

the one frame reflects two analog storage planes at a single instant of time;

the first analog signal is captured by only the first photodiode of the corresponding cell;

the first analog signal is not captured by just the first photodiode of the corresponding cell;

the second analog signal is captured by only the second photodiode of the corresponding cell;

the second analog signal is not captured by just the second photodiode of the corresponding cell;

the first analog signal and the second analog signal are different, based on a different sample time therebetween;

the first analog signal and the second analog signal are different, based on a first sample time for sampling the first analog signal, being different from a second sample time for sampling the second analog signal;

the first analog signal and the second analog signal are different, based on an aspect of the apparatus that does not include a first sample time for sampling the first analog signal, being different from a second sample time for sampling the second analog signal;

the first analog signal and the second analog signal are different, based on a first exposure time for the first analog signal, being different from a second exposure time for the second analog signal;

the first analog signal and the second analog signal are different, based on an aspect of the apparatus that does not include a first exposure time for the first analog signal, being different from a second exposure time for the second analog signal;

the first analog signal and the second analog signal are different, based on a difference between a first storage, being different from a second storage;

the first analog signal and the second analog signal are different, based on an aspect of the apparatus that does not include a difference between a first storage, being different from a second storage;

the first analog signal and the second analog signal are different, based on the first analog signal being generated by the first photodiode and the second analog signal being generated by the second photodiode;

the first analog signal and the second analog signal are different, based on an aspect of the apparatus that does not include the first analog signal being generated by the first photodiode and the second analog signal being generated by the second photodiode;

the first analog signal corresponds to the portion of the one frame captured by the first photodiode of the corresponding cell, by representing at least a portion of the portion of the one frame captured by the first photodiode of the corresponding cell;

the second analog signal corresponds to the portion of the one frame captured by the second photodiode of the corresponding cell, by representing at least a portion of the portion of the one frame captured by the second photodiode of the corresponding cell;

the first analog signal and the second analog signal have different exposure times;

the first analog signal and the second analog signal have different sample times;

the first analog signal and the second analog signal do not have different exposure times;

the first analog signal and the second analog signal do not have different sample times;

the second analog signal is received from a same at least one storage from which the first analog signal is received;

the first analog signal is received from a first storage, and the second analog signal is received from a second storage;

the first analog signal is received multiple times, by the first analog signal being received at a first instant of time, and being subsequently received at a second instant of time;

at least one of the first analog signal or the second analog signal, reflect an effect of a strobe;

at least one of the first analog signal or the second analog signal, do not reflect an effect of a strobe;

the first variable amplifier includes a single variable amplifier;

the first variable amplifier includes at least one variable amplifier;

the second variable amplifier includes a single variable amplifier;

the second variable amplifier includes at least one variable amplifier;

the first analog-to-digital converter includes a single analog-to-digital converter;

the first analog-to-digital converter includes at least one analog-to-digital converter;

the second analog-to-digital converter includes a single analog-to-digital converter;

the second analog-to-digital converter includes at least one analog-to-digital converter;

the first variable amplifier and the second variable amplifier, identify the first gain before application of the first gain, and identify the second gain before application of the second gain;

the first variable amplifier and the second variable amplifier, identify the first gain before application of the first gain, and identify the second gain before application of the second gain, where the first gain and the second gain are identified by a component of the apparatus;

the first variable amplifier and the second variable amplifier, identify the first gain before application of the first gain, and identify the second gain before application of the second gain, where the first gain and the second gain are identified by being set by a user of the apparatus;

the first variable amplifier and the second variable amplifier, identify the first gain before application of the first gain, and identify the second gain before application of the second gain, where the first gain and the second gain are identified by not being set by a user of the apparatus;

the first variable amplifier and the second variable amplifier, identify the first gain before application of the first gain, and identify the second gain before application of the second gain, where the first gain and the second gain are identified automatically by the apparatus;

the first variable amplifier and the second variable amplifier, identify the first gain before application of the first gain, and identify the second gain before application of the second gain, where the first gain and the second gain are identified by being received by the first variable amplifier and the second variable amplifier;

the first variable amplifier and the second variable amplifier, identify the first gain before application of the first gain, and identify the second gain before application of the second gain, where the first gain and the second gain are identified by a controller for being sent to the first variable amplifier and the second variable amplifier;

the first variable amplifier generates the first-amplifier/second-gain analog signal subsequent to generating the first-amplifier/first-gain analog signal;

the first variable amplifier generates the first-amplifier/second-gain analog signal subsequent to generating the first-amplifier/first-gain analog signal, by generating the first-amplifier/second-gain analog signal immediately after generating the first-amplifier/first-gain analog signal;

the first variable amplifier generates the first-amplifier/second-gain analog signal subsequent to generating the first-amplifier/first-gain analog signal, by generating the first-amplifier/second-gain analog signal after performing intermediate operations that are performed after generating the first-amplifier/first-gain analog signal;

the first-amplifier/first-gain analog signal is generated sequentially, by the first-amplifier/first-gain analog signal being generated, one-by-one, for the corresponding cell of each of the plurality of lines for the one frame;

the first-amplifier/first-gain analog signal is generated sequentially, by the first-amplifier/first-gain analog signal being generated, one corresponding cell-at-a-time, for each of the plurality of lines for the one frame;

the first-amplifier/first-gain analog signal is generated sequentially, by the first-amplifier/first-gain analog signal being generated, corresponding cell-by-corresponding cell, for each of the plurality of lines for the one frame;

in communication with, includes constant communication;

in communication with, includes intermittent communication;

in communication with, includes fixed communication;

in communication with, includes selective communication;

in communication with, includes in direct communication;

in communication, includes in direct communication, with no intermediate circuit components therebetween;

in communication with, includes in indirect communication;

in communication, includes in indirect communication, with at least one intermediate circuit component therebetween;

the first variable amplifier is part of the first analog-to-digital converter;

the first variable amplifier is not part of the first analog-to-digital converter;

the second variable amplifier is part of the second analog-to-digital converter;

the second variable amplifier is not part of the second analog-to-digital converter;

the first-amplifier/first-gain frame-level digital signal includes a combination of the first-amplifier/first-gain digital signal for the corresponding cell of each of the plurality of lines for the one frame;

the first-amplifier/first-gain frame-level digital signal includes a weighted combination of the first-amplifier/first-gain digital signal for the corresponding cell of each of the plurality of lines for the one frame;

the first-amplifier/first-gain frame-level digital signal includes a blend of the first-amplifier/first-gain digital signal for the corresponding cell of each of the plurality of lines for the one frame;

each frame-level digital signal is frame-level by being based on the first-amplifier/first-gain digital signal that is generated for each cell of each of the plurality of lines, for the one frame;

each frame-level digital signal is frame-level by being based on the first-amplifier/first-gain digital signal that is generated for each cell of each of the plurality of lines, and thereby representing an entirety of the one frame;

each frame-level digital signal is frame-level by representing the one frame;

each frame-level digital signal is frame-level by representing an entirety of the one frame;

the first analog signal and the second analog signal include cell-level analog signals, which are cell-level by representing an output of the corresponding cell;

the first analog signal and the second analog signal include cell-level analog signals, which are cell-level by representing an output of only the corresponding cell;

each cell-level analog signal is cell-level by representing an output of the corresponding cell;

each cell-level analog signal is cell-level by representing an output of only the corresponding cell;

each cell-level analog signal is cell-level by representing an output of the corresponding cell without representing a full frame;

each cell-level digital signal is cell-level by representing an output of the corresponding cell;

each cell-level digital signal is cell-level by representing an output of only the corresponding cell;

each cell-level digital signal is cell-level by representing a processed output of the corresponding cell;

each cell-level digital signal is cell-level by representing a processed output of only the corresponding cell;

each cell-level digital signal is cell-level by representing a processed output of the corresponding cell without representing a full frame;

the first-amplifier/first-gain analog signal is first-amplifier/first-gain, because the first variable amplifier applies the first gain;

the second-amplifier/second-gain analog signal is second-amplifier/second-gain, because the second variable amplifier applies the second gain;

at least one of the digital signals includes a digital image;

one or more of the digital signals are generated using different sample times;

one or more of the digital signals are not generated using different sample times;
one or more of the digital signals form an image stack;
one or more of the digital signals do not form an image stack;
one or more of the digital signals are part of an image stack;
one or more of the digital signals are not part of an image stack;
the HDR image is generated by being created;
the combining includes a merging;
the combining includes a blending;
the combining involves a contrast enhancement;
the combined frame-level digital signal and the another combined frame-level digital signal, include digital images;
the combined frame-level digital signal and the another combined frame-level digital signal, include combined digital images;
the combined frame-level digital signal and the another combined frame-level digital signal, include synthetic images;
the apparatus includes circuitry in communication with the plurality of circuits, the circuitry generating the HDR image;
the apparatus includes one or more processors in communication with the plurality of circuits, the one or more processors generating the HDR image;
the apparatus includes circuitry in communication with the plurality of circuits, the circuitry including a controller and at least one processor that cooperate to generate the HDR image;
the apparatus includes circuitry in communication with the plurality of circuits, the circuitry including a controller and at least one processor that cooperate to cause the generation of the HDR image;
the apparatus includes circuitry in communication with the plurality of circuits, the circuitry including a controller and at least one processor that are separate devices which cooperate to cause the generation of the HDR image;
the apparatus includes circuitry in communication with the plurality of circuits, the circuitry including a controller and at least one processor that cooperate to generate the HDR image, by the controller causing the at least one processor to generate the HDR image;
the apparatus includes circuitry in communication with the plurality of circuits, the circuitry including a controller and at least one processor that cooperate to generate the HDR image, by the controller prompting the at least one processor to generate the HDR image;
the apparatus includes circuitry in communication with the plurality of circuits, the circuitry including a controller and at least one processor that cooperate to generate the HDR image, by the controller signaling the at least one processor such that the signaling causes the at least one processor to generate the HDR image;
the apparatus includes circuitry in communication with the plurality of circuits, the circuitry causing the plurality of circuits to process the plurality of lines of cells, and causing the generation of the HDR image;
the apparatus includes circuitry in communication with the plurality of circuits, the circuitry causing the plurality of circuits to process the plurality of lines of cells, and causing the generation of the HDR image;
the apparatus includes circuitry in communication with the plurality of circuits, the circuitry including a controller causing the plurality of circuits to process the plurality of lines of cells, and an application processor causing the generation of the HDR image;
the apparatus includes circuitry in communication with the plurality of circuits, the circuitry including a controller causing the plurality of circuits to process the plurality of lines of cells, and causing an application processor to generate the HDR image;
the apparatus includes circuitry in communication with the plurality of circuits, the circuitry causing the generation of the first-amplifier/first-gain frame-level digital signal, the first-amplifier/second-gain frame-level digital signal, the second-amplifier/first-gain frame-level digital signal, and the second-amplifier/second-gain frame-level digital signal; and causing performance of the combining;
the apparatus includes circuitry in communication with the plurality of circuits, the circuitry including at least one processor generating the first-amplifier/first-gain frame-level digital signal, the first-amplifier/second-gain frame-level digital signal, the second-amplifier/first-gain frame-level digital signal, and the second-amplifier/second-gain frame-level digital signal; and performing the combining;
the apparatus includes circuitry in communication with the plurality of circuits, the circuitry including a controller causing at least one processor to generate the first-amplifier/first-gain frame-level digital signal, the first-amplifier/second-gain frame-level digital signal, the second-amplifier/first-gain frame-level digital signal, and the second-amplifier/second-gain frame-level digital signal; and to perform the combining;
the apparatus includes instructions stored on a non-transitory memory that, when executed by a processor, instruct the processor to cause the generation of the first analog signal, the second analog signal, the first-amplifier/first-gain analog signal, the first-amplifier/second-gain analog signal, the second-amplifier/first-gain analog signal, the second-amplifier/second-gain analog signal, the first-amplifier/first-gain digital signal, the first-amplifier/second-gain digital signal, the second-amplifier/first-gain digital signal, and the second-amplifier/second-gain digital signal, directly;
the apparatus includes instructions stored on a non-transitory memory that, when executed by a processor, instruct the processor to cause the generation of the first analog signal, the second analog signal, the first-amplifier/first-gain analog signal, the first-amplifier/second-gain analog signal, the second-amplifier/first-gain analog signal, the second-amplifier/second-gain analog signal, the first-amplifier/first-gain digital signal, the first-amplifier/second-gain digital signal, the second-amplifier/first-gain digital signal, and the second-amplifier/second-gain digital signal, indirectly;
the apparatus includes instructions stored on a non-transitory memory that, when executed by a processor, instruct the processor to cause the generation of the first analog signal, the second analog signal, the first-amplifier/first-gain analog signal, the first-amplifier/second-gain analog signal, the second-amplifier/first-gain analog signal, the second-amplifier/second-gain analog signal, the first-amplifier/first-gain digital signal, the first-amplifier/second-gain digital signal, the second-amplifier/first-gain digital signal, and the second-amplifier/second-gain digital signal, by running an operating system that, in turn, generates a control signal that, in turn, causes the generation of the first analog signal, the second analog signal, the first-amplifier/first-gain analog signal, the first-amplifier/second-gain analog signal, the second-amplifier/first-gain analog signal, the second-amplifier/second-gain analog signal, the first-amplifier/first-gain digital signal, the first-amplifier/second-gain digital signal, the second-amplifier/first-gain digital signal, and the second-amplifier/second-gain digital signal;

the apparatus includes instructions stored on a non-transitory memory that, when executed by a processor, instruct the processor to cause the generation of the first analog signal, the second analog signal, the first-amplifier/first-gain analog signal, the first-amplifier/second-gain analog signal, the second-amplifier/first-gain analog signal, the second-amplifier/second-gain analog signal, the first-amplifier/first-gain digital signal, the first-amplifier/second-gain digital signal, the second-amplifier/first-gain digital signal, and the second-amplifier/second-gain digital signal, by running an operating system that causes the generation of the first analog signal, the second analog signal, the first-amplifier/first-gain analog signal, the first-amplifier/second-gain analog signal, the second-amplifier/first-gain analog signal, the second-amplifier/second-gain analog signal, the first-amplifier/first-gain digital signal, the first-amplifier/second-gain digital signal, the second-amplifier/first-gain digital signal, and the second-amplifier/second-gain digital signal;

the first analog signal and the second analog signal are different by virtue of a difference between a first storage and a second storage;

the first analog signal and the second analog signal are different by virtue of a difference between the first photodiode and the second photodiode; or the first analog signal and the second analog signal include signals that represent different values.

124. An apparatus, comprising:

an image sensor including a plurality of lines of cells with each cell including a first photodiode and a second photodiode both positioned behind a filter for a single color;

a plurality of circuits each in communication with a corresponding cell of each of the plurality of lines of cells of the image sensor, each of the plurality of circuits including a first variable amplifier, a second variable amplifier, a first analog-to-digital converter, and a second analog-to-digital converter; and circuitry in communication with the plurality of circuits, wherein the circuitry, when executed, causes the apparatus to:

process the plurality of lines of cells of the image sensor, one line at a time, such that each of the plurality of circuits is caused to: output, in sequence for the corresponding cell of each of the plurality of lines for one frame, two first-gain cell-level digital signals converted from two amplified first-gain cell-level analog signals generated based on application of a first gain to two cell-level analog signals generated by the corresponding cell, until the two first-gain cell-level digital signals are output for the corresponding cell of each of the plurality of lines for the one frame, after which there is output of two second-gain cell-level digital signals converted from two amplified second-gain cell-level analog signals generated based on application of a second gain, that is greater than the first gain, to the two cell-level analog signals, until the two second-gain cell-level digital signals are output for the corresponding cell of each of the plurality of lines for the one frame, generate, for the one frame, two first-gain frame-level digital signals based on the two first-gain cell-level digital signals that are output for the corresponding cell of each of the plurality of lines for the one frame, and two second-gain frame-level digital signals based on the two second-gain cell-level digital signals that are output for the corresponding cell of each of the plurality of lines for the one frame, and generate, for the one frame, a high dynamic range (HDR) image, based on at least one of: at least one of the two first-gain frame-level digital signals, or at least one of the two second-gain frame-level digital signals.

125. The apparatus of claim 124, wherein the apparatus is configured such that the two cell-level analog signals correspond to different portions of the one frame, that are captured by the corresponding cell.

126. The apparatus of claim 124, wherein the apparatus is configured such that:

the first photodiode and the second photodiode are the only photodiodes of each cell;

only the first gain and the second gain are applied by the first variable amplifier and the second variable amplifier, without application of other gains; and for each of the plurality of circuits, the first analog-to-digital converter is the only analog-to-digital converter that is in communication with the first variable amplifier, and the second analog-to-digital converter is the only analog-to-digital converter that is in communication with the second variable amplifier.

127. The apparatus of claim 126, wherein the apparatus is configured such that, for one of the cells, the first analog signal is generated based on the first photodiode of one of the cells and not generated based on the second photodiode of the one of the cells, and the second analog signal is generated based on the second photodiode of the one of the cells and not generated based on the first photodiode of the one of the cells.

128. The apparatus of claim 126, wherein the apparatus is configured such that the first photodiode and the second photodiode are in communication with two sampling circuits that each include:

a sampling transistor having: a first node coupled to at least one of the first photodiode or the second photodiode, and a second node coupled to at least one reset transistor and at least one additional transistor; and a selection transistor having: a first node coupled to the at least one additional transistor, and a second node coupled to a corresponding output.

129. The apparatus of claim 126, wherein the apparatus includes a first single capacitor read by the first variable amplifier, and a second single capacitor read by the second variable amplifier.

130. The apparatus of claim 126, wherein the apparatus is configured such that a gain adjustment is performed for a subset of signals that have been subjected to the second gain, but not for another subset of signals that have been subjected to the first gain, for generating the HDR image.

131. The apparatus of claim 126, wherein the apparatus is configured such that a subset of signals that have been subjected to the second gain is the subjected to a limit, and another subset of signals that have not been subjected to the second gain is not subjected to the limit.

132. The apparatus of claim 126, wherein the apparatus is configured such that a number of the plurality of circuits is equal to a number of a subset of the cells in a single line of the image sensor, such that the plurality of circuits collectively process all of the subset of the cells in the single line of the image sensor, in parallel, where the first variable amplifier and the second variable amplifier amplify based on the first gain, line-by-line, for all lines of the image sensor in connection with the one frame, before the first variable amplifier and the second variable amplifier amplify based on the second gain, line-by-line, for all lines of the image sensor in connection with the one frame.

133. The apparatus of claim 126, wherein the apparatus is configured such that the HDR image is generated, by combining the two first-gain frame-level digital signals to form a combined first-gain frame-level digital signal, combining the two second-gain frame-level digital signals to form a combined second-gain frame-level digital signal, and combining the combined first-gain frame-level digital signal and the combined second-gain frame-level digital signal.

134. The apparatus of claim 133, wherein the apparatus is configured such that a gain adjustment is performed for the combined second-gain frame-level digital signal, but not the combined first-gain frame-level digital signal, for generating the HDR image.

135. The apparatus of claim 134, wherein the apparatus is configured such that a limit is applied to the combined second-gain frame-level digital signal, but not the combined first-gain frame-level digital signal, for generating the HDR image.

136. The apparatus of claim 133, wherein the apparatus is configured such that a limit is applied to the combined second-gain frame-level digital signal, but not the combined first-gain frame-level digital signal, for generating the HDR image.

137. The apparatus of claim 133, wherein the apparatus is configured such that, for one of the cells, the first analog signal is generated based on the first photodiode of one of the cells and not generated based on the second photodiode of the one of the cells, and the second analog signal is generated based on the second photodiode of the one of the cells and not generated based on the first photodiode of the one of the cells.

138. The apparatus of claim 126, wherein the apparatus is configured such that a single cell is included for each pixel of the image sensor.

139. The apparatus of claim 126, wherein the apparatus is configured such that the application of the first gain results in a digital representation representing a full dynamic range signal output from the image sensor.

140. The apparatus of claim 139, wherein the apparatus is configured such that the digital representation representing the full dynamic range signal output from the image sensor, results from exposing an image according to local intensity conditions for one or more brightest regions.

141. The apparatus of claim 139, wherein the apparatus is configured such that the digital representation representing the full dynamic range signal output from the image sensor, is implemented by exposing an image according to one or more regions, to the exclusion of one or more other regions having a brightness that is lower than that of the one or more regions.

142. The apparatus of claim 126, wherein the apparatus is configured such that the first gain includes a gain of one (1).

143. The apparatus of claim 142, wherein the apparatus is configured such that the gain of one (1) results in a digital representation representing a full dynamic range signal output from the image sensor.

144. The apparatus of claim 126, wherein the apparatus is configured such that the circuitry includes a controller and a processor in communication, the controller causing the processing of the plurality of lines of cells, the processor causing the generation of the HDR image.

145. The apparatus of claim 126, wherein the apparatus is configured such that the circuitry includes a controller in communication with a processor, the controller causing the plurality of circuits to process the plurality of lines of cells, and causing the processor to generate the two first-gain frame-level digital signals, the two second-gain frame-level digital signals, and the HDR image.

146. The apparatus of claim 126, wherein the apparatus is configured such that the circuitry includes at least one processor, the at least one processor in communication with at least one non-transitory memory storing instructions, wherein the at least one processor, when executed, executes the instructions to cause the apparatus to process the plurality of lines of cells of the image sensor, and generate the two first-gain frame-level digital signals, the two second-gain frame-level digital signals, and the HDR image.

147. The apparatus of claim 126, wherein the apparatus is configured such that the second gain is selected based on an International Organization for Standardization (ISO) value selected by a user.

* * * * *